US011751251B2

(12) United States Patent
Li et al.

(10) Patent No.: US 11,751,251 B2
(45) Date of Patent: Sep. 5, 2023

(54) GRANT BASED PUSCH TRANSMISSION AND CONFIGURED GRANT BASED PUSCH TRANSMISSION IN NR SYSTEMS OPERATING ON UNLICENSED SPECTRUM

(71) Applicant: Intel Corporation, Santa Clara, CA (US)

(72) Inventors: Yingyang Li, Beijing (CN); Salvatore Talarico, Sunnyvale, CA (US); Jose Armando Oviedo, Santa Cruz, CA (US); Gang Xiong, Portland, OR (US); Carlos H. Aldana, Santa Clara, CA (US); Yongjun Kwak, San Diego, CA (US); Lopamudra Kundu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 152 days.

(21) Appl. No.: 17/024,516

(22) Filed: Sep. 17, 2020

(65) Prior Publication Data

US 2021/0007149 A1    Jan. 7, 2021

Related U.S. Application Data

(60) Provisional application No. 62/943,569, filed on Dec. 4, 2019, provisional application No. 62/932,299, filed on Nov. 7, 2019, provisional application No. 62/910,297, filed on Oct. 3, 2019, provisional application No. 62/902,746, filed on Sep. 19, 2019.

(51) Int. Cl.
*H04W 74/08* (2009.01)
*H04L 5/00* (2006.01)
*H04W 72/23* (2023.01)

(52) U.S. Cl.
CPC ....... *H04W 74/0833* (2013.01); *H04L 5/0048* (2013.01); *H04W 72/23* (2023.01)

(58) Field of Classification Search
CPC ......... H04W 74/0833; H04W 72/1289; H04W 72/14; H04W 74/0808; H04L 5/0048; H04L 5/0044; H04L 5/0078; H04L 5/0091; H04L 27/0006
USPC ........................................................ 370/329
See application file for complete search history.

(56) References Cited

U.S. PATENT DOCUMENTS

| | | | | |
|---|---|---|---|---|
| 2018/0176835 A1* | 6/2018 | Park | .................. | H04W 16/14 |
| 2018/0317244 A1* | 11/2018 | Um | .................. | H04W 72/1215 |
| 2018/0367282 A1* | 12/2018 | Li | .................. | H04L 1/1896 |
| 2019/0132860 A1* | 5/2019 | Bhorkar | ............ | H04W 74/0833 |
| 2019/0281636 A1* | 9/2019 | Liu | .................. | H04W 74/0833 |

(Continued)

*Primary Examiner* — Hassan Kizou
*Assistant Examiner* — Oladiran Gideon Olaleye
(74) *Attorney, Agent, or Firm* — Schwabe, Williamson & Wyatt, P.C.

(57) ABSTRACT

Various embodiments herein provide techniques for grant-based and configured grant physical uplink shared channel (PUSCH) transmissions in New Radio (NR) systems operation in unlicensed spectrum. Some embodiments relate to identification, based on an index to a table, a combination of a listen-before talk (LBT) type, an offset, and a channel access priority class (CAPC). Some embodiments relate to selecting, based on a duration of a first uplink (UL) transmission that is to follow a received downlink (DL) transmission, one of CAT-1 LBT and CAT-2 LBT. Other embodiments may be described and/or claimed.

18 Claims, 18 Drawing Sheets

(56) References Cited

U.S. PATENT DOCUMENTS

| | | | |
|---|---|---|---|
| 2019/0327117 A1* | 10/2019 | Jeon | H04L 5/0094 |
| 2019/0387546 A1* | 12/2019 | Li | H04L 27/26025 |
| 2020/0187204 A1* | 6/2020 | Alriksson | H04W 72/0446 |
| 2021/0135803 A1* | 5/2021 | Chang | H04W 74/0808 |
| 2021/0235492 A1* | 7/2021 | Iyer | H04L 5/001 |
| 2021/0274551 A1* | 9/2021 | Takata | H04W 72/0413 |

* cited by examiner

1800 receiving downlink control information (DCI) for a grant-based (GB) or a configured grant (CG) physical uplink shared channel (PUSCH) transmission, wherein the DCI is to schedule the PUSCH to support multiple transmit time interval (multi-TTI) PUSCH scheduling
1804 encoding the PUSCH for transmission to a next generation NodeB (gNB) based on the DCI
1808

Figure 18

GRANT BASED PUSCH TRANSMISSION AND CONFIGURED GRANT BASED PUSCH TRANSMISSION IN NR SYSTEMS OPERATING ON UNLICENSED SPECTRUM

CROSS REFERENCE TO RELATED APPLICATION

The present application claims priority to U.S. Provisional Patent Application No. 62/902,746, which was filed Sep. 19, 2019; U.S. Provisional Patent Application No. 62/910,297, which was filed Oct. 3, 2019; U.S. Provisional Patent Application No. 62/932,299, which was filed Nov. 7, 2019; and U.S. Provisional Patent Application No. 62/943,569, which was filed Dec. 4, 2019; the disclosures of which are hereby incorporated by reference.

FIELD

Embodiments relate generally to the technical field of wireless communications.

BACKGROUND

Various embodiments generally may relate to the field of wireless communications.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 18 is a flowchart to illustrate a process in accordance with various embodiments.

DETAILED DESCRIPTION

Figure 1:
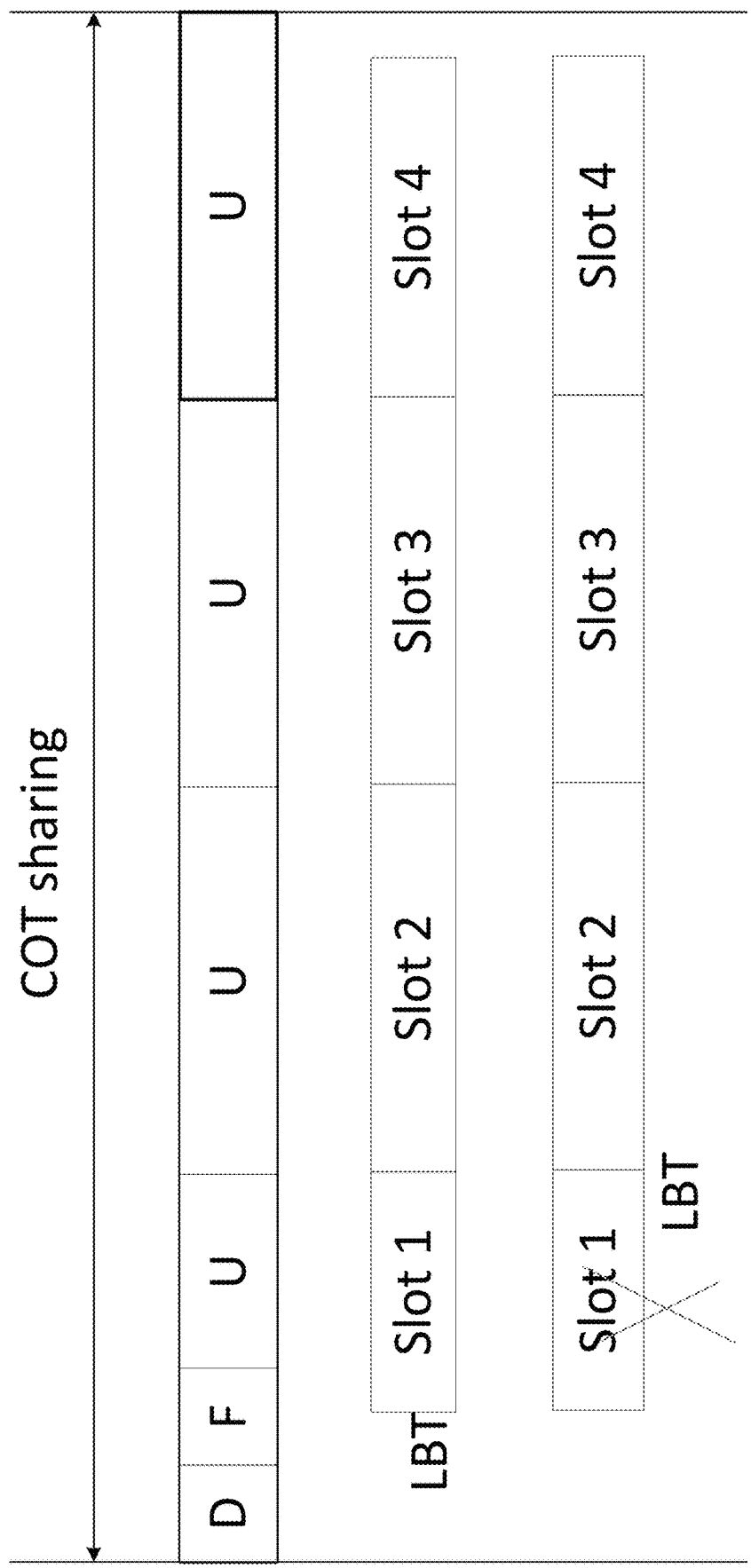
FIG. 1 illustrates an example of time resources of multi-slot physical uplink shared channel (PUSCH) in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Each year, the number of mobile devices connected to wireless networks significantly increases. In order to keep up with the demand in mobile data traffic, necessary changes have to be made to system requirements to be able to meet these demands. Three critical areas that need to be enhanced in order to deliver this increase in traffic are larger bandwidth, lower latency, and higher data rates.

One of the major limiting factors in wireless innovation is the availability in spectrum. To mitigate this, the unlicensed spectrum has been an area of interest to expand the availability of LTE. "In this context, one of the major enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system.

Now that the main building blocks for the framework of NR have been established, a natural enhancement is to allow this to also operate on unlicensed spectrum. The work to introduce shared/unlicensed spectrum in 5G NR has already been kicked off, and a new work item on "NR-Based Access to Unlicensed Spectrum" was approved in TSG RAN Meeting #82. One objective of this new WI:

Physical layer aspects including [RAN1]:
    Frame structure including single and multiple DL to UL and UL to DL switching points within a shared COT with associated identified LBT requirements (3GPP Technical Report (TR) Section 7.2.1.3.1).

UL data channel including extension of PUSCH to support PRB-based frequency block-interlaced transmission; support of multiple PUSCH(s) starting positions in one or multiple slot(s) depending on the LBT outcome with the understanding that the ending position is indicated by the UL grant; design not requiring the UE to change a granted TBS for a PUSCH transmission depending on the LBT outcome. The necessary PUSCH enhancements based on CP-OFDM. Applicability of sub-PRB frequency block-interlaced transmission for 60 kHz to be decided by RAN1.

Physical layer procedure(s) including [RAN1, RAN2]:

For LBT, channel access mechanism in line with agreements from the NR-U study item (TR 38.889, Section 7.2.1.3.1). Specification work to be performed by RAN1.

HARQ operation: NR HARQ feedback mechanisms are the baseline for NR-U operation with extensions in line with agreements during the study phase (NR-U TR section 7.2.1.3.3), including immediate transmission of HARQ A/N for the corresponding data in the same shared COT as well as transmission of HARQ A/N in a subsequent COT. Potentially support mechanisms to provide multiple and/or supplemental time and/or frequency domain transmission opportunities. (RAN1)

Scheduling multiple TTIs for PUSCH in-line with agreements from the study phase (TR 38.889, Section 7.2.1.3.3). (RAN1)

Configured Grant operation: NR Type-1 and Type-2 configured grant mechanisms are the baseline for NR-U operation with modifications in line with agreements during the study phase (NR-U TR section 7.2.1.3.4). (RAN1)

Data multiplexing aspects (for both UL and DL) considering LBT and channel access priorities. (RAN1/RAN2)

One of the challenges in this case is that this system must maintain fair coexistence with other incumbent technologies, and in order to do so depending on the particular band in which it might operate some restriction might be taken into account when designing this system. For instance, if operating in the 5 GHz band, a listen before talk (LBT) procedure needs to be performed to acquire the medium before a transmission can occur. Grant based PUSCH (GB PUSCH) and configured grant based PUSCH (CG PUSCH) could exist in the same cell. Proper handling of such two kinds of transmission schemes is critical for efficient cell operation, especially considering GB multi-TTI transmission and CG PUSCH with repetitions. In order to overcome the issues, this disclosure provides details on the design of GB PUSCH transmission and also CG PUSCH transmission of NR in order to allow an efficient way to operate in unlicensed spectrum.

In a NR system operating on unlicensed spectrum, since a transmission is conditional to the success of the LBT procedure, the impact of LBT on PUSCH transmission should be minimized. GB PUSCH could be prioritized over CG PUSCH. DCI format scheduling multi-TTI PUSCH is designed considering overhead and blind detection. DFI overhead to be minimized considering CBG based CG PUSCH transmission.

DCI Formats for Single-TTI/Multi-TTI PUSCH

NR-U will support scheduling multiple TTIs for PUSCH, e.g., scheduling multiple TBs with different HARQ process IDs over multiple slots, using a single UL grant. Based on the two DCI format 0_0 and 0_1 defined in NR Rel-15, new DCI formats scheduling multi-TTI PUSCH can be designed. Due to the regulation limitation on occupied channel bandwidth (OCB), the PUSCH resource allocation will be redesigned compared to Rel-15, which is not the focus of this disclosure. Frequency resource allocation field(s) in a DCI is likely to be changed which results in different DCI from DCI 0_0 and 0_1. Frequency resource allocation field(s) in a DCI can follow whatever designed for frequency resource allocation in NR-U. Throughout this section, single-TTI scheduling means the scheduling of single TB, while, multi-TTI scheduling means the scheduling of multiple TBs In one embodiment, 2 new DCI formats are derived based on DCI 0_0, denoted as DCI 0_0A and 0_0B, which support single-TTI scheduling and multi-TTI scheduling, respectively. 2 new DCI formats are derived based on DCI 0_1, denoted as DCI 0_1A and 0_1B, which support single-TTI scheduling and multi-TTI scheduling, respectively.

In one embodiment, only one new DCI format is derived based on DCI 0_0, denoted as DCI 0_0A, which supports single-TTI scheduling. 2 new DCI formats are derived based on DCI 0_1, denoted as DCI 0_1A and 0_1B, which support single-TTI scheduling and multi-TTI scheduling, respectively. In fact, DCI 0_0 is fallback DCI and mainly for robustness of transmission, it may not need to be extended for the support of multi-TTI transmission.

In one embodiment, only one new DCI format is derived based on DCI 0_0, denoted as DCI 0_0A, which supports single-TTI scheduling. Only one new DCI format is derived based on DCI 0_1, denoted as DCI 0_1C, which supports dynamic switching between single-TTI scheduling and multi-TTI scheduling.

In one embodiment, for the abovementioned DCI format 0_0B, 0_1B or 0_1 C, at least some of the following fields are needed:

New data indicator (NDI) per transport block (TB).

Redundancy version (RV) per TB, 1 or 2 bits can be considered.

A single HARQ process number h, e.g. the single number h is assigned to the first TB, while the $k^{th}$ TB use HARQ process number h+k, h=0,1, . . . , N−1, N is number of TB predefined or configured for the multi-TTI PUSCH.

Channel access type, can be NO LBT, an aggressive LBT e.g. one shot LBT with 25 us CCA, or a conservative LBT, e.g. CAT-4 LBT. NO LBT means direct transmission without LBT with a gap smaller than e.g. 16 us.

Channel access priority class, e.g. 2 bits as defined in LTE LAA.

Number of scheduled slots, the maximum number of scheduled slots can be predefined or configured by RRC signaling. If both DCI 0_1A and 0_1B are used, DCI 0_1B could indicate number of scheduled slot from 2 to N; for DCI 0_1C, the number of scheduled slot ranges from 1 to N, N is number of TBs predefined or configured in the multi-TTI PUSCH.

Start position of PUSCH, e.g. LTE LAA supports 4 start positions, i.e. start of OS 0, 25 us after start of OS 0, 25 us+TA after start of OS 0 and start of OS 1. Values will be defined for NR-U. In one embodiment, the start position of PUSCH is OS X, OS X+25 us, OS X+25 us+TA, and OS X+1, where X is the start symbol, which can be indicated in a different field.

Start symbol index and end symbol index of the time resource. These two information can be signaled separately or jointly coded.

CBGTI, it exists if CBG based transmission is configured.

Indication of whether COT sharing is allowed or not for a CG UE: in one embodiment this field might be composed by one bit, and indicate only whether COT sharing is enabled or disabled; in another embodiment, this field might be composed by 2/3 bits and indicate the length of the available shared COT, so that a CG UE might evaluate in advance whether to transmit in the shared COT or not, since in one embodiment a CG UE is only allowed to perform a transmission within the shared COT only if enough data to utilize those time-domain resources available.

In one embodiment, channel access field in DCI 0_0A or 0_0B is 1 bit, and channel access field in DCI 0_1A, 0_1B or 0_1C is 2 bits. Channel access field in DCI 0_0A or 0_0B indicates NO LBT or one-shot LBT, while channel access field in DCI 0_1A, 0_1B or 0_1C indicates NO LBT, one-shot LBT or CAT-4 LBT. In one embodiment, channel access field is one bit for all DCI formats 0_0A, 0_0B, 0_1A, 0_1B or 0_1C, and the two states indicated by the field are configured by RRC signaling. In one embodiment, the channel access field in DCI 0_0A is 2 bits, indicating NO LBT, one-shot LBT or CAT-4 LBT.

In one embodiment, both DCI 0_1A and 0_1B are used, and the two DCI formats have different sizes. CBGTI of DCI 0_1A is S bits which is used to indicate whether/which CBG(s) are transmitted for the one TB. CBGTI of DCI 0_1B is M bits per TB, assuming there are totally N TBs in the multi-TTI PUSCH, total number of CBGTI bits is MN bits. S, M and/or N can be predefined or configured by RRC signaling. Normally MN is much larger than S. To limited size of DCI 0_1B, the maximum value of M could be reduced compared to S. For example, S could be 2, 4, or 8, while M could be 2 or 4.

In one embodiment, a TB scheduled by DCI 0_1A cannot be rescheduled by DCI 0_1B, a TB scheduled by DCI 0_1B cannot be rescheduled by DCI 0_1A. In one embodiment, any DCI formats including DCI 0_1A, 0_1B and others can be used to schedule any transmission or retransmission of a TB. Specifically, number of CBGTI bits is S and M per TB for DCI 0_1A and DCI 0_1B, respectively. S is normally larger and M. For a TB scheduled by DCI 0_1A in one transmission while scheduled by DCI 0_1B in another transmission, one issue is how to interpret CBGTI in the two DCI formats. Assuming S>M, the S CBGs for the TB are grouped into M CBG groups. Each CBG group uses one CBGTI bit for the TB in DCI 0_1B. In one embodiment, a CBG with index k is grouped into CBG group mod(k,M), k=0, 1 ... S−1. If a CBGTI bit for a TB in DCI 0_1B is ACK, it means all CBGs for a TB in the CBG group corresponding to the CBGTI bit is rescheduled. Alternatively, a TB could be first divided into M CBGs which applies to DCI 0_1B, then each of the M CBGs is divided into ceil(S/M) or floor(S/M) subgroups. Each subgroup then uses one CBGTI bit for the TB in DCI 0_1A. In one embodiment, CBG with index k from the M CBGs is divided into ceil(S/M) subgroups if k<mod(k,M), ceil(S/M) otherwise, k=0, 1 ... M−1. If a CBGTI bit for a TB in DCI 0_1A is ACK, it means the subgroup of the corresponding CBG for the TB corresponding to the CBGTI bit is rescheduled.

In one embodiment, DCI 0_1C is used which supports dynamic switching between single-TTI scheduling and multi-TTI scheduling. CBGTI of DCI 0_1C is M bits per TB, assuming there are totally N TBs in the multi-TTI PUSCH, total number CBGTI bits is MN bits. When less than N TBs are scheduled, the number of CBGs per TB could be larger than M.

In one embodiment, in case only single TB is scheduled by DCI 0_1C, still only M CBG bits are used for the TB. In this case, there is no needed for special handling CBG grouping. In one embodiment, in case only single TB is scheduled by DCI 0_1C, S CBGTI bits from the MN bits, S>M could be used for the TB. In this case, a TB could be first divided into S CBGs which applies to single-TTI scheduling, then the S CBGs are grouped into M CBG groups. Each CBG group uses one CBGTI bit for the TB in multi-TTI scheduling. In one embodiment, CBG with index k is grouped into CBG group mod (k, M), k=0, 1 ... S−1. If a CBGTI bit for a TB in multi-TTI scheduling is ACK, it means all CBGs in the CBG group for the TB corresponding to the CBGTI bit is rescheduled. Alternatively, a TB could be first divided into M CBGs which applies to multi-TTI scheduling, then each of the M CBGs is divided into ceil(S/M) or floor(S/M) subgroups. Each subgroup then uses one CBGTI bit for the TB in single-TTI scheduling. In one embodiment, CBG with index k from the M CBGs is divided into ceil(S/M) subgroups if k<mod(k,M), ceil(S/M) otherwise, k=0, 1 ... M−1. If a CBGTI bit for a TB in single-TTI scheduling is ACK, it means the subgroup of the corresponding CBG for the TB corresponding to the CBGTI bit is rescheduled.

In one embodiment, when n TBs are scheduled by DCI 0_1C, 1<n<N, the MN bits of CBGTI are reallocated to the n TBs. f (n) bits of CBGTI could be allocated to one TB. E.g. T=MN/n or T=min(MN/n, S). S is the maximum number of CBG used for a TB. A TB could be first divided into f(1) CBGs, then the f(1) CBGs are grouped into f (n) CBG groups. CBG with index k is grouped into CBG group mod(k, f (1)), k=0, 1 ... f (1)−1. A CBG group maps to one CBGTI bit. Alternatively, the f (m) CBGs in case there m TBs are group into f (m+1) CBGs for the case of m+1 TBs, m=1 N−1. CBG with index k is grouped into CBG group mod(k, f (m+1)), k=0, 1 ... f (m)−1. A CBG group maps to one CBGTI bit. Preferably, f (m+1) is a factor of f(m).

In one embodiment, DCI 0_1C, in case only single TB is scheduled, RV of 2 bits is used by the TB; otherwise, RV is 1 bit per TB.

In one embodiment, if CBG based transmission is not configured, only one DCI format, e.g. DCI 0_1C is used to dynamically switch between single-TTI scheduling and multi-TTI scheduling, otherwise, two DCI format 0_1A and 0_1B are both used.

HARQ Feedback Using DFI

In FeLAA AUL, DFI is introduced to indicate HARQ-ACK for the PUSCH. One HARQ-ACK bit is transmitted for each TB in the DFI. However, such scheme may result in quite large overhead since NR-U configured grant based PUSCH could support CBG based transmission. In worst case, assuming 16 HARQ processes for CG, and each TB has 8 CBGs, 128 bits should be carried in DFI.

In one embodiment, N HARQ-ACK bits are allocated for each HARQ process configured for CG, while only 1 bit is allocated for other HARQ processes. N is a predefined or configured number by RRC signaling. N could be configured by same signaling of the configured number of CBG for a TB, or N could be configured by a separate RRC signalling. The 1 bit for a HARQ processes not configured for CG is not used to trigger transmission or retransmission of a grant based PUSCH, but could be an information used in CWS adjustment. That means, even grant based PUSCH is also CBG based, still only 1 bit is allocated in DFI for overhead reduction.

In one embodiment, DFI in NR-U could match to the size of a DCI with larger size, e.g. DCI 0_1B or 0_1C. Specifically, DFI in NR-U could match to the size of a DL DCI with larger size.

In one embodiment, all HARQ processes for GB and CG PUSCH could be divided into X subset, X>1. Each subset of HARQ processes maps to a separate DFI. By this way the size of a DFI is reduced.

In one embodiment, HARQ processes configured for CG could be divided into X subsets, X>1. Each subset of HARQ processes maps to a separate DFI. In a DFI, for the corresponding subset of HARQ process configured for CG, N HARQ-ACK bits are allocated for each HARQ process. While, for all other HARQ processes not belonging to this subset, no matter it is configured for CG or not, 1 bit HARQ-ACK per HARQ process is included. N is a predefined or configured number by RRC signaling. N be configured by same signaling of the configured number of CBG for a TB, or N could be configured by a separate RRC signalling. The 1 bit per HARQ process could be an information used in CWS adjustment. For a HARQ processes configured for CG, it is up to UE whether it refers this 1 bit for the new transmission or retransmission. For example, assuming this 1 bit per HARQ process is generated as NACK if at least one CBG is erroneous, UE could stop the ongoing repetition PUSCH transmission of the related HARQ process if this 1 bit is ACK.

In one embodiment, CBG grouping could be applied to reduce number of HARQ-ACK bits for each HARQ process configured for CG. Assuming configured number of CBG is S for a TB, and S CBGs needs to be grouped into N CBG groups. N is a predefined or configured number by RRC signaling. N be configured by same signaling of the configured number of CBG for a TB, or N could be configured by a separate RRC signalling. Assuming number of CBGTI bits per TB is different for single-TTI scheduling and multi-TTI scheduling, N could equal to the smaller number of CBGTI bits per TB between single-TTI scheduling and multi-TTI scheduling. One HARQ-ACK bit for each CBG group is included in DFI. Preferably, CBG with index k is grouped into CBG group mod(k, N), k=0, 1 . . . S−1. If one bit for a CBG group of a TB is ACK in DFI, it means ACK for all CBGs in the CBG group, otherwise, a bundled NACK is signalled by DFI for the CBGs in the CBG group.

In one embodiment, CBG (re)-transmission is enabled for CG. In this case, 8 bits for CBGTI are carried in the CG-UCI, and based on configuration only the first or last N (0,2,4,6,8) carry useful information, while the others are interpreted as padding bits.

Time Resource of Multi-Slot PUSCH

In NR-U, a UE cannot always get the channel when a PUSCH is triggered due to limitation of LBT. Consequently, a method reducing the attempts of LBT could be beneficial.

In one embodiment, for a grant based multi-slot PUSCH, once UE occupied the channel by successfully performing a LBT, UE could transmit continuously in multiple slots. Assuming information on a start symbol index and an end symbol index is indicated, these two information can be signaled separately or jointly coded. As shown in FIG. 1, in the first slot for the channel occupation, UE should follow the start symbol indicated, while the last symbol in the first slot is last symbol of the slot, e.g. symbol 13. In the last slot for the channel occupation, UE should follow the end symbol indicated, while the first symbol in the last slot is symbol 0. For any middle slot(s) if existed, they are starting from symbol 0 and ending at symbol 13. In one embodiment, if UE fails to pass LBT in a slot, the UE has to try LBT again in the next slot. Preferably, as shown in FIG. 1, UE could try LBT at symbol 0 of the next slot. In one embodiment, within a slot a UE can attempt to perform LBT in multiple occasions, e.g., a UE can attempt LBT in symbol 0, 7 as follows: if LBT succeeds at symbol 0, then the rest of the slot is used to transmit a TB. However, if it fails, a UE can attempt LBT at symbol 7, and if it succeeds the transmission can be either punctured, or rate matched in the remaining 7 symbols of the slot.

In one embodiment, a UE can be configured to attempt LBT on different occasions through DCI signaling or higher layer signaling. In one embodiment, a UE might be configured to start on a specific starting position, which is not necessarily at the slot boundary.

Figure 2:
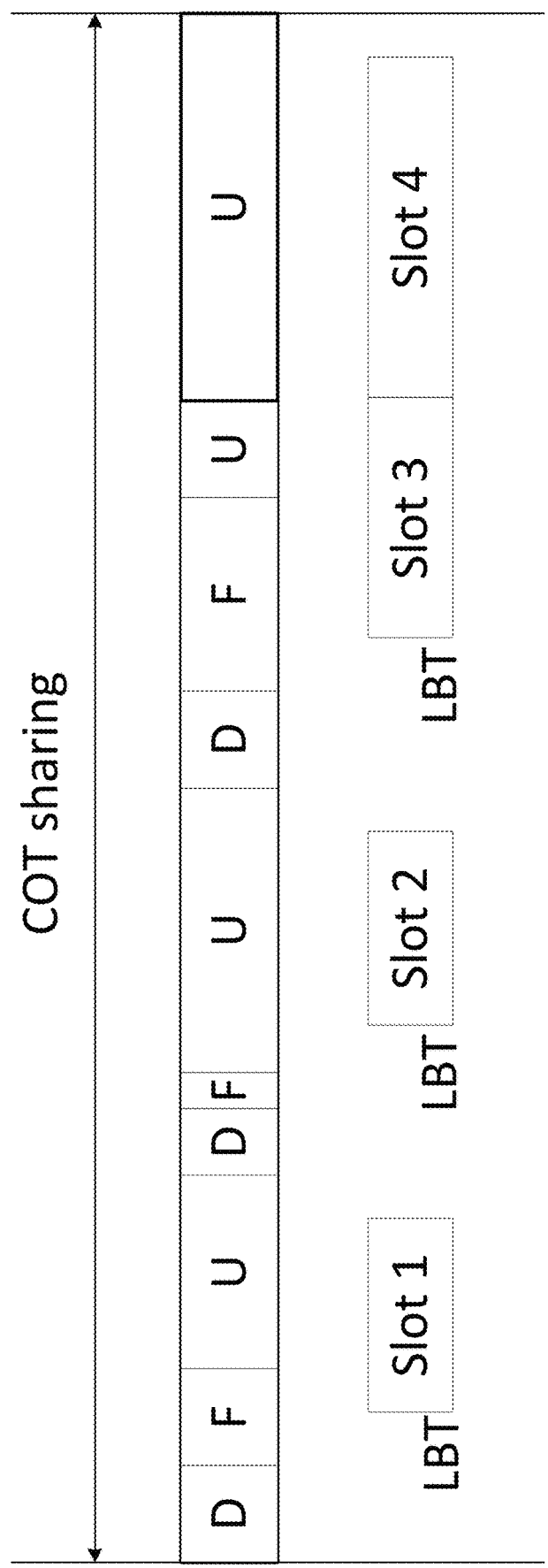
FIG. 2 illustrates another example of time resources for multi-slot PUSCH, in accordance with various embodiments.

Inside a gNB's initiated shared COT with multiple DL to UL and UL to DL switching points, the UL symbols are actually not continuous. In one embodiment, as shown in FIG. 2, for a grant based multi-slot PUSCH, in the first slot of the multi-slot PUSCH in a shared UL burst, the start symbol in the first slot is determined by the start symbol indicated by DCI. In case the next few slot are also full uplink slot, UE can continue uplink transmission in the consecutive uplink slots. In the last slot of the multi-slot PUCH in a shared UL burst, UE has to stop PUSCH transmission at the end symbol indicated by DCI. In one embodiment, if UE fails to pass LBT in a slot, the UE has to try LBT again in the next slot. Preferably, as shown in FIG. 2, UE could try LBT at symbol 0 of the next slot if the next slot is full uplink slot. In one embodiment, within shared COT of the gNB, the UE can attempt to perform LBT in multiple occasions within the shared resources, e.g, a UE can attempt LBT in symbol 0, 7 of each shared slots: such that if LBT succeeds at symbol 0, then the rest of the slot is used to transmit a TB. However, if it fails, a UE can attempt LBT at symbol 7, and if it succeeds the transmission can be either punctured, or rate matched in the remaining 7 symbols of the slot. This same process can be applied to all the remaining UL slots within a shared COT.

In one embodiment, a UE can be configured to attempt LBT on different occasions through DCI signaling or higher layer signaling. In one embodiment, a UE might be configured to start on a specific starting position, which is not necessarily at the slot boundary. Notice that the above concepts can be equally applicable also in the case of multiple DL/UL switching points.

In one embodiment, the number of slots or mini-slot for a multi-slot PUSCH could be joint coded with PUSCH mapping type, K2 and SLIV. All the applicable combinations of PUSCH mapping type, K2, SLIV and number of slots could be configured by RRC signaling and dynamically indicated by DCI. The same overhead in the DCI could be used as in Rel-15. Alternatively, larger number of combinations, e.g. more bits could be used to indicate a combination in the DCI for better flexibility.

In one embodiment, the number of TTIs for a multi-TTI PUSCH could be separate or joint coded with PUSCH mapping type, K2 and SLIV. A TTI is defined as a time period equal to the duration of the SLIV. More specifically, PUSCH transmission over multiple mini-slot or slots are consecutive in time domain. The starting symbol in SLIV is used to indicate the starting symbol in the first slot and the last symbol is determined based on a combination of the starting symbol in SLIV, length in SLIV and the number of slots/mini-slots. Note that all the applicable combinations of PUSCH mapping type, K2, SLIV and number of TTIs could be configured by RRC signaling and dynamically indicated by DCI. A TTI is restricted within a slot, or a TTI could be across slot boundary. If a TTI has to be within a slot, the last TTI could have a shorter length that the duration of the SLIV. Alternatively, the second last TTI and the last TTI could be merged and counted as a single longer TTI.

Time Resource of CG PUSCH

In NR-U, a UE cannot always get the channel when a PUSCH is triggered due to limitation of LBT. Consequently, a method reducing the attempts of LBT could be beneficial.

In one embodiment, assuming high layer configures the slots for configured grant based PUSCH (CG PUSCH), e.g. there could be a N-bit bitmap. A slot mapped to a '1' in the bitmap could be used for CG PUSCH transmission. In one embodiment, the bitmap is 40 bits long independently of the subcarrier spacing. In one embodiment, for time-domain resources that coincide with the DRS occasions, even if the UE is configured to perform CG transmission, the UE is not allowed to attempt CG, and it skips those resources. In one embodiment, the numerology followed for the interpretation of the bitmap is that configured for PUSCH.

Figure 3:
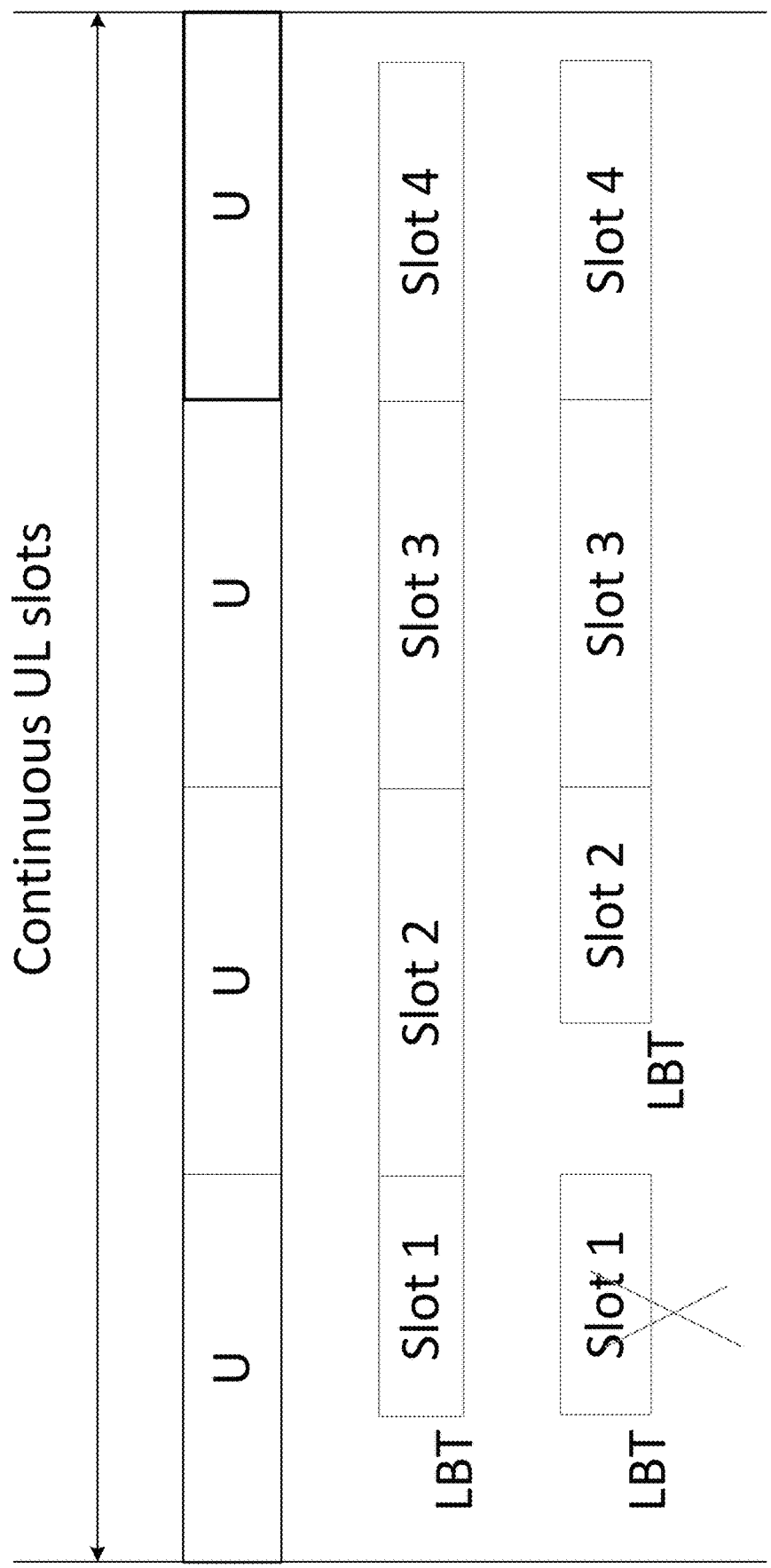
FIG. 3 illustrates an example of time resources of configured grant (CG) PUSCH, in accordance with various embodiments.

Again, it is preferred to allow UE to transmit continuously in multiple slots mapped by value '1' in the bitmap, once UE occupied the channel by successfully performing a LBT. Assuming information on a start symbol index and an end symbol index is indicated or configured, these two information can be signaled separately or jointly coded. As shown in FIG. 3, In the first slot for the channel occupation, UE should follow the start symbol indicated or configured, while the last symbol in the first slot is last symbol of the slot, e.g. symbol 13. In the last slot for the channel occupation, UE should follow the end symbol indicated or configured, while the first symbol in the last slot is symbol 0. For any middle slot(s) if existed, they are starting from symbol 0 and end at symbol 13. In one embodiment, if UE fails to pass LBT in a slot, the UE has to try LBT again in the next slot. Preferably, as shown in FIG. 3, UE could again try LBT follow the start symbol indicated or configured. By this way, a grant based PUSCH scheduled to start from an early position than CG PUSCH in the slot could be prioritized.

Figure 4:
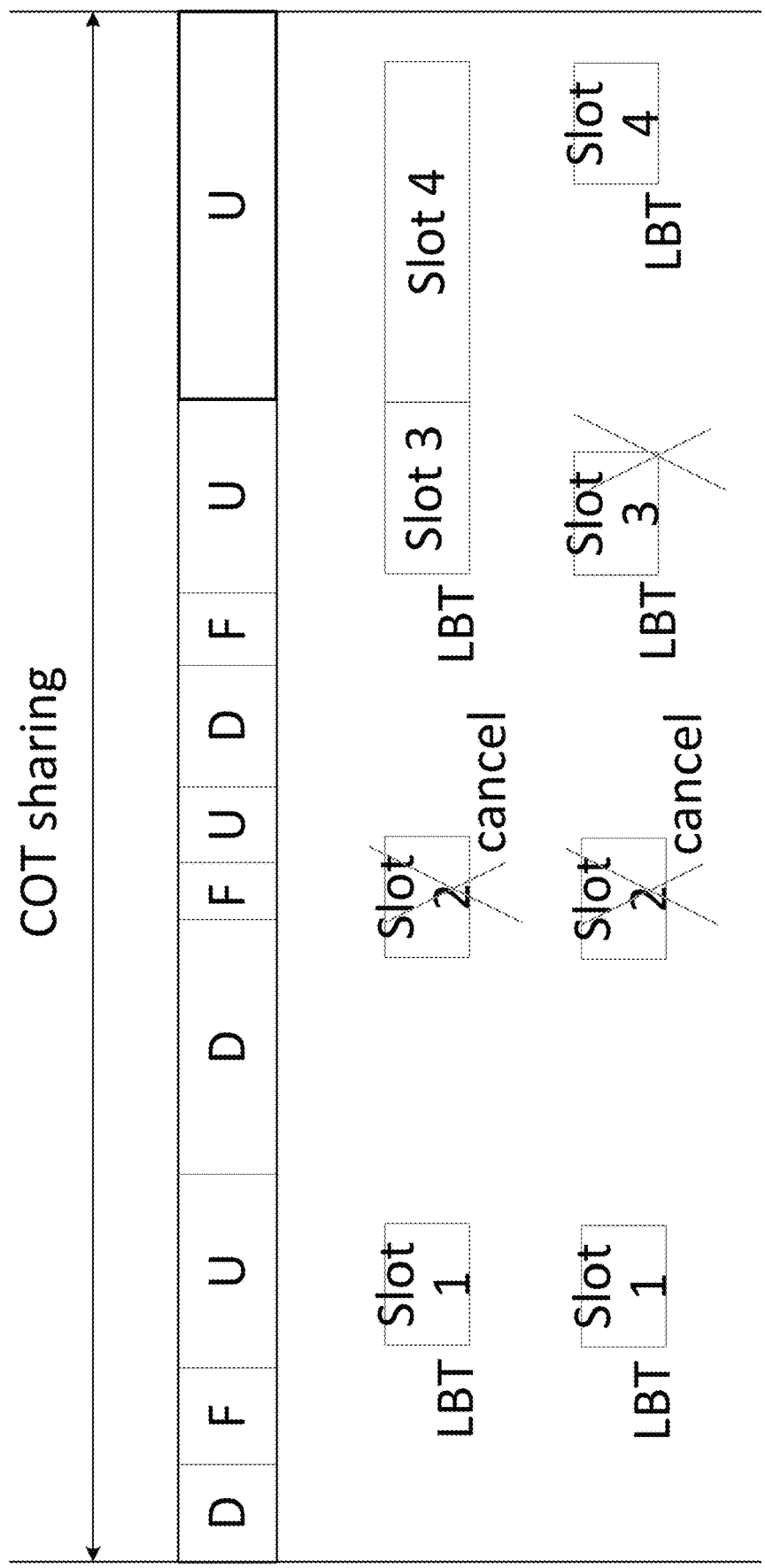
FIG. 4 illustrates another example of time resources of CG PUSCH, in accordance with various embodiments.

Inside a gNB-initiated shared COT with multiple DL to UL and UL to DL switching points, the UL symbols are actually not continuous. In one embodiment, if CG PUSCH is allowed inside COT, as shown in FIG. 4, in the first slot of CG PUSCH in a shared UL burst, the start symbol in the first slot is determined by the start symbol indicated or configured. In case the next few slot are full uplink slots, UE can continue uplink transmission of CG PUSCH in the consecutive uplink slots. In the last slot of CG PUSCH in a shared UL burst, UE has to stop PUSCH transmission at the end symbol indicated or configured. In one embodiment, if UE fails to pass LBT in a slot, the UE has to try LBT again in the next slot. Preferably, as shown in FIG. 4, UE could again try LBT follow the start symbol indicated or configured.

In one embodiment, if UE is scheduled a multi-slot PUSCH inside shared COT with multiple DL to UL and UL to DL switching points, and if UE is indicated as NO LBT, UE could do NO LBT to start its transmission in each UL burst used by this multi-slot PUSCH. Alternatively, UE only does NO LBT in the exactly first UL burst of the multi-slot PUSCH, and UE will try 25 us LBT in other UL burst. Alternatively, UE does NO LBT in the exactly first burst of the multi-slot PUSCH, for other UL burst, if the start symbol of the multi-slot PUSCH is indicated as flexible symbol by DCI 2_0, UE could still do NO LBT, otherwise, if it is indicated as uplink symbol by DC 2_0, UE does 25 us LBT. Alternatively, UE does NO LBT in the exactly first burst of the multi-slot PUSCH, for other UL burst, if the start symbol of the multi-slot PUSCH is indicated as flexible symbol by DCI 2_0 or is the first uplink symbol indicated by DCI 2_0, UE could still do NO LBT, otherwise, if it is after the first uplink symbol indicated by DCI 2_0, UE does 25 us LBT. Alternatively, UE does NO LBT in the exactly first burst of the multi-slot PUSCH, for other UL burst, if the start symbol of the multi-slot PUSCH follows a downlink symbol or flexible symbol as indicated by DCI 2_0, UE could still do NO LBT, otherwise, UE does 25 us LBT. In UE fails passing LBT in the first slot of a UL burst of the multi-slot PUSCH, UE always does 25 us in the following slots in the UL burst.

Figure 5:
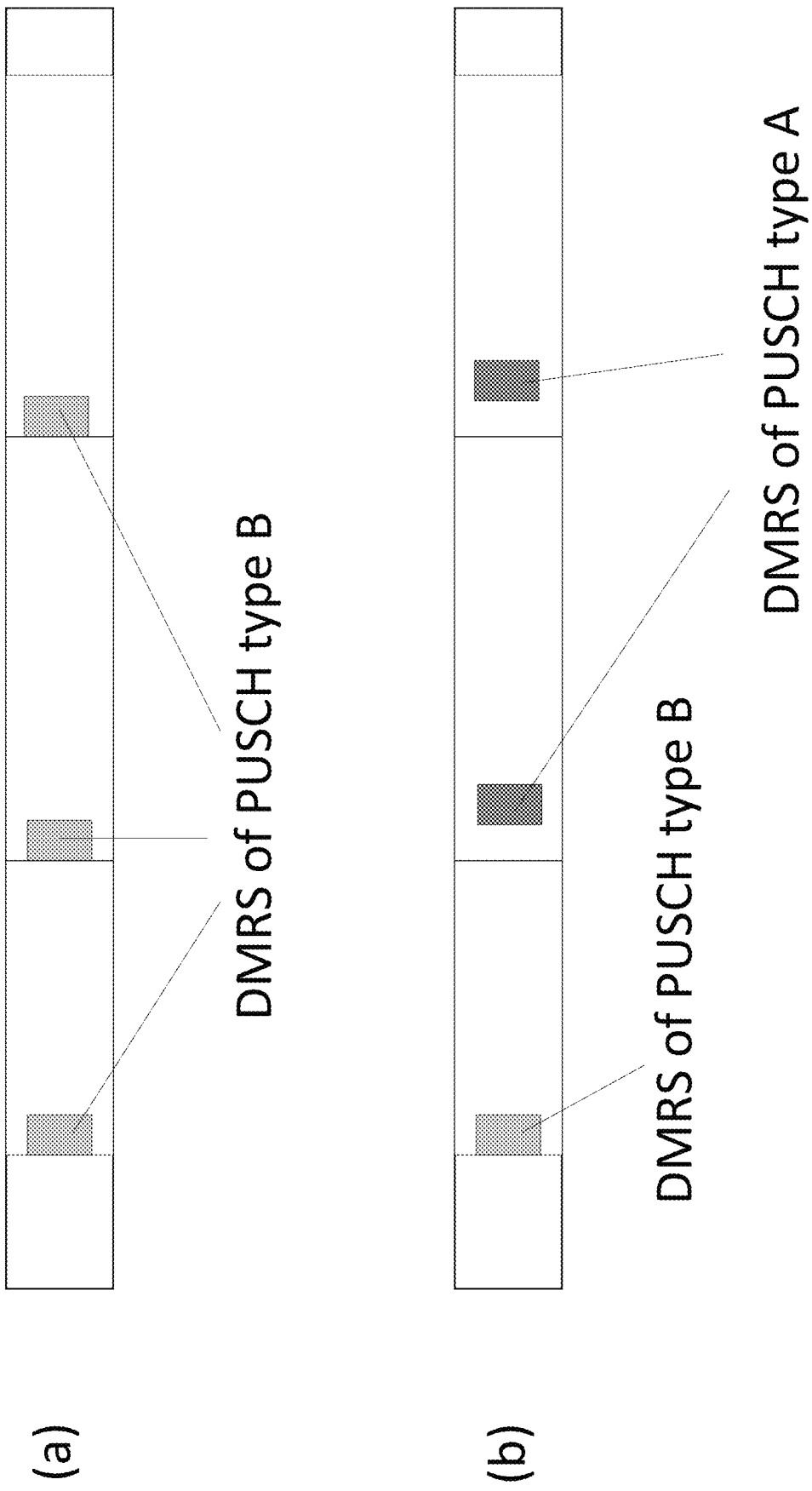
FIG. 5 illustrates an example of demodulation reference signal (DMRS) in consecutive uplink (UL) slots, in accordance with various embodiments.

In one embodiment, DMRS pattern in a slot of multi-slot PUSCH follows the PUSCH type indicated by DCI format. That is, as shown in FIG. 5A, DMRS always start from the first symbol in a slot. Specifically, full slot is used by the PUSCH and is treated as PUSCH type B. In one embodiment, as shown in FIG. 5B, DMRS pattern in a first slot follows the PUSCH type indicated by DCI format, while DMRS in remaining slot follows PUSCH type A. In one embodiment, PUSCH type A mapping is always used for CG transmission. In one embodiment, a CG UE has multiple starting symbols, which are a subset of the symbols that precede the DMRS (e.g., symbol #0, #1) when PUSCH Type A is used. In one embodiment, a CG UE only attempt LBT at the slot boundary (symbol #0).

In one embodiment, CSI is prioritized to be piggybacked on a last slot of a multi-slot PUSCH if the PUSCH in the slot is actually available for transmission. For example, PUSCH in a slot may be canceled due to e.g. confliction of symbol direction between the PUSCH in the slot and a flexible symbol indicated by DCI 2_0. Due to LBT, the probability of availability of a last slot of multi-slot PUSCH is higher than an earlier slot. If the a last slot is not available for transmission, its previous slot is checked for the transmission of CSI piggybacked on PUSCH. If the multi-slot PUSCH is separated into multiple shared UL burst, CSI could be piggybacked on a last slot of a shared UL burst with maximum number of slots.

In one embodiment, if NO LBT is used to schedule a multi-slot PUSCH, CSI is piggybacked on the exactly first slot of the multi-slot PUSCH.

Rate Matching and Reception for CG PUSCH

In NR-U, a TB can be repeated multiple times. In one embodiment, the CG-UCI is piggybacked only in the first slot repetition of a TB. In one embodiment, the CG-UCI is piggybacked in each slot. In one embodiment, the multiple slot repetitions of a TB may map to more than one UL bursts, CG-UCI is piggybacked in beginning slot repetition of a TB on each UL burst. Multiple reasons may cause the slots repetitions in different UL burst. Value '1' in the high layer configured bitmap may be not continuous, so that slot assigned to CG PUSCH is not continuous. In a shared COT with multiple DL/UL switching points, this could have multiple separated shared UL bursts.

In one embodiment, the data transmission is rate matched around the CG-UCI. In one embodiment, UCI is contained in each slot, and per each slot the RV is specified. In one embodiment, if UCI is contained only in the first slot of a burst of repeated slots, the UCI contains indication of the RV used for the first slot, while for the other slot the legacy sequence is followed starting from the RV indicated in the UCI: e.g. if UCI indicated RV=0, then next RV will be 2 3 1 0 2 3 1. In one embodiment a different sequence is used. In one embodiment, the number of repetitions within a COT is upper bounded by the length of MCOT or in case of shared COT by the remaining shared COT. In one embodiment, if UCI is contained only in the first slot of a burst of repeated slots, rate matching (RM) is done according to the total number of available REs for CG PUSCH in the set of repeated slots. In details, the UCI contains indication of a RV which points to a start position in the circular buffer for RM, and the number of bits read out is determined by the total number of REs.

In one embodiment, a CG UE can perform LBT in multiple positions within a slot. A CG UE can attempt LBT as an example in symbol 0, 7 as follows: if LBT succeeds at symbol 0, then the rest of the slot is used to transmit a TB. However, if it fails, a UE can attempt LBT at symbol 7, and if it succeeds the transmission can be either punctured, or rate matched in the remaining 7 symbols of the slot. In one embodiment, UCI is always carried in the second part of a slot, for example in symbol 10, 11, and 12.

In one embodiment, a CG UE can be configured to attempt LBT on different occasions through the activation/deactivation DCI or through higher layer signaling. In one embodiment, a CG UE might be configured to start always on a specific starting position, which is not necessarily at the slot boundary.

In one embodiment, a UE can transmit the UCI only in the first slot of N contiguous slots within the MCOT, and rate match the TB over the N contiguous slots. In one embodiment, the rate matched transmission can be repeated M times. In one embodiment, N and M are both RRC configured.

In one embodiment, if time-domain repetitions are allowed for CG, and UCI is only carried in the first repetitions, then CG-UCI carries information related to the number of time-domain repetitions performed.

In one embodiment, for the multiple slot repetition of a TB, UE does rate matching of the TB assuming the total number of REs of N slots. The N slots could be contiguous in time or could be separated by other slots not configured for CG, e.g. by the high layer configured bitmap. Further, each of the N slot can be a full uplink slot or only part of the slot is used as uplink. The rate matching operation is repeated M times so that the total number of slot repetition for the TB is MN. N and M are both RRC configured.

Start Positions of UL Transmissions

In LTE LAA, a GB PUSCH can start from one of four possible start position as indicated by DCI, e.g. start of OS 0, start 25 us after start of OS 0, start 25 us+TA after start of OS 0 and start of OS 1. In NR-U, potential start positions could be dependent on the numerology of PUSCH. NR supports both PUSCH type A and PUSCH type B. DMRS for PUSCH type B is always located in the first symbol of PUSCH resource, which is to reduce gNB processing time. While PUSCH type A starts from symbol 0 and DMRS is in symbol 2 or 3. The position of DMRS in a PUSCH should also be considered in the choice of start positions.

In the following description, it is assumed that the start symbol of PUSCH SLIV is in symbol k. In NR Rel-15, k equals to 0 for PUSCH type A, k can be any value within [0, 13] for PUSCH type B. The disclosed solutions could apply to GB PUSCH only, or could apply to both GB PUSCH and CG PUSCH. The disclosed solutions could be generalized to apply to PUCCH, SRS and other UL channels/signals too. In this case, denote the start symbol of PUCCH, SRS or other UL channels/signals as OS k. In the following descriptions, UL transmission could be PUSCH, PUCCH, SRS or other UL channels/signals.

The multiple candidates for start positions of a UL transmission could be generally expressed as 'reference symbol boundary+X us'. Offset X could be a time duration, for example, 0, 25, 25+TA, 16, 16+TA, TA, length of 1 symbol, or length of 2 symbols (if SCS 60 kHz). X could be other predefined or high layer configured values too. The above reference symbol boundary could be indicated by gNB or interpreted based on gNB's scheduling information. It can be the start of OS k if start position of the UL transmission scheduled by gNB is at or after the start of symbol k. The beginning X us of the UL transmission can be punctured.

Alternatively, the above reference symbol boundary could be the start of OS k-d, d=0, 1, 2, . . . if start position of the UL transmission scheduled by gNB is no later than the start of symbol k. Padding signal, e.g. CP extension of OS k could be transmitted before OS k. The above reference symbol boundary could be different, e.g., d could be different for different offset X. Value d could be predefined or configured by high layer signaling for each offset X. Similarly, reference symbol boundary could still be start of OS k, instead of defining an offset X, the value of CP extension is defined. For example, assuming reference symbol boundary is the start of OS k−1, a start position of 'reference symbol boundary+X us' is equivalent to value of CP extension 'length_of_OS_k−1−X'. In general, the value of CP extension for a UL transmission start from OS k could be 'total_length_of_the_d_symbols_before_OS_k−X'. Alternatively, the total length of the d symbols before OS k could be approximated as d times of length_of_OS_k−1, e.g. 'd*length_of_OS_k−1'. Consequently, the value of CP extension is 'd*length_of_OS_k−1−X'. For d=0 or 1, it results in the same start positions as the alternative using 'reference symbol boundary+X us' with reference symbol boundary of start of OS k-d. For d>1, it results in small difference from the alternative using 'reference symbol boundary+X us' with reference symbol boundary of start of OS k-d. By implementation, gNB could adjust the end of DL transmission, e.g. by postfix extension of last DL symbol to make a gap of 16 us or 25 us between DL and UL at UE side.

For example, corresponding to offset X=0, 25 us, 16 us+TA, 25 us+TA, value d is 0, d1, d2, d3 respectively. The value of CP extension could be:

0 (e.g. no CP extension)
Total_length_of_d_1_symbols_before_OS_k−25 us
Total_length_of_d_2_symbols_before_OS_k−16 us−TA
Total_length_of_d_3_symbols_before_OS_k−25 us−TA
d1=1 for 15 and 30 kHz SCS, d1=2 for 60 kHz SCS. d2 &d3 could be configured by RRC. the supported range of values of both C2 and C3 could be 1, 2, . . . , 28 for 15 and 30 kHz SCS, and 2, 3, . . . , 28 for 60 kHz SCS.

For example, corresponding to offset X=0, 25 us, 16 us+TA, 25 us+TA, value d is 0, d1, d2, d3 respectively. The value of CP extension could be:

0 (e.g. no CP extension)
d1*length_of_OS_k−1−25 us
d2*length_of_OS_k−1−16 us−TA
d3length_of_OS_k−1−25 us−TA
d1=1 for 15 and 30 kHz SCS, d1=2 for 60 kHz SCS. d2 &d3 could be configured by RRC. the supported range of values of both C2 and C3 could be 1, 2, . . . , 28 for 15 and 30 kHz SCS, and 2, 3, . . . , 28 for 60 kHz SCS.

In the following sections, start positions expressed as 'reference symbol boundary+X us' is assumed. Therefore, it describes the schemes based on offset X. Equivalently, the same schemes could be expressed with value of CP extension.

A PUSCH transmitted from the start of symbol k could be realized either by setting the above reference symbol boundary as the start of OS k and offset X=0, by setting the above reference symbol boundary as the start of OS k−1 and offset X=the length of 1 symbol, or by setting reference symbol boundary as the start of OS k−2 and offset X=the length of 2 symbol.

In unlicensed cell operation, the LBT types used by UE to start a UL transmission include CAT-1, CAT-2, CAT-4. CAT-1 is for the case that UL transmission follows DL signal with a gap of less than or equal to T1 us, which is also known as 'NO LBT'. T1 could be 16. CAT-2 is one-shot LBT with a duration of T2 us. T2 could be 25. Further, T2 could be 16 if CCA is required within a duration of 16 us. In one embodiment, within a gNB's shared COT Cat-2 LBT is used by a UE even if the gap is equal to or less than 16 us if the UL transmission is longer than H us: as an example H is 584 us, which mimics the WI-Fi behavior. In one embodiment, the use of Cat-2 LBT when a gap of 16 us is signalled within the DCI, or it can be RRC configurable and be optionally enabled by the gNB as in 11.ax. In one embodiment, if the gNB configures the UE such that Cat-2 will be always used, Cat-2 is used regardless of the information carried by the DCI. As to CAT-4, UE has to randomly generate a backoff counter, decrement the counter by 1 for each idle CCA slot, and can only start transmission after the backoff counter is 0.

X=0 us, e.g. start position OS k could be used if a gap is generated before OS k. It is up to gNB to use LBT CAT-2 or CAT-4, as well as CAT-1. CAT-2 with 16 us duration may also be a possible LBT type under certain condition. For example, if the duration of UL transmission is less than a certain value (e.g. 584 us or roughly 8 OSs @15 KHz, 1 slot @ 30 Kz, or 2 slots @ 60 KHz), CAT-1 is used; otherwise, CAT-2 with 16 us duration is used.

X=1 symbol, e.g. start position OS k+1 could be used if a gap is generated before OS k+1 and the above reference symbol boundary is the start of OS k. Alternatively, if the above reference symbol boundary is the start of OS k−1, start position of UL transmission is OS k. It is up to gNB to use LBT CAT-2 or CAT-4. CAT-1 could also be a possible LBT type under certain condition.

X=2 symbols, e.g. start position OS k+2 could be used if a gap is generated before OS k+2 and the above reference symbol boundary is the start of OS k. Alternatively, if the above reference symbol boundary is the start of OS k−2, start position of UL transmission is OS k. It is up to gNB to use LBT CAT-2 or CAT-4. CAT-1 could also be a possible LBT type under certain condition.

X=25 us could be used at least in case UL transmission of a UE follows UL transmission of another UE. CAT-2 could be used. CAT-4 may be applicable too.

X=16 us could be used at least in case UL transmission of a UE follows UL transmission of another UE. CAT-2 could be used. CAT-4 may be applicable too.

X=TA could be used in case UL transmission of a UE starts in a symbol potentially used by other UE to start the transmission of msg1 for 4-step RACH or msgA for 2-step RACH. The potential LBT type could be CAT-1, CAT-2 or CAT-4. CAT-2 with 16 us duration may also be a possible LBT type under certain condition. For example, if the duration of UL transmission is less than a certain value (e.g. 584 us or roughly 8 OSs @15 KHz, 1 slot @ 30 Kz, or 2 slots @ 60 KHz), CAT-1 is used; otherwise, CAT-2 with 16 us duration is used.

X=16 us+TA could be used in case UL transmission of a UE follows DL transmissions and LBT CAT-1 is indicated to start the UL transmission. CAT-2 may also be a possible LBT type under certain condition. For example, if the duration of UL transmission is less than a certain value (e.g. 584 us or roughly 8 OSs @15 KHz, 1 slot @ 30 Kz, or 2 slots @ 60 KHz), CAT-1 is used; otherwise, CAT-2 is used.

X=25 us+TA could be used in case UL transmission of a UE follows DL transmissions and LBT CAT-2 is indicated to start the UL transmission. Alternatively, 25 us+TA could be used with LBT CAT-2 when UL transmission of a UE potentially follows msg1 of the other UE for 4-step RACH or msgA of the other UE for 2-step RACH.

A special X could be used if the UL transmission should follow DL reception timing at UE. This also targets the case that UL transmission of a UE starts in a symbol potentially used by other UE to start the transmission of msg1 for 4-step RACH or msgA for 2-step RACH. By this way, puncturing beginning part of the UL transmission is avoided. The potential LBT type could be CAT-1, CAT-2 or CAT-4.

We can apply exact start positions for desirable LBT mechanism depending on situations if all above candidates for start positions are supported. however, if we supports all candidates, we may need too much overhead for indication of them. Therefore, we need to consider the tradeoff between performance and signaling overhead. The following principles could be considered for the overhead reduction, Due to the flexible configuration of SLIV of a PUSCH or start symbol & duration of PUCCH, gNB has the flexibility to configure multiple start symbols and dynamically indicate a proper start symbol in the real scheduling. Therefore, it doesn't cause much issue if only support one start position from OS k, OS k+1 and OS k+2.

For simultaneous UL transmission with RACH messages, X=TA is high prioritized. Instead, the special X could be used. Transmission of RACH messages is normally more important than other UL transmission. Without puncturing beginning X us of a UL transmission, the UL transmission may block the CCA operation which is required to start RACH messages. X=25 us+TA could be low prioritized since it is to optimize UL transmission after a RACH message which doesn't impact RACH messages.

The application of 16 us+TA to PUSCH may subject to regulations. The LBT type could be CAT-1, or CAT-2 if required. If CAT-2 with LBT duration of 25 us has to be used when gNB shares its initiated COT to UE for PUSCH, 25 us+TA becomes important for PUSCH.

From the above analysis, to handle a UL transmission starting from the same symbol as a RACH msg1 or msgA of other UE, either offset X=TA or a special X could be used. Only one of the two kinds of offset X needs to be supported. In the following discussion, offset X=TA is used. If only the above special offset X is supported, X=TA in the following discussion could be replaced by the special offset X. Alternatively, both two values of offset X are supported.

From the above analysis, offset X=25 us or X=16 us could be used to start UL transmission by CAT-2 LBT. Only one of the two values of offset X needs to be supported. In the following descriptions, offset X=25 us is used. If only the above X=16 us is supported, X=25 us in the following descriptions could be replaced by X=16 us. Whether X=25 us or X=16 us is applicable may be determined by regulation. Alternatively, both two values of offset X are supported. For example, offset X=25 us is used when a PUSCH is scheduled after another PUSCH within a gNB-initiated COT. Offset X=16 us is used if UL transmission is scheduled after DL transmission and the duration of the UL transmission is equal to or higher than a threshold, where the threshold can be configured or fixed value.

In one embodiment, offset X are designed independent from LBT type. Assuming 3-bit information of start positions, it provides full flexibility for the indication of the start positions, e.g., the potential start positions associated with X=0 us, X=25 us, X=16 us+TA, X=25 us+TA, X=TA. Assuming 2-bit information of start positions, the 4 start positions supported could be associated with X=0 us, X=25 us, X=16 us+TA, X=TA as shown in option 1 in Table X0. It could be used if regulation allows gNB to share its initiated COT to UE for a UL transmission with 16 us gap by CAT-1 or CAT-2. Alternatively, the 4 start positions supported could be associated with X=0 us, X=25 us, X=25 us+TA, X=TA as shown in option 2 in Table X0. It could be used if regulation mandates 25 us CAT-2 in case gNB shares its initiated COT to UE for a UL transmission.

In one embodiment, assuming LBT type is separately indicated, the start positions could be interpreted based on LBT type. Depending on the LBT type, e.g., if CAT-1 is indicated, the start positions could be derived accordingly. If LBT type is not CAT-1, the 4 start positions supported could be associated with X=0 us, X=25 us, X=TA, X=25+TA. If LBT type is CAT-1, the start positions supported are at least associated with X=0 us, X=16+TA as shown in option 3 in Table X0.

TABLE X0

| Offset X | Option 1 | Option 2 | Option 3 | |
|---|---|---|---|---|
| | | | Not CAT-1 | CAT-1 |
| 0 | x | x | x | x |
| 25 | x | x | x | |
| 16 + TA | x | | | x |
| TA | x | x | x | |
| 25 + TA | | x | x | |

In one embodiment, LBT type is independently indicated from offset X. 2 bits could be used to indicate CAT-1, CAT-2 with duration of 25 us, CAT-2 with duration of 16 us and CAT-4. Alternatively, 2 bits could be used to indicate CAT-1, CAT-2 with duration of 25 us and CAT-4. If CAT-1 is indicated, UE applies LBT CAT-1. Alternatively, if CAT-1 is indicated, UE determine the use of CAT-1 or CAT-2 with 16 us duration by other information, e.g. the duration of UL transmission. If the duration of UL transmission is less than a threshold, CAT-1 is used; otherwise, CAT-2 with duration of 16 us is used. Alternatively, 2 bits could be used to indicate CAT-1, CAT-2 and CAT-4. If CAT-1 is indicated, UE applies LBT CAT-1. If CAT-2 is indicated, UE applies CAT-2 with duration of 16 us for offset X=16+TA; while UE applies CAT-2 with duration of 25 us for other offset X.

In one embodiment, LBT type is independently indicated from offset X. 1-bit LBT type in DCI indicates LBT type X or CAT-4. If CAT-4 is indicated, UE uses CAT-4 for channel access. If LBT type X is indicated, UE needs to derive the LBT operation based on other information. In one example, if offset X is indicated as 0 us, 25 us, TA or 25+TA, CAT-2 with duration of 25 us is used. Regarding offset X=16 us+TA, if the duration of UL transmission is less than a threshold, CAT-1 is used; otherwise, CAT-2 with duration of 16 us is used, where the threshold can be configured or fixed value. In another example, if offset X is indicated as 25 us, TA or 25+TA, CAT-2 with duration of 25 us is used. Regarding offset X=0 us or 16 us+TA, if the duration of UL transmission is less than a threshold, CAT-1 is used; otherwise, CAT-2 with duration of 16 us is used, where the threshold can be configured or fixed value. LBT type X may be referred as CAT-2.

In one embodiment, LBT type can be independently indicated from offset X. 1-bit LBT type in DCI indicates LBT type X or CAT-4. If CAT-4 is indicated, UE uses CAT-4 for channel access. If LBT type X is indicated, UE can derive the LBT operation based on Offset X values. For example, offset X can have values of be indicated as 0 us (A), 0 us (B), 25 us, TA, or 25+TA, 16+TA (A), 16+TA (B). If offset X indicates 0 us (A), 25 us, TA, or 25+TA, 16+TA (A), the UE uses CAT-2 for UL transmission. If offset X indicates 0 us (B), 16+TA (B), the UE uses CAT-1 for UL transmission.

In one embodiment, there is no need to indicate CAT-1 LBT, since CAT-2 may be always used.

From the above analysis, the total number of candidate offsets X can be 8 or 9 (for SCS 60 kHz), while the number of LBT type is 3. Therefore, 5 or 6 bits may be required if separate indication are used, 3 or 4 bits for offsets and 2 bit s for LBT types. However, since all possible combinations are not necessarily required to be supported, joint coding of start position and LBT type could be used to indicate only meaningful combinations in order to reduce the signaling overhead. Preferably, the candidate combinations could be a subset of following combinations, For X=0 us, potential LBT type could be CAT-2 or CAT-4, as well as CAT-1;

For X=1 symbol, potential LBT type could be CAT-2 or CAT-4;

For X=2 symbols, only for SCS 60 kHz, potential LBT type could be CAT-2 or CAT-4;

For X=25 us, potential LBT type could be CAT-2 or CAT-4;

For X=16 us, potential LBT type could be CAT-2 or CAT-4;

For X=TA, potential LBT type could be CAT-2 or CAT-4, as well as CAT-1;

For X=16 us+TA, potential LBT type could be CAT-1 or CAT-2;

For X=25 us+TA, potential LBT type could be CAT-2;

For special X meaning following DL reception timing, potential LBT type could be CAT-2 or CAT-4, as well as CAT-1.

In one embodiment, a 4-bit field in DCI is used to indicate all of or a subset of above combinations of offset X and LBT type. For example, as shown in Option 1 in Table X1, 15 combinations could be indicated. If a start position OS k+1 or OS k+2 is not used since gNB can achieve similar functions using start position OS k and flexible start symbol configuration of a UL transmission, 13 combination could be indicated as in Option 2 in Table X1. If CAT-2 with 16 us duration is not applicable, as shown in Option 3 or 4, the number of combinations are 12 or 10.

TABLE X1

Combinations of start position & LBT type

| | Offset X | LBT type | Option 1 | Option 2 | Option 3 | Option 4 |
|---|---|---|---|---|---|---|
| 1 | 0 | CAT-1 | x | x | x | x |
| 2 | 0 | CAT-2 with 16 us duration | x | x | | |
| 3 | 0 | CAT-2 with 25 us duration | x | | x | x |
| 4 | 0 | CAT-4 | x | x | | x |
| 5 | 1 or 2 symbols | CAT-2 with 25 us duration | x | | x | |
| 6 | 1 or 2 symbols | CAT-4 | x | | x | |
| 7 | 25 | CAT-2 with 25 us duration | x | x | x | x |
| 8 | 25 | CAT-4 | x | x | x | x |
| 9 | 16 + TA | CAT-1 | x | x | x | x |
| 10 | 16 + TA | CAT-2 with 16 us duration | x | x | | |
| 11 | TA | CAT-1 | x | x | x | x |
| 12 | TA | CAT-2 with 16 us duration | x | x | | |
| 13 | TA | CAT-2 with 25 us duration | x | x | x | x |
| 14 | TA | CAT-4 | x | x | x | x |
| 15 | 25 + TA | CAT-2 with 25 us duration | x | x | x | x |

Assuming the application of CAT-1 or CAT-2 with 16 us duration can be derived by other information, the indication of CAT-1 or CAT-2 with 16 us duration could share a same entry. If the entry is indicated, the applicable LBT type could be derived by the duration of UL transmission. If the duration of UL transmission is less than a threshold, CAT-1 is used; otherwise, CAT-2 with duration of 16 us is used. For example, as shown in Table X1v1, entry 1, 8 and 9 are the common entries for CAT-1 and CAT-2 with 16 us duration. As shown Option 1 in Table X1v1, 12 combinations could be indicated. Assuming the start position OS k+1 or OS k+2 is not used, as shown in Option 2 in Table X4, 10 combinations could be indicated.

TABLE X1v1

Combinations of start position & LBT type

| | Offset X | LBT type | Option 1 | Option 2 |
|---|---|---|---|---|
| 1 | 0 | CAT-1 or CAT-2 with 16us duration | x | x |
| 2 | 0 | CAT-2 with 25us duration | x | x |
| 3 | 0 | CAT-4 | x | x |
| 4 | 1 or 2 symbols | CAT-2 with 25us duration | x | |
| 5 | 1 or 2 symbols | CAT-4 | x | |
| 6 | 25 | CAT-2 with 25us duration | x | x |
| 7 | 25 | CAT-4 | x | x |
| 8 | 16 + TA | CAT-1 or CAT-2 with 16us duration | x | x |
| 9 | TA | CAT-1 or CAT-2 with 16us duration | x | x |
| 10 | TA | CAT-2 with 25us duration | x | x |
| 11 | TA | CAT-4 | x | x |
| 12 | 25 + TA | CAT-2 with 25us duration | x | x |

In one embodiment, a 3-bit field in DCI is used to indicate at most 8 of above combinations of offset X and LBT type. Assuming start position OS k+1 or OS k+2 is not used since gNB can achieve similar functions using start position OS k and flexible start symbol configuration of a UL transmission. 4 options are included in Table X1v2. Option 1 could be used if regulation allows gNB to share its initiated COT to UE by CAT-1. While Option 2 could be used if regulation mandates CAT-2 in case gNB shares its initiated COT to UE. To optimize UL transmission right after RACH msg1 or msgA of other UE and to allow gNB to share its initiated COT to the UE by CAT-1, both 16+TA and 25+TA need to be available. Option 3 forbids the use of CAT-1 of start offset OS k. Option 4 forbids the use of CAT-4 of start offset 25 us. For entry 1 and 6 in Table X1v2, instead of only indicating CAT-1, the LBT type could be CAT-1 or CAT-2 with 16 us duration depending on some other information. For example, the applicable LBT type could be derived by the duration of UL transmission. If the duration of UL transmission is less than a threshold, CAT-1 is used; otherwise, CAT-2 is used.

TABLE X1v2

Combinations of start position & LBT type

| | Offset X | LBT type | Option 1 | Option 2 | Option 3 | Option 4 |
|---|---|---|---|---|---|---|
| 1 | 0 | CAT-1 | x | x | | x |
| 2 | 0 | CAT-2 with 25 us duration | x | x | x | x |
| 3 | 0 | CAT-4 | x | x | x | x |
| 4 | 25 | CAT-2 with 25 us duration | x | x | x | x |
| 5 | 25 | CAT-4 | x | x | x | |
| 6 | 16 + TA | CAT-1 | x | | x | x |
| 7 | TA | CAT-2 with 25 us duration | x | x | x | x |

TABLE X1v2-continued

Combinations of start position & LBT type

|   | Offset X | LBT type | Option 1 | Option 2 | Option 3 | Option 4 |
|---|---|---|---|---|---|---|
| 8 | TA | CAT-4 | x | x | x | x |
| 9 | 25 + TA | CAT-2 with 25 us duration |   | x | x | x |

In one embodiment, a 3-bit field in DCI is used to indicate at most 8 of above combinations of offset X and LBT type. Assuming start position OS k+1 (for SCS 15 kHz or 30 kHz) or OS k+2 (for SCS 60 kHz) is supported, 3 other combinations should be removed. 4 options are included in Table X2. Option 1 could be used if regulation allows gNB to share its initiated COT to UE by CAT-1, but it doesn't optimize simultaneous RACH messages and other UL transmission. Option 2 could be used if regulation mandates CAT-2 in case gNB shares its initiated COT to UE, but it doesn't optimize simultaneous RACH messages and other UL transmission. Option 3 could be used if regulation allows gNB to share its initiated COT to UE by CAT-1, and UL transmission of a UE starts in a symbol potentially used RACH messages of other UE is considered. Option 4 could be used if regulation mandates CAT-2 in case gNB shares its initiated COT to UE, and UL transmission of a UE starts in a symbol potentially used RACH messages of other UE is considered. Option 3 & 4 restrict the LBT type of offset 0 us and 25 us. For entry 1 and 8 in Table X2, instead of only indicating CAT-1, the LBT type could be CAT-1 or CAT-2 with 16 us duration depending on some other information. For example, the applicable LBT type could be derived by the duration of UL transmission. If the duration of UL transmission is less than a threshold, CAT-1 is used; otherwise, CAT-2 is used.

TABLE X2

Combinations of start position & LBT type

|   | Offset X | LBT type | Option 1 | Option 2 | Option 3 | Option 4 |
|---|---|---|---|---|---|---|
| 1 | 0 | CAT-1 | x | x |   |   |
| 2 | 0 | CAT-2 with 25 us duration | x | x | x | x |
| 3 | 0 | CAT-4 | x | x | x | x |
| 4 | 1 or 2 symbols | CAT-2 with 25 us duration | x | x | x | x |
| 5 | 1 or 2 symbols | CAT-4 | x | x | x | x |
| 6 | 25 | CAT-2 with 25 us duration | x | x | x | x |
| 7 | 25 | CAT-4 | x | x |   |   |
| 8 | 16 + TA | CAT-1 | x |   | x |   |
| 9 | TA | CAT-2 with 25 us duration |   |   | x | x |
| 10 | TA | CAT-4 |   |   | x | x |
| 11 | 25 + TA | CAT-2 with 25 us duration |   | x |   | x |

In one embodiment, to reduce the signalling overhead, offset X=TA or the above special X could share a same indicator with another value of offset X. According to high layer signaling on RACH resource configuration, UE could know the potential time resources for RACH messages. Therefore, in a configured RACH resource, the UE could temporarily follow X=TA or the above special X if the UL transmission starts in a symbol potentially used by other UE to start the transmission of RACH msg1 or msgA. Otherwise, the UE could follow the above another value of offset X.

In one embodiment, among all possible combination of offset X and LBT types, higher layer signaling configures available candidates for a UE and gNB can indicate one of the configured candidates using reduced number of bits. The configuration can be different between UEs or same for all UEs. For example, if a gNB configures 8 candidates for a UE, gNB indicate one candidate using 3-bit signaling.

In one embodiment, LBT type, offset X (PUSCH starting offset), and channel access priority class (CAPC) value are signaled separately. For LBT type, CAT-1, CAT-2, CAT-4 are indicated. For CAPC, one of the values of 1 to 4 is indicated. For offset X, following options are possible.

Option 1: 0 us, 16 us+TA, 26 us, 25 us+TA

Option 2: 0 us, TA, 16 us+TA, 26 us, 25 us+TA Separate indication needs 2 bits for LBT type, 2 bits for CAPC, and 2 bits for offset X for option 1. Separate indication needs 2 bits for LBT type, 2 bits for CAPC, and 3 bits for offset X for option 2.

In one embodiment, all possible required combination of LBT type, offset X, and CAPC can be indexed in a table and the index is indicated by DCI for providing information of 3 parameters. One example of this embodiment is shown in table X3 and 3 bits are required for indication in this example.

TABLE X3

Combinations of start position, LBT type, and channel access prioirity class

| Index | LBT type | Offset X | CAPC |
|---|---|---|---|
| 0 | CAT-1 | 16us + TA | Not available |
| 1 | CAT-2 | 16us + TA | Not available |
| 2 | CAT-2 | 25us + TA | Not available |
| 3 | CAT-2 | 25us | Not available |
| 4 | CAT-4 | 0us | 1 |
| 5 | CAT-4 | 0us | 2 |
| 6 | CAT-4 | 0us | 3 |
| 7 | CAT-4 | 0us | 4 |

In one embodiment, all possible required combination of LBT type, offset X, and CAPC can be indexed in a table and the index is indicated by DCI for providing information of 3 parameters. One example of this embodiment is shown in table X3v2 and 4 bits are required for indication in this example.

TABLE X3v2

Combinations of start position, LBT type, and channel access prioirity class

| Index | LBT type | Offset X | CAPC |
|---|---|---|---|
| 0 | CAT-1 | 16us + TA | Not available |
| 1 | 16us CAT-2 | 16us + TA | Not available |
| 2 | 25us CAT-2 | 0 | Not available |
| 3 | 25us CAT-2 | 25us + TA | Not available |
| 4 | 25us CAT-2 | 25us | Not available |
| 5 | CAT-4 | 0us | 1 |
| 6 | CAT-4 | 0us | 2 |
| 7 | CAT-4 | 0us | 3 |
| 8 | CAT-4 | 0us | 4 |

If it is agreed that UL transmission with gaps less than 16 us with duration shorter than 584 us shall use CAT-1 LBT and CAT-2 LBT otherwise, Table X3v2 can be simplified to Table X3v3, shown below. In this case Index 0 and 1 in Table X3v2 are merged into Index 0.

TABLE X3v3

Combinations of start position, LBT type, and channel access prioirity class

| Index | LBT type | PUSCH Starting Position | CAPC |
|---|---|---|---|
| 0 | CAT-1 or 16us CAT-2 | 16us + TA | Not available |
| 1 | 25us CAT-2 | 0us | Not available |
| 2 | 25us CAT-2 | 25us + TA | Not available |
| 3 | 25us CAT-2 | 25us | Not available |
| 4 | CAT-4 | 0us | 1 |
| 5 | CAT-4 | 0us | 2 |
| 6 | CAT-4 | 0us | 3 |
| 7 | CAT-4 | 0us | 4 |

NOTE: For gap less than or equal to 16 us (e.g. Index 0), if UL transmission duration <584 us, CAT-1 LBT shall be used; otherwise, 16 us CAT-2 LBT shall be used.

In one embodiment, for two parameters out of LBT type, offset X, and CAPC, table is used and the remaining one parameter is signaled separately. For example, all possible required combination of LBT type and offset X can be indexed in a table and the index is indicated by DCI for providing information of 2 parameters and CAPC is signaled separately one example is shown in table X4.

TABLE X4

Combinations of start position and LBT type

| Index | LBT type | Offset X |
|---|---|---|
| 0 | CAT-1 | 16us + TA |
| 1 | CAT-2 | 16us + TA |
| 2 | CAT-2 | 25us + TA |
| 3 | CAT-2 | 25us |
| 4 | CAT-4 | 0us |
| 5 | reserved | reserved |
| 6 | reserved | reserved |
| 7 | reserved | reserved |

In another embodiment, the gNB can advertise a similar LBT type and Start Position for Msg3. Some bits from the RAR can be repurposed for this by keeping the total number of bits the same as 27. One example in which we use 3 bits from PUSCH frequency resource allocation is shown in Table X5. And the interpretation of LBT type/Start position is shown in Table X6.

TABLE X5

DL grant in RAR

| RAR grant field | Number of bits |
|---|---|
| Frequency Hopping Flag | 1 |
| LBT Type (CAT1, 16us CAT2, 25us CAT2, or CAT 4 LBT) + Start Position | 3 |
| PUSCH frequency resource allocation | 11 |
| PUSCH time resource allocation | 4 |
| MCS | 4 |
| TPC command for PUSCH | 3 |
| CSI Request | 1 |

TABLE X6

Interpretation of LBT type and start offset

| Index | LBT category | Start offset |
|---|---|---|
| 0 | CAT1 | 16 us + TA |
| 1 | 16us CAT2 | 16 us + TA |
| 2 | 25us CAT2 | 25 us + TA |
| 3 | 25us CAT2 | 25 |
| 4 | CAT4 | 0 |
| 5-7 | Reserved | Reserved |

In another embodiment, the gNB can advertise a similar LBT type and Start Position for Msg3. Some bits from the RAR can be repurposed for this by keeping the total number of bits 28, where the Reserved bit from MAC RAR is used to increase the total allocation from 27 to 28 bits and the CSI Request field bit has been repurposed. If it is agreed that UL transmission with gaps less than or equal to 16 us and duration shorter than 584 us shall use CAT-1 LBT and CAT-2 LBT otherwise, Table X5v2 can be used. If MAC RAR bit cannot be repurposed, the Frequency Hopping Flag bit could be repurposed so that TableX5v2 becomes Table X5v3.

TABLE X5v2

DL grant in RAR

| RAR grant field | Number of bits |
|---|---|
| Frequency Hopping Flag | 1 |
| LBT Type (CAT1, 16us CAT2, 25us CAT2, or CAT 4 LBT) + Start Position + CAPC | 3 |
| PUSCH frequency resource allocation | 13 |
| PUSCH time resource allocation | 4 |
| MCS | 4 |
| TPC command for PUSCH | 3 |

TABLE X5v3

DL grant in RAR

| RAR grant field | Number of bits |
|---|---|
| LBT Type (CAT1, 16us CAT2, 25us CAT2, or CAT 4 LBT) + Start Position + CAPC | 3 |

TABLE X5v3-continued

| DL grant in RAR | |
|---|---|
| RAR grant field | Number of bits |
| PUSCH frequency resource allocation | 13 |
| PUSCH time resource allocation | 4 |
| MCS | 4 |
| TPC command for PUSCH | 3 |

The interpretation of LBT type/Start position/CAPC is shown in Table X6v2.

TABLE X6v2

| | Interpretation of LBT type and start offset | | |
|---|---|---|---|
| Index | LBT type | Msg 3 Starting Position | CAPC |
| 0 | CAT-1 or 16us CAT-2 | 16us + TA | Not available |
| 1 | 25us CAT-2 | 0us | Not available |
| 2 | 25us CAT-2 | 25us | Not available |
| 3 | 25us CAT-2 | 25us + TA | Not available |
| 4 | CAT-4 | 0us | 1 |
| 5 | CAT-4 | 0us | 2 |
| 6 | CAT-4 | 0us | 3 |
| 7 | CAT-4 | 0us | 4 |

NOTE: For gap less than or equal to 16 us (e.g. Index 0), if UL transmission duration <584 us, CAT-1 LBT shall be used; otherwise, 16 us CAT-2 LBT.

If it is not agreed that UL transmission with gaps less than or equal to 16 us and duration shorter than 584 us shall use CAT-1 LBT and CAT-2 LBT otherwise, Table X5v3 can be used. The interpretation of LBT type/Start position is shown in Table X6v3.

TABLE X5v3

| DL grant in RAR | |
|---|---|
| RAR grant field | Number of bits |
| Frequency Hopping Flag | 1 |
| LBT Type (CAT1, 16us CAT2, 25us CAT2, or CAT 4 LBT) + Start Position + CAPC | 3 |
| PUSCH frequency resource allocation | 13 |
| PUSCH time resource allocation | 4 |
| MCS | 4 |
| TPC command for PUSCH | 3 |

TABLE X6v3

| | Interpretation of LBT type and start offset | | |
|---|---|---|---|
| Index | LBT type | Msg 3 Starting Position | CAPC |
| 0 | CAT-1 | 16us + TA | Not available |
| 1 | 16us CAT-2 | 16us + TA | Not available |
| 2 | 25us CAT-2 | 0us | Not available |
| 3 | 25us CAT-2 | 25us | Not available |
| 4 | 25us CAT-2 | 25us + TA | Not available |
| 5 | CAT-4 | 0us | 1 |
| 6 | CAT-4 | 0us | 2 |
| 7 | CAT-4 | 0us | 3 |

Figure 12:
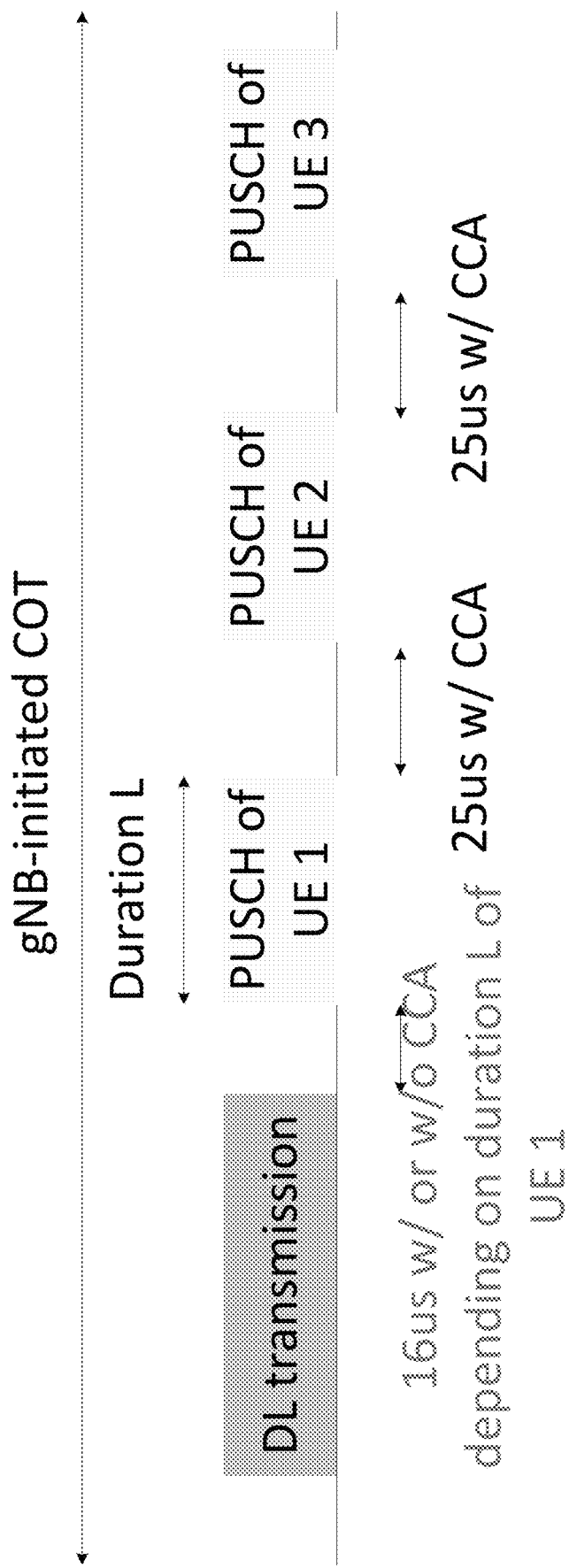
FIG. 12 illustrates applicable listen-before-talk (LBT) type for PUSCH, in accordance with various embodiments.

In one embodiment, gNB could schedule PUSCHs of multiple UEs with TDM resources. Depending on the duration L of PUSCH of the first UE which immediately follows DL transmission, e.g. UE 1 in FIG. 12, if L is less than a threshold, CAT-1 is used; otherwise, CAT-2 with 16 us duration is used. For all other UEs, e.g. UE 2 and UE 3 in FIG. 12, CAT-2 with 25 us duration is used.

From the above analysis, the start positions depend on reference symbol boundary. It could be "start of symbol k+offset X" or "start of symbol k-a+offset X, a=1 or 2 or 4". The start position could depend on PUSCH type A or B. The start positions could depend on SCS. A same solution could apply to all kind of UL transmissions, or the solution could be designed for each kind of UL transmission separately.

Scheme A: Start Position at or after the Start of Symbol k

In on embodiment, start position of PUSCH is determined as an offset X on symbol k, e.g. "start of symbol k+offset X". By this way, start position is at start of symbol k or after that. For PUSCH type A, k equals to 0, it is beneficial to limit potential values of X to be earlier than first DMRS symbol. For PUSCH type B, DMRS has to be shifted right after a start position. The shift of DMRS can be UE specific so that DMRS is the first whole UL symbol after start position. Alternatively, the shifted DMRS can be determined by the largest X to align DMRS timing in a cell.

For example, possible values of X are provided in Table 1. If 25 us CAT-2 LBT is indicated, UE could follow X=25 us or 25 us+TA; while if NO LBT is indicated, UE could follow X=16 us or 16 us+TA. Further, if 16 us CAT-2 LBT is appliable and indicated, UE could follow X=16 us or 16 us+TA. Alternatively, information on LBT type and information on start position could be jointly coded in a DCI. For SCS 15 kHz and PUSCH type A, it achieves the same behavior as LTE LAA. For SCS 15 kHz and PUSCH type B, DMRS symbol could be shifted right by at least one symbol. For SCS 30 kHz, it still could generate four start positions in single symbol with shorter reservation signal. For value X=25 us+TA, TA is UE's timing advance, the round trip delay could be about 10 us if limiting the start position in one symbol, which is sufficiently large for NR-U operation. For value X=16 us+TA, the supported round trip delay is even larger. Again, DMRS symbol could shifted right by at least one symbol for PUSCH type B. For SCS 60 kHz, at least 2 symbols are required to generate a gap for 25 us LBT. If X equals to 0, PUSCH can start from symbol k; if X equal to 16 us, PUSCH start from symbol k+1; if X equals to 16 us+TA, PUSCH may start from symbol k+1 or k+2 depending on TA; while for other start positions, PUSCH may start from symbol k+2. For PUSCH type B, DMRS symbol could be shifted right by one or two symbols depending on X, or always shifted right by 2 symbols.

TABLE 1

| Offset X determining start positions | | | | |
|---|---|---|---|---|
| 2-bit field | 00 | 01 | 10 | 11 |
| X | 0 | 25us (16us) | 25us + TA (16us + TA) | +1 symbol (15 kHz, 30 kHz) + 2 symbols (60 kHz) |

Alternatively, possible values of X are provided in Table 2. The interval between largest X and smallest X is fixed, e.g. equal to 1 symbol with 15 kHz SCS. For SCS 15 kHz and PUSCH type B, DMRS symbol could be shifted right by at least one symbol. For SCS 30 kHz, the largest X is of 2 symbols. For PUSCH type B, DMRS symbol could be shifted right by one or two symbols depending on X, or always shifted right by 2 symbols. For SCS 60 kHz, the largest X is of 4 symbols. For PUSCH type A, DMRS symbol could be shifted right by zero, one or two symbols depending on X, or always shifted right by 1 or 2 symbols. The shift of one symbol is to due to original DMRS position in symbol 3 for SCS 60 KHz. The shift of two symbol is to due to original DMRS position in symbol 2 for SCS 60 KHz. For PUSCH type B, DMRS symbol could be shifted right by two or four symbols depending on X, or always shifted right by 4 symbols.

TABLE 2

Offset X determining start positions

| 2-bit field | 00 | 01 | 10 | 11 |
|---|---|---|---|---|
| X | 0 | 25us (16us) | 25us + TA (16us + TA) | +1 symbol (15 kHz) + 2 symbols (30 kHz) + 4 symbols (60 kHz) |

Alternatively, possible values of X are provided in Table 3. For SCS 15 kHz and 30 kHz, the interval between largest X and smallest X is fixed to 1 symbol with 15 kHz SCS. The interval between largest X and smallest X is 2 symbols with 60 kHz SCS. It avoids impact to DMRS symbol position of PUSCH type A. For SCS 15 kHz and PUSCH type B, DMRS symbol could be shifted right by at least one symbol. For SCS 30 kHz, the largest X is of 2 symbols. SCS 30 kHz and PUSCH type B, DMRS symbol could be shifted right by one or two symbols depending on X, or always shifted right by 2 symbols

TABLE 3

Offset X determining start positions

| 2-bit field | 00 | 01 | 10 | 11 |
|---|---|---|---|---|
| X | 0 | 25us (16us) | 25us + TA (16us + TA) | +1 symbol (15 kHz) + 2 symbols (30 kHz) + 2 symbols (60 kHz) |

Alternatively, possible values of X could be provided in Table X0, Table X1, Table X2, Table X3 or Table X4. It avoids impact to DMRS symbol of PUSCH type A. For SCS 15 kHz or 30 kHz and for PUSCH type B, DMRS symbol could be shifted right by at least one symbol. For SCS 60 kHz, at least 2 symbols are required to generate a gap for 25 us LBT. If X equals to 0, PUSCH can start from symbol k; if X equals to TA or 16 us+TA, PUSCH may start from symbol k+1 or k+2 depending on value of TA; while for other start positions, PUSCH may start from symbol k+2. For PUSCH type B, DMRS symbol could be shifted right by one or two symbols depending on X, or always shifted right by 2 symbols.

Scheme B: Start Position No Later than the Start of Symbol k

In on embodiment, start position of PUSCH is determined as an offset X on symbol k−1 or k−2 or k−4, e.g. "start of symbol k−a+offset X, a=1 or 2 or 4". By this way, start position is no later than the start symbol of symbol k. The first whole symbol available for PUSCH could be symbol k. For PUSCH type B, the start positions are always no later than the start symbol of PUSCH so that DMRS symbol position is not changed.

For example, possible values of X are provided in Table 1. It is up to gNB scheduling to guarantee the period doing CCA before the start symbol of PUSCH. For PUSCH type B, X=0 is not used so that PUSCH can start from its first symbol k, not k−1 or k−2. For SCS 15 kHz and 30 kHz, a equal to 1 is used. For SCS 60 kHz, a equals to 2 is used if 25 us LBT is indicated. a could equal to 1 if NO LBT is indicated. If TA is relatively large, still a equal 2 is needed for NO LBT. Alternatively, a equals to 0 is used for X=0, so that the PUSCH starts from the beginning of symbol k.

Alternatively, possible values of X are provided in Table 4 for SCS 15 kHz and are provided in Table 1 for SCS 30 kHz and 60 kHz. By this way, each possible start position is respectively aligned for different SCS. It is up to gNB scheduling to guarantee the period doing CCA before the start symbol of PUSCH. For PUSCH type B, X=0 is not used so that PUSCH can start from its first symbol k, not k−1 or k−2. For SCS 15 kHz and 30 kHz, a equal to 1 is used. For SCS 60 kHz, a equals to 2 is used if 25 us LBT is indicated. a could equal to 1 if NO LBT is indicated. If TA is relatively large, still a equal 2 is needed for NO LBT. Alternatively, a equals to 0 is used for X=0, so that the PUSCH starts from the beginning of symbol k.

TABLE 4

Offset X determining start positions

| 2-bit field | 00 | 01 | 10 | 11 |
|---|---|---|---|---|
| X | 0 | Y + 25us* (Y + 16us*) | Y + 25us + TA* (Y + 16us + TA*) | +1 symbol |

*Y equals to length of 1 symbol with SCS 30 kHz

Alternatively, possible values of X are provided in Table 2. For SCS 15 kHz, a equal to 1; for SCS 30 kHz, a equals to 2; for SCS 60 kHz, a equals to 4. However, there could be a whole UL symbol before symbol k. such UL symbol could just transmit filling signal or the actual start symbol of PUSCH is shifted to the earliest whole UL symbol. Alternatively, the start positions resulting in whole UL symbol before symbol k is not applicable. Alternatively, a equals to 0 is used for X=0, so that the PUSCH starts from the beginning of symbol k.

Alternatively, possible values of X could be provided in Table X0, Table X1, Table X2, Table X3 or Table X4. It is up to gNB scheduling to guarantee the period doing CCA before the start symbol k of PUSCH. For SCS 15 kHz and 30 kHz, reference symbol boundary is the start of symbol k−1, e.g. a equal to 1. For SCS 60 kHz, reference symbol boundary is the start of symbol k−1, e.g. a equals to 1 for TA up to Y1 us for offset TA, or for TA up to Y2 us for offset 16+TA; otherwise, reference symbol boundary is the start of symbol k−2, e.g. a equals to 2. For example, Y1 could equal to length of one symbol, Y2 could equal to 'length of one symbol−16'. Alternatively, reference symbol boundary is the start of symbol k, e.g. a equals to 0 is used for X=0, so that the PUSCH starts from the beginning of symbol k.

Scheme C: Mixed Application of Scheme A and B

In one embodiment, for PUSCH type A, use the above embodiment determining start position as "start of symbol k+offset X", e.g. scheme A; while for PUSCH type B, use the above embodiment determining start position as "start of symbol k−a+offset X, a=1 or 2 or 4", e.g. scheme B.

In one embodiment, possible values of X are provided in Table 2. For PUSCH type A, a equal to 0 for SCS 15 kHz; a equal to 0 for SCS 30 kHz; a equal to 2 for SCS 60 kHz. For SCS 60 kHz, PUSCH will start from symbol k+2 with largest value X which is the earliest symbol for DMRS, hence no special handling on DMRS is needed. For SCS 60 kHz and X=0, the start symbol is k−2, filling signal could be transmitted, or X=0 is not applicable. For PUSCH type B, a equal to 1 for SCS 15 kHz, DMRS symbol position is not changed; a equal to 1 for SCS 30 kHz, PUSCH will start from symbol k+1 with largest value X, so DMRS symbol should be shifted right by 1 symbol; a equal to 2 for SCS 60 kHz, PUSCH will start from symbol k+2 with largest value X, so DMRS symbol should be shifted right by 2 symbols. For PUSCH type B, X=0 is not used so that PUSCH can start from its first symbol k at earliest.

Special X Meaning Following DL Reception Timing

Figure 9:
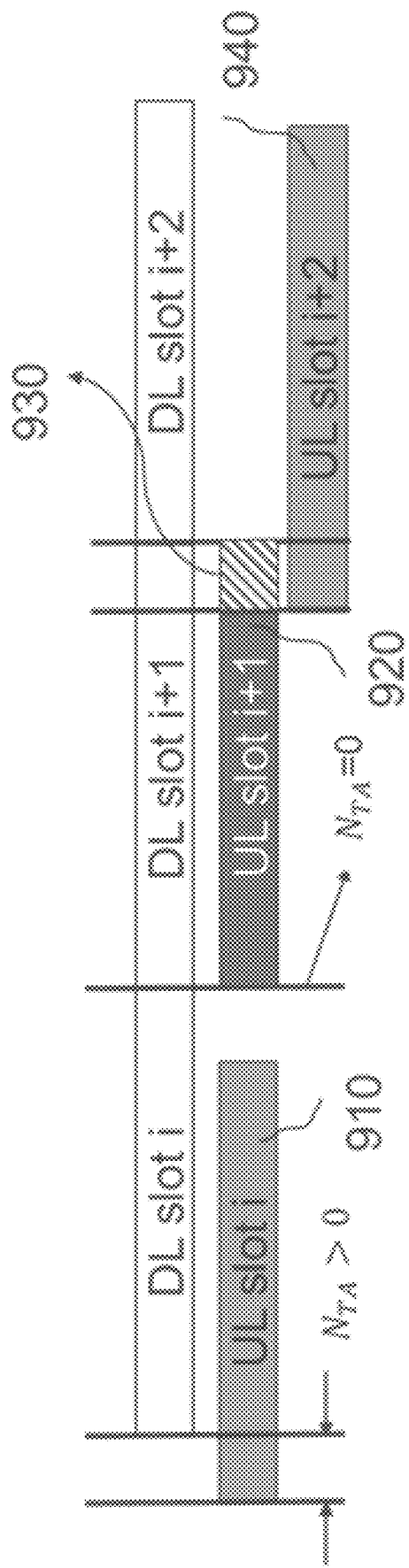
FIG. 9 is a diagram of slot-type-dependent TA value determination for PUSCH, in accordance with various embodiments.

According to certain aspects of this present disclosure, different timing advance values $N_{TA}$ may be applied for different UL slot for PUSCH transmissions depending on whether there is PRACH resource configured in the same slot or not. More specifically, $N_{TA}=0$ (e.g. with a same start time of the corresponding DL slot) can be used for the UL slot with PRACH resource and an accumulated TA value $N_{TA}$ may be applied for other UL slot without PRACH resource. This mitigates the problem of PRACH transmissions blocking by the concurrent PUSCH(s) in a same slot considering the fact that the earlier transmission of PUSCH with $N_{TA}>0$ would block the PRACH transmission due to LBT operation. FIG. 9 gives one example of slot-type-dependent $N_{TA}$ determination for PUSCH transmission. In UL slot 910 and 940 in FIG. 9, the accumulative TA value $N_{TA}>0$ is used as there is no PRACH resource in this slot. While, $N_{TA}=0$ should be used for PUSCH transmission in the slot 920 to avoid blocking potential PRACH transmissions. In some examples, to avoid the inference to the PUSCH transmission in the subsequent slot 940, the last X symbols in the slot 930 may be punctured for UL-SCH symbol mapping. The exact value of X may be determined based on the accumulative TA value $N_{TA}>0$ or be fixed in specification.

Figure 10:
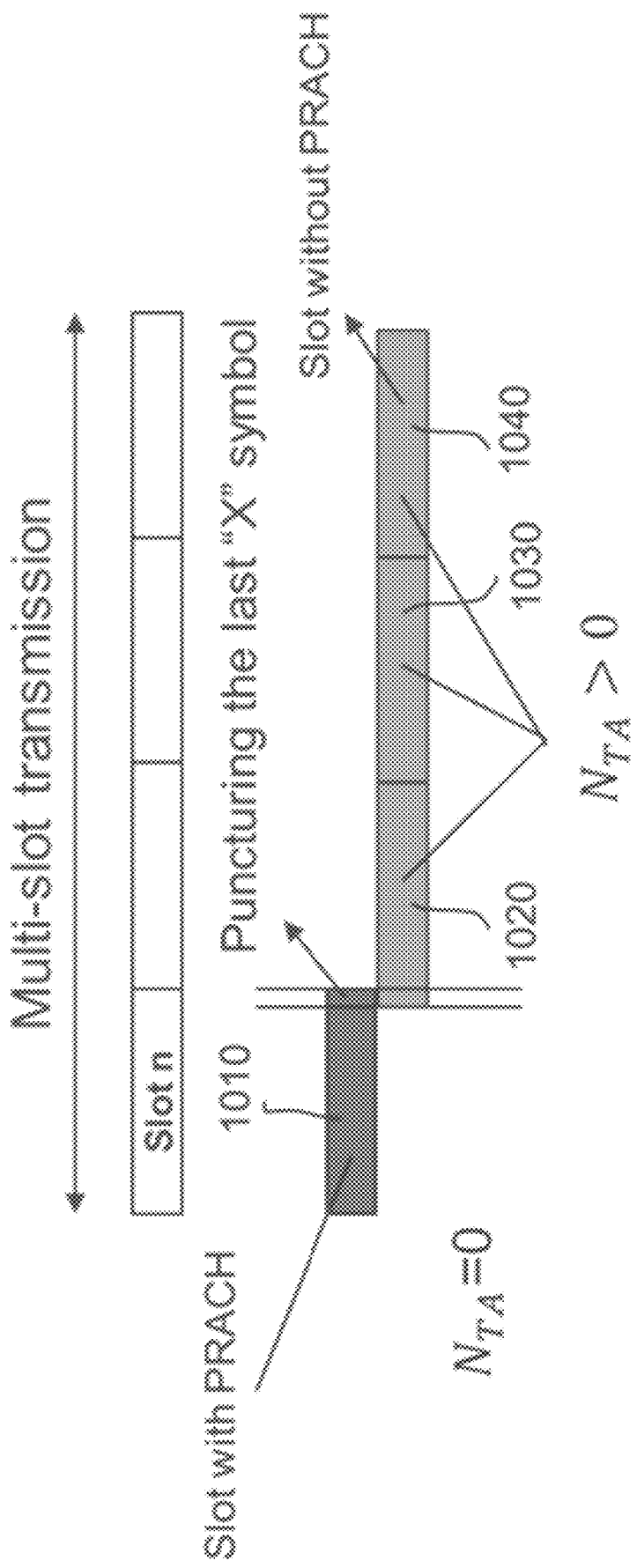
FIG. 10 is a diagram of TA value determination for multi-slot PUSCH transmissions, in accordance with various embodiments.

More consideration is needed for multi-slots PUSCH transmission, where UL transmissions span across multiple consecutive slots. Referring to FIG. 10 below, in some designs the $N_{TA}=0$ may be only applied to slot(s) 1010 with PRACH resources but the normal accumulative $N_{TA}>0$ should be used in other UL slots 1020~1040 without PRACH resources so as to maintain the orthogonality of PUSCHs from different UEs in the subsequent slots at network side.

Figure 11:
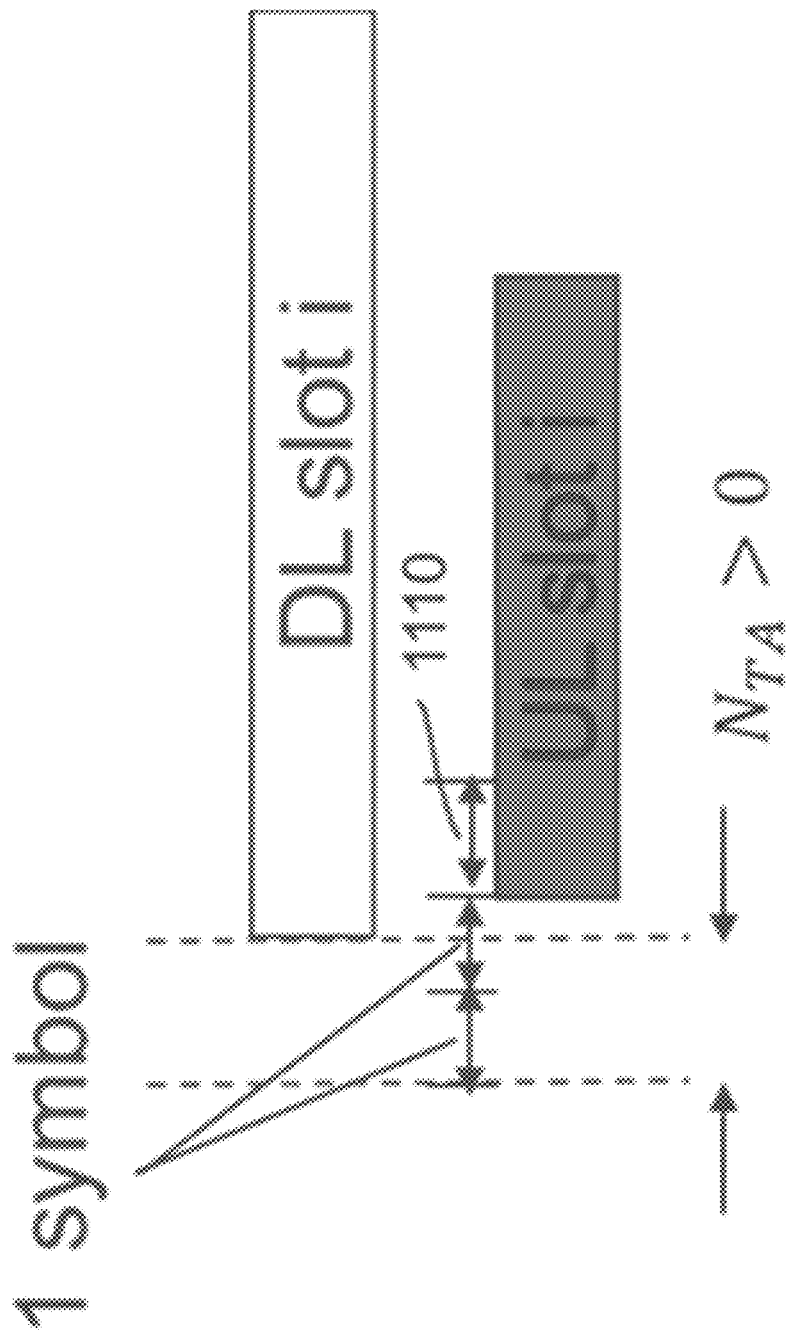
FIG. 11 is a PUSCH transmissions timing determination depending on the physical random access channel (PRACH) resource, in accordance with various embodiments.

Using $N_{TA}=0$ for PUSCH transmission in the UL slot with PRACH resource may destroy the orthogonality property of PUSCH reception from different UEs at the gNB receiver and results in UL throughput loss. To keep the orthogonality of PUSCH across UEs and still avoid PRACH transmission blocking issue, UE may start UL-SCH symbols transmission from the first symbol after the start of the corresponding DL slot at the UE assuming $N_{TA}>0$ is used. With this approach, the uplink transmission starting from the symbol 1110 in FIG. 11 is still time aligned with other UL transmissions received by the gNB. It should be noted that the encoded UL-SCH symbols should start mapping from the symbol 1110 to avoid any puncturing on systematic bits.

Handling Start Positions with Offset X=TA or 16 Us+TA

As described in above section on "start positions of UL transmissions", the start positions of a UL transmission could be generally expresses as 'reference symbol boundary+X us'. The above reference symbol boundary could be indicated by gNB or interpreted based on gNB's scheduling information and it can be the start of OS k if start position of the UL transmission scheduled by gNB is at or after the start of symbol k. The beginning X us of the UL transmission can be punctured. Alternatively, the above reference symbol boundary could be the start of OS k−1 or OS k−2 if start position of the UL transmission scheduled by gNB is no later than the start of symbol k. Padding signal, e.g. CP extension of OS k could be transmitted before OS k. The start positions could depend on PUSCH type A or B. the start positions could depend on SCS.

In uplink transmission, TA is applied so that UL transmissions from different UEs could be aligned at gNB side. TA could consist of two parts, e.g. TA=TA0+d. TA0 is common to all UEs. For example, gNB could make a gap for UL-to-DL switching time by setting a relatively larger TA. TA0 could equal to the UL-to-DL switching time. Value d is UE specific value. E.g. d is depending on UE's location in the cell coverage. Value d could be related to round trip delay between gNB and UE. Due to the potential misunderstanding on exact TA value between gNB and UE, an offset X related to TA, e.g. X=TA or X=16 us+TA may result in confusion on rate matching and RE mapping of UL transmission under certain conditions.

Taking SCS 60 kHz as example. For a small TA, the offset X=16+TA is still less than one symbol, hence the beginning part of one symbol is punctured. For a large TA, the duration of 16 us+TA corresponds to more than one symbol but less than 2 symbols, both the first symbol and the beginning part of the second symbol are punctured. However, due to the potential misunderstanding on exact TA value between gNB and UE, for a TA around 1.8 us, gNB and UE may have different understanding whether one or two symbols are punctured, which impacts the rate matching and mapping of a UL transmission. It may also impact the DMRS position of the UL transmission, especially for PUSCH type B. Similarly, there could exist confusion between gNB and UE for a TA of about one symbol for offset X=TA. If TA is about 'one symbol with SCS 30 kHz-16 us', offset 16+TA may result in confusion for SCS 30 kHz too.

Denote the largest allowed gap between DL signal and UL signal as Gmax in the operation of LBT CAT-1, e.g. Gmax is 16 us by regulation. Denote the minimum allowed gap between DL signal and UL signal as Gmin in the operation of LBT CAT-1. Gmin could be as small as 0 us if UE doesn't need to receive that last part of DL signal. Alternatively, Gmin needs to be larger than a threshold, e.g. the threshold could be related to DL-to-UL switching time. It is not restricted in this disclosure regarding the value of Gmin.

Case A: According to a reference symbol boundary and offset X indicated by gNB, UE is responsible to make a gap between DL signal and UL signal within the range of [Gmin, Gmax].

In one embodiment, denote reference symbol boundary as the start of OS k. A start position is generated at or after the start of symbol k. UE could assume OS k−1 is a full DL symbol. Denote the first full UL symbol as OS k+b, the length of one symbol as L. Value b is predefined, high layer configured or could be derived by other parameters. UE transmits CP extension if necessary to make the gap between DL signal and UL signal no larger than Gmax. If floor(X/L)==b−1, UE could transmit a signal with length mod(L-X, L) before OS k+b, so that gap between DL signal and UL signal is Gmax. Otherwise, if floor(X/L)==b && mod(X, L)<Gmax-Gmin, UE could still transmit UL transmission starting from OS k+b, which results in a reduced gap between DL signal and UL signal of Gmax-mod(X, L).

Figure 6:
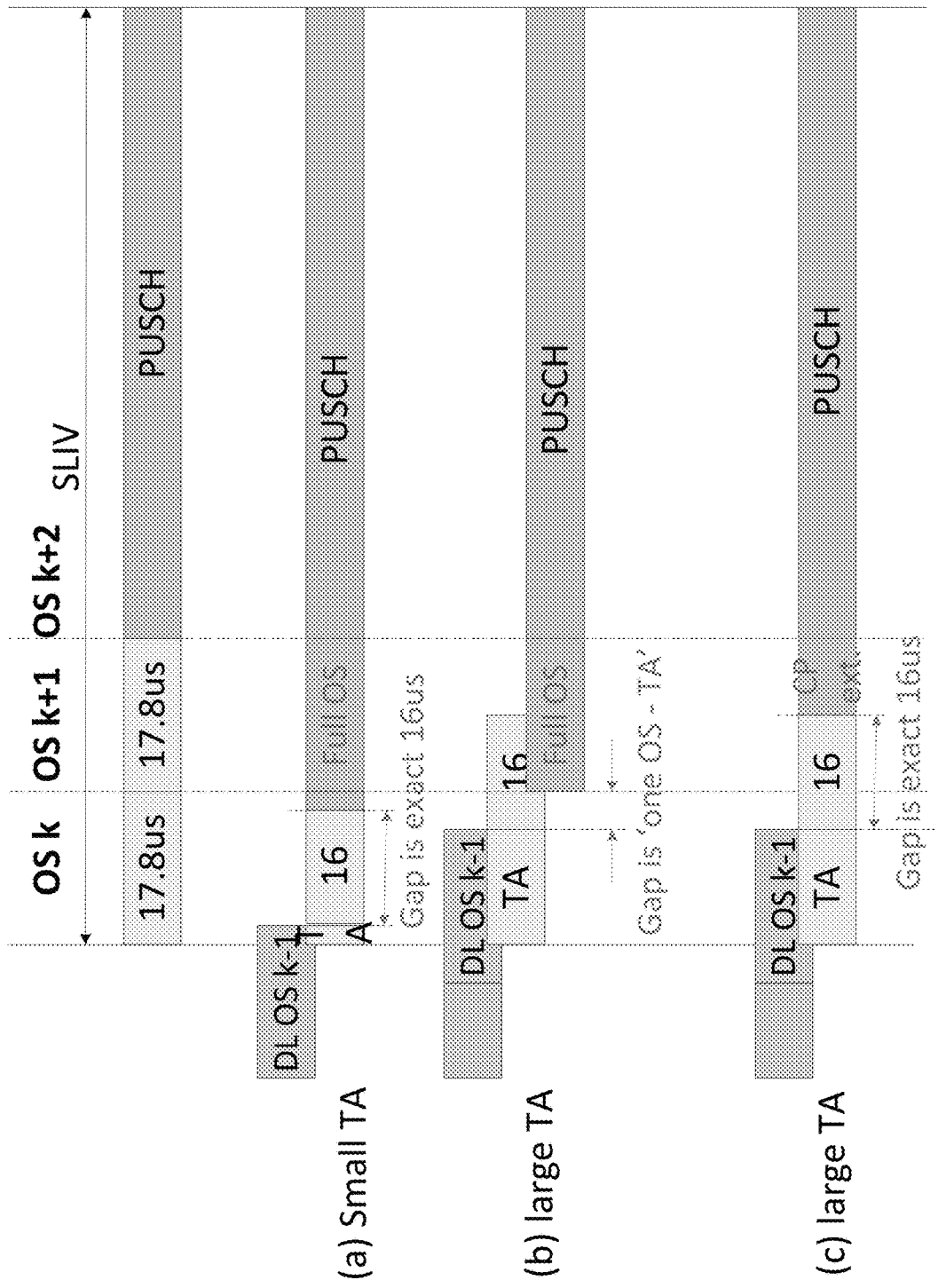
FIG. 6 illustrates handling of offset X=16 μs+Timing Advance (TA) with start position no earlier than OFDM symbol (OS) k, in accordance with various embodiments.

As shown in FIGS. 6a and 6b, assuming b equal to 1, the first full symbol for PUSCH is always OS k+1. OS k−1 is a full DL symbol. In FIG. 6a, for a small TA, the offset X=16+TA is still less than one symbol, the remaining part in OS k with length 'one OS−X' could be CP extension of OS k+1. FIG. 6b, for a large TA, the offset X=16+TA is longer than one symbol, UE still transmit a full OS k+1 which reduces the gap to 'one OS-TA'.

In one embodiment, let reference symbol boundary as the start of OS k, gNB could set a proper value of TA0, so that there is no confusion on first full UL symbol in the whole potential range of TA=TA0+d. Assuming d is in [0, D], e.g. for a small cell up to radius 300 meters, D is about 2 us for round trip delay. Assuming TA0 is set of 13 us for UL-DL switching time, the range of TA is in [13, 15]. The offset X=16+TA is in [29, 31] us which overlaps with OS k+1. As shown in FIG. 6c, UE could always generate a gap of 16 us between DL signal and UL signal, and transmit the first full OS in OS k+2. The offset X=TA is overlapped with OS k, UE could always transmit the first full OS in OS k+1.

In one embodiment, denote the first full UL symbol as OS k, the length of one symbol as L. A start position is generated no later than the start of symbol k. Let reference symbol boundary as the start of OS k-b, UE could assume OS k-b-1 is a DL symbol. Value b is predefind, high layer configured or could be derived by other parameters. UE transmits CP extension if necessary to make the gap between DL signal and UL signal no larger than Gmax. If floor(X/L)==b-1, UE could transmit a signal with length mod(L-X, L) before OS k, so that gap between DL signal and UL signal is Gmax. Otherwise, if floor(X/L)==b && mod(X, L)<Gmax-Gmin, UE could transmit UL transmission starting from OS k, which results in a reduced gap between DL signal and UL signal of Gmax-mod(X, L).

Figure 7:
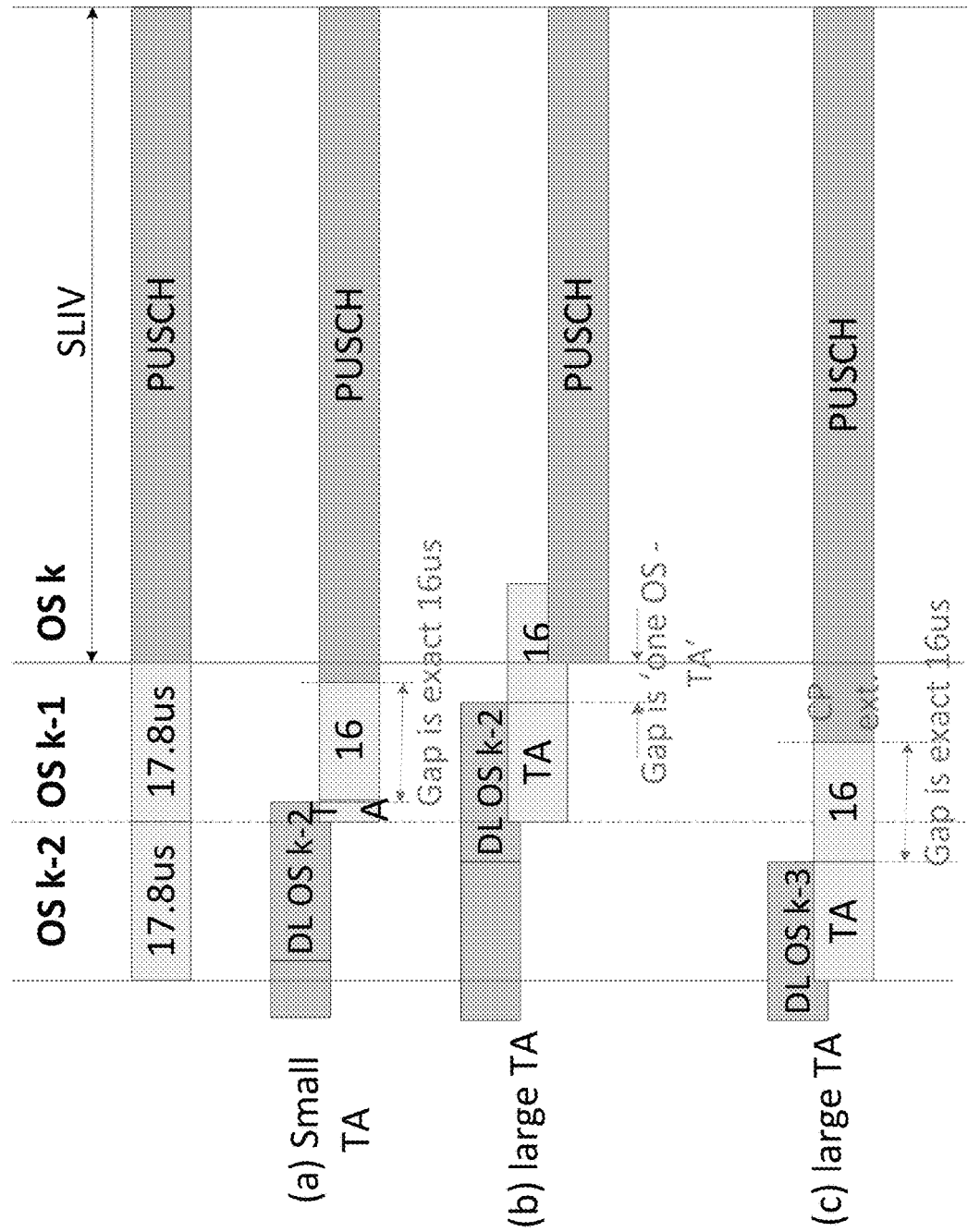
FIG. 7 illustrates handling of offset X=16 μs+TA with start position no later than OS k, in accordance with various embodiments.

As shown in FIGS. 7a and 7b, assuming b equal to 1, reference symbol boundary is the start of OS k-1. OS k-2 is a full DL symbol. In FIG. 7a, for a small TA, the offset X=16+TA is still less than one symbol, the remaining part in OS k-1 with length 'one OS-X' could be CP extension of OS k. FIG. 7b, for a large TA, the offset X=16+TA is longer than one symbol, UE still transmit a full OS k which reduce the gap to 'one OS-TA'.

In one embodiment, let first full UL symbol is OS k, gNB could set a proper value of TA0, so that there is no confusion on reference symbol boundary in the whole potential range of TA=TA0+d. Assuming d is in [0, D], e.g. for a small cell up to radius 300 meters, D is about 2 us for round trip delay. Assuming TA0 is set of 13 us for UL-DL switching time, the range of TA is in [13, 15]. The offset X=16+TA is in [29, 31] us. A fixed reference symbol boundary is derived as OS k-2. OS k-3 is a full DL symbol. Therefore, offset X=16+TA always overlap with OS k-1. As shown in FIG. 7c, UE could always generate a gap of 16 us between DL signal and UL signal, and transmit the first full OS in OS k. For the offset X=TA, a fixed reference symbol boundary is derived as OS k-1. The offset X=TA always overlap with OS k-1. UE could always transmit the first full OS in OS k.

Case B: gNB is responsible to make a gap between DL signal and UL signal within the range of [Gmin, Gmax] and UE always start UL transmission with full OS k.

Denote the length of one symbol as L. gNB could transmit a last full DL OS k-b-1. Value b is predefined, high layer configured or could be derived by other parameters. Value b could be up to gNB implementation. gNB could transmit certain padding signal, e.g. cyclic postfix extension of OS k-b-1 if necessary to make the gap between DL signal and UL signal no larger than Gmax. Denote Z=Gmax+TA, which is the length that a DL transmission should be reduced to make a gap of Gmax between DL signal and UL signal. If floor(Z/L)==b-1, gNB could transmit a signal with length mod(L-Z, L) after OS k-b-1, so that gap between DL signal and UL signal is Gmax. Otherwise, if floor(Z/L)==b && mod(Z, L)<Gmax-Gmin, gNB could still stop DL transmission after OS k-b-1, which results in a reduce gap between DL signal and UL signal of Gmax-mod(Z, L).

Figure 8:
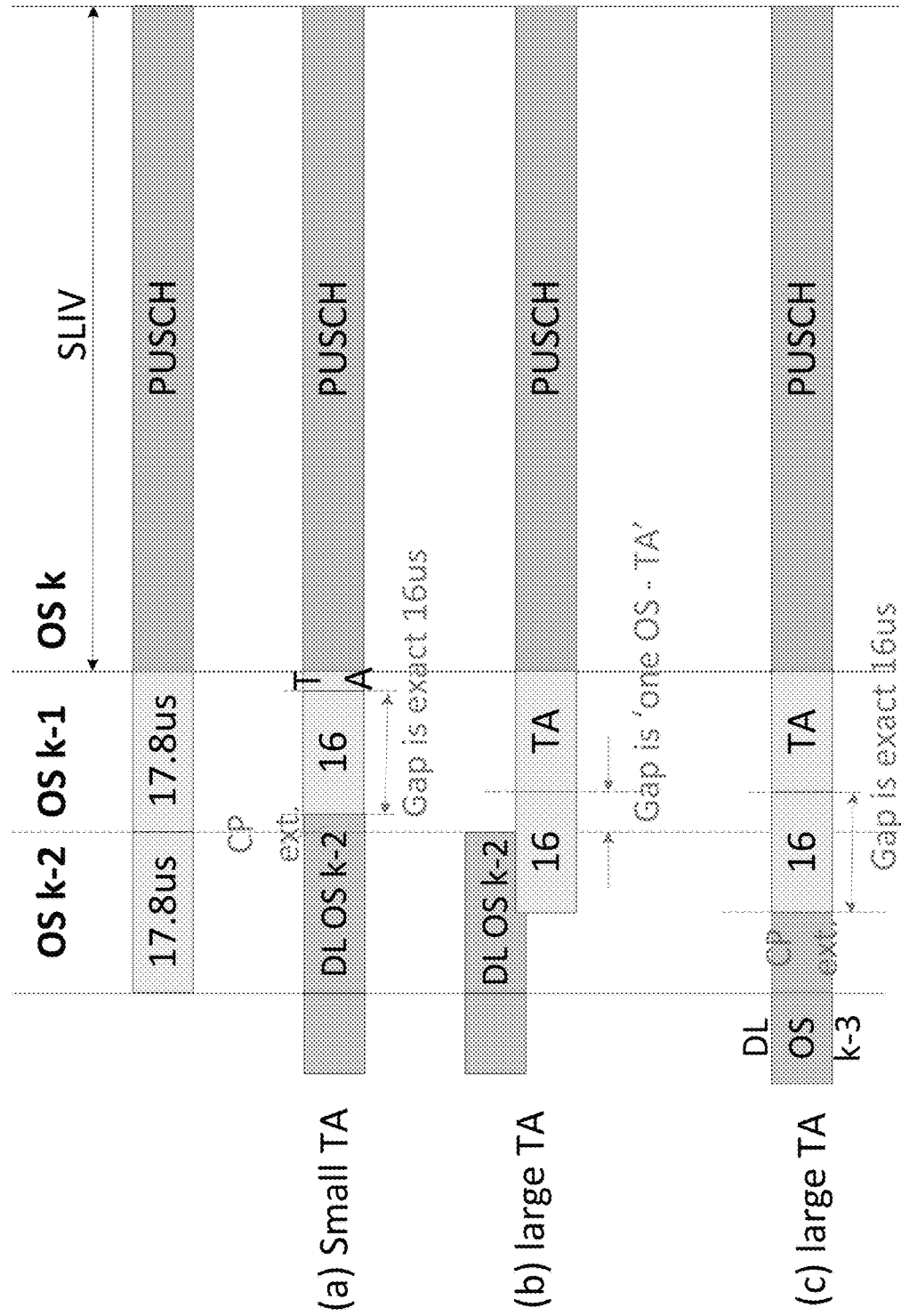
FIG. 8 illustrates handling of offset X=16 μs+TA with start position fixed to OS k, in accordance with various embodiments.

As shown in FIGS. 8a and 8b, assuming b equal to 1, gNB could transmit a last full DL OS k-2. In FIG. 7a, for a small TA, Z=16+TA is still less than one symbol, gNB transmit a pading signal of cyclic postfix extension after OS k-2 with length 'one OS-Z'. FIG. 7b, for a large TA, the offset Z=16+TA is longer than one symbol, gNB still transmit a full DL OS k-2 which reduce the gap to 'one OS-TA'.

In one embodiment, let first full UL symbol is OS k, gNB could set a proper value of TA0, so that there is no confusion on last full DL symbol in the whole potential range of TA=TA0+d. Assuming d is in [0, D], e.g. for a small cell up to radius 300 meters, D is about 2 us for round trip delay. Assuming TA0 is set of 13 us for UL-DL switching time, the range of TA is in [13, 15]. Z=16+TA is in [29, 31] us. A fixed last full DL symbol is derived as OS k-3. As shown in FIG. 7c, gNB transmits a padding signal of cyclic postfix extension after OS k-3, generate a gap of 16 us between DL signal and UL signal so that UE always transmit UL transmission from full UL OS k.

Start Positions of CG PUSCH

As described in above section on "start positions of UL transmissions", the start positions of a UL transmission could be generally expresses as 'reference symbol boundary+X us'. The above reference symbol boundary could be indicated by gNB or interpreted based on gNB's scheduling information and it can be the start of OS k if start position of the UL transmission scheduled by gNB is at or after the start of symbol k. The beginning X us of the UL transmission can be punctured. Alternatively, the above reference symbol boundary could be the start of OS k-1 or OS k-2 if start position of the UL transmission scheduled by gNB is no later than the start of symbol k. Padding signal, e.g. CP extension of OS k could be transmitted before OS k. The start position could depend on PUSCH type A or B. the start positions could depend on SCS. In this section, potential values of offset X are provided for CG PUSCH.

In one embodiment, the potential start positions are generated within 1 or 2 symbols. If CG PUSCH occupies full bandwidth and is outside a gNB-initiated COT, potential start positions are generated within 1 symbol for SCS 15 kHz and 30 kHz, and within 2 symbols for SCS 60 kHz. For SCS 15 kHz, offset X could be 16 us, 25 us, 34 us, 43 us, 52 us, 61 us, 1 symbol; For SCS 30 kHz, offset X could be 16, 25, 1 symbol; For SCS 60 kHz, offset X could be 16, 25, 2 symbols. Alternatively, for SCS 60 kHz, offset X could be fixed to 2 symbols. If CG PUSCH occupies full bandwidth and is inside a gNB-initiated COT, only those start positions with X larger than 25 us are supported. For SCS 15 kHz, offset X could be 34, 43, 52, 61, 1 symbol; For SCS 30 kHz, offset X could be 1 symbol; For SCS 60 kHz, offset X could be 2 symbols. if PUSCH type B, offset X for SCS 30 kHz and 60 kHz could make it just start from the its first symbol of PUSCH. Alternatively, only those start positions with X larger than 16 us are supported since GB PUSCH could be prioritizely scheduled with NO LBT. If CG PUSCH occupies not all interlaces of frequency resources, exact value X can be high layer configured.

In on embodiment, the potential start positions are always generated within 1 symbol duration of SCS 15 kHz. If CG PUSCH occupies full bandwidth and is outside a gNB-initiated COT, potential start position offset X within 1 symbol for SCS 15 kHz could be 16, 25, 34, 43, 52, 61, 1 symbol. The same X values apply to SCS 30 kHz and 60 kHz as well. If CG PUSCH occupies full bandwidth and is inside a gNB-initiated COT, only those start positions with X larger than 25 us are supported, e.g., offset X could be 34, 43, 52, 61, 1 symbol. Alternatively, only those start positions with X larger than 16 us are supported since GB PUSCH could be prioritizely scheduled with NO LBT, e.g., offset X could be 25, 34, 43, 52, 61, 1 symbol. If CG PUSCH occupies not all interlaces of frequency resources, exact value X can be high layer configured.

In one embodiment, for 15 KHz subcarrier spacing and for CG PUSCH occupying full bandwidth or partial bandwidth and performing transmission outside the gNB's COT, the following starting positions are allowed: 16, 25, 34, 43, 52, 61, 1 symbol. For 30 KHz subcarrier spacing and for CG PUSCH occupying full bandwidth or partial bandwidth and performing transmission outside the gNB's COT, the following starting positions are allowed: 16, 25, 1 symbol. For 60 KHz subcarrier spacing and for CG PUSCH occupying full bandwidth or partial bandwidth and performing transmission inside the gNB's COT, the first N symbols can be used as a starting position starting from the 2nd symbol. N is predefined or configured by RRC signaling.

In one embodiment, for 15 KHz subcarrier spacing and for CG PUSCH occupying full bandwidth or partial bandwidth and performing transmission inside of the gNB's COT, the following starting positions are allowed: 34, 43, 52, 61, 1 symbol. For 30 KHz subcarrier spacing and for CG PUSCH occupying full bandwidth or partial bandwidth and performing transmission inside the gNB's COT, the following starting positions are allowed: 1st symbol+16 us, 1st symbol+25 us, 2nd symbol. For 60 KHz subcarrier spacing and for CG PUSCH occupying full bandwidth or partial bandwidth and performing transmission inside the gNB's COT, the first N symbols can be used as a starting position starting from the 2nd symbol. N is predefined or configured by RRC signaling.

In one embodiment, for SCS 15 KHz subcarrier spacing and CG PUSCH occupying full bandwidth or partial bandwidth, the following starting positions are allowed:
  outside the gNB's MCOT:{16, 25, 34, 43, 52, 61, OS #1}
  Inside the gNb's MCOT: {34, 43, 52, 61, OS #1}.

For SCS 30 KHz, the same offset as for SCS 15 KHz are reused, and they extend over two OFDM symbols:
  a. outside the gNB's MCOT:{16, 25, 34, 43, 52, 61, OS #2}
  b. Inside the gNb's MCOT: {34, 43, 52, 61, OS #2}.

For SCS 60 KHz, the same offset as for SCS 15 KHz are reused up to two OFDM symbols:
  a. outside the gNB's MCOT: {16, 25, 34, OS #2}. Alternatively, since 34 us is almost same as the duration of 2 symbols, the offsets could be {16, 25, OS #2}.
  b. Inside the gNb's MCOT: {34, OS #2}. Alternatively, the offsets could be {OS #2}.

For SCS 30 kHz and 60 kHz, the UCI for CG carters indication on whether the first two symbols are used throughout two bits, which indicate: i) whether the CG data transmission starts from symbol #0; ii) whether the CG data transmission starts from symbol #1, iii) or whether the CG data transmission starts from symbol #2. For example, "00"→SCH-UL starts from symbol 0; "01"→SCH-UL starts from symbol 1; "10"→SCH-UL starts from symbol 2; "11"→reserved.

In one embodiment, one table of SLIV is configured for potential time domain resources. For a GB PUSCH, UE just follows the start symbol indicated by each row of the table as start symbol of GB PUSCH. While for CG PUSCH, an additional offset b is added to the start symbol indicated by a row of the table. E.g. start symbol is indicated as k by a row, then start symbol of CG PUSCH is exactly symbol k+b. by this way, even the same set of start position offset X is used, it still gives GB PUSCH the priority over CG PUSCH. In one embodiment, a separated table of SLIV could configured CG PUSCH from GB PUSCH. By this way, it is possible to manage the SLIV in the table for CG PUSCH make it is lower prioritized than GB PUSCH.

In one embodiment, within a gNB-initiated shared COT, NO LBT could be indicated in DCI for GB PUSCH, however, only 25 us LBT is used for CG PUSCH if CG PUSCH inside COT is allowed. This method gives priority to GB PUSCH. Once GB PUSCH is not transmitted or the signal of GB PUSCH is not strong enough to make CCA of CG PUSCH fails, CG PUSCH can still be transmitted.

Insert One or Multiple Pauses in gNB-Initiated COT Sharing

According to the ETSI BRAN regulation, it is allowed to include one or multiple pauses with minimum duration of 100 us in a gNB-initiated COT. Such pauses are not counted towards the duration of COT.

"NOTE 1: The maximum Channel Occupancy Time (COT) of 6 ms may be increased to 8 ms by inserting one or more pauses. The minimum duration of a pause shall be 100 μs. The maximum duration (Channel Occupancy) before including any such pause shall be 6 ms. Pause duration is not included in the channel occupancy time."

If gNB schedules multiple PUSCHs for multiple UEs in a contiguous manner, it may happen that one UE may fail LBT so that there is a gap between DL and UL, or between UL transmissions of different UEs. If a PUSCH duration for which the LBT procedure has failed is shorter than 100 us, this unintentional gap left by the unperformed PUSCH cannot be considered as a pause, which reduces the effective time for UL transmission, since the following UL transmissions can no longer be performed. In order to overcome this problem, in one embodiment, the gNB can enforce that a PUSCH transmission performed within the associated gNB's initiated COT must be always larger than 100 us. Alternatively, it could enforce that a PUSCH transmission including CP extension depending on indicated PUSCH start position must be larger than 100 us. In one embodiment, if the gNB has to schedule within its initiated COT some UL transmissions which are shorter than 100 us, taking advantage of the fact that MCOT can not be elongated further of 2 ms, then the gNB leaves intentionally before DL to UL switching a gap of at least 100 us, or right before the start of the first PUSCH transmissions which is shorted than 100 us, and would schedule PUSCH transmissions so that they would be bounded within a 8 ms MCOT rather than a 6 ms MCOT.

One embodiment is that the gNB only schedules PUSCH which is larger than 100 us inside a gNB-initiated COT (using CAT2 or CAT1) in order to guarantee that the possible gap is larger than 100 us if PUSCH is not transmitted due to LBT failure or any other reason. For example, if 15 KHz SCS is used, than a symbol is about 70 us so that 1 symbol PUSCH is not allowed to be scheduled inside a gNB-initiated COT. If 30 KHz SCS is used, 1 or 2 symbol PUSCHs are not allowed to be scheduled inside a gNB-initiated COT. If 60 KHz SCS is used, 1/2/3/4/5 symbol PUSCHs are not allowed to be scheduled inside a gNB-initiated COT.

Systems and Implementations

Figure 13:
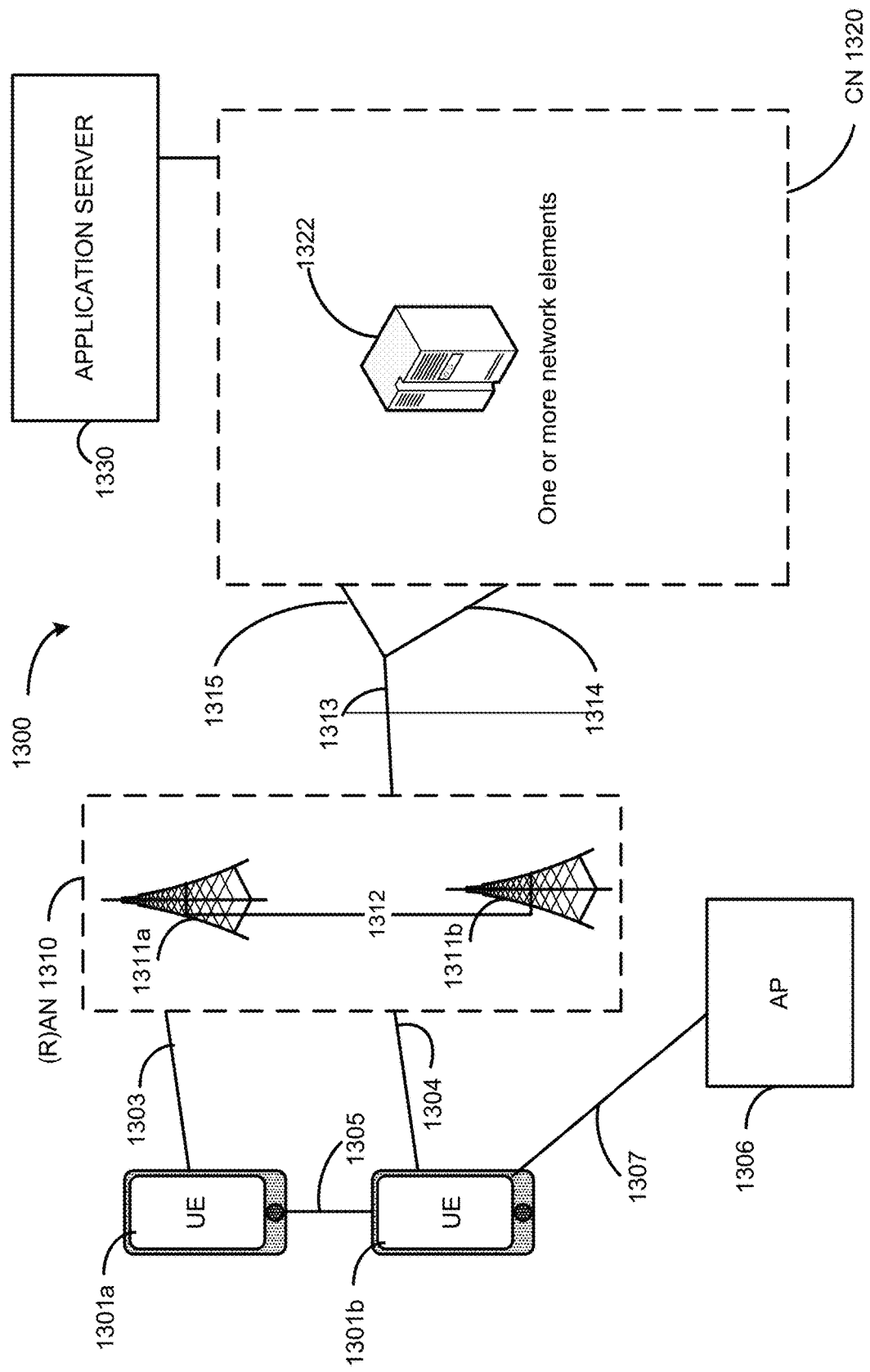
FIG. 13 illustrates an example architecture of a system of a network, in accordance with various embodiments.

FIG. 13 illustrates an example architecture of a system 1300 of a network, in accordance with various embodiments. The following description is provided for an example system 1300 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 13, the system 1300 includes UE 1301a and UE 1301b (collectively referred to as "UEs 1301" or "UE 1301"). In this example, UEs 1301 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 1301 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1301 may be configured to connect, for example, communicatively couple, with an or RAN 1310. In embodiments, the RAN 1310 may be an NG RAN or a 5G RAN, an E-UTRAN, or a legacy RAN, such as a UTRAN or GERAN. As used herein, the term "NG RAN" or the like may refer to a RAN 1310 that operates in an NR or 5G system 1300, and the term "E-UTRAN" or the like may refer to a RAN 1310 that operates in an LTE or 4G system 1300. The UEs 1301 utilize connections (or channels) 1303 and 1304, respectively, each of which comprises a physical communications interface or layer (discussed in further detail below).

In this example, the connections 1303 and 1304 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 1301 may directly exchange communication data via a ProSe interface 1305. The ProSe interface 1305 may alternatively be referred to as a SL interface 1305 and may comprise one or more logical channels, including but not limited to a PSCCH, a PSSCH, a PSDCH, and a PSBCH.

The UE 1301b is shown to be configured to access an AP 1306 (also referred to as "WLAN node 1306," "WLAN 1306," "WLAN Termination 1306," "WT 1306" or the like) via connection 1307. The connection 1307 can comprise a local wireless connection, such as a connection consistent with any IEEE 802.11 protocol, wherein the AP 1306 would comprise a wireless fidelity (Wi-Fi®) router. In this example, the AP 1306 is shown to be connected to the Internet without connecting to the core network of the wireless system (described in further detail below). In various embodiments, the UE 1301b, RAN 1310, and AP 1306 may be configured to utilize LWA operation and/or LWIP operation. The LWA operation may involve the UE 1301b in RRC CONNECTED being configured by a RAN node 1311a-b to utilize radio resources of LTE and WLAN. LWIP operation may involve the UE 1301b using WLAN radio resources (e.g., connection 1307) via IPsec protocol tunneling to authenticate and encrypt packets (e.g., IP packets) sent over the connection 1307. IPsec tunneling may include encapsulating the entirety of original IP packets and adding a new packet header, thereby protecting the original header of the IP packets.

The RAN 1310 can include one or more AN nodes or RAN nodes 1311a and 1311b (collectively referred to as "RAN nodes 1311" or "RAN node 1311") that enable the connections 1303 and 1304. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 1311 that operates in an NR or 5G system 1300 (for example, a gNB), and the term "E-UTRAN node" or the like may refer to a RAN node 1311 that operates in an LTE or 4G system 1300 (e.g., an eNB). According to various embodiments, the RAN nodes 1311 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 1311 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 1311; a MAC/PHY split wherein RRC, PDCP, RLC, and MAC layers are operated by the CRAN/vBBUP and the PHY layer is operated by individual RAN nodes 1311; or a "lower PHY" split wherein RRC, PDCP, RLC, MAC layers and upper portions of the PHY layer are operated by the CRAN/vBBUP and lower portions of the PHY layer are operated by individual RAN nodes 1311. This virtualized framework allows the freed-up processor cores of the RAN nodes 1311 to perform other virtualized applications. In some implementations, an individual RAN node 1311 may represent individual gNB-DUs that are connected to a gNB-CU via individual F1 interfaces (not shown by FIG. 13). In these implementations, the gNB-DUs may include one or more remote radio heads or RFEMs (see, e.g., FIG. 14), and the gNB-CU may be operated by a server that is located in the RAN 1310 (not shown) or by a server pool in a similar manner as the CRAN/vBBUP. Additionally or alternatively, one or more of the RAN nodes 1311 may be next generation eNBs (ng-eNBs), which are RAN nodes that provide E-UTRA user plane and control plane protocol terminations toward the UEs 1301, and are connected to a 5GC (e.g., CN XR220 of FIG. XR2) via an NG interface (discussed infra).

In V2X scenarios one or more of the RAN nodes 1311 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 1301 (vUEs 1301). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 1311 can terminate the air interface protocol and can be the first point of contact for the UEs 1301. In some embodiments, any of the RAN nodes 1311 can fulfill various logical functions for the RAN 1310 including, but not limited to, radio network controller (RNC) functions such as radio bearer management, uplink and downlink dynamic radio resource management and data packet scheduling, and mobility management.

In embodiments, the UEs 1301 can be configured to communicate using OFDM communication signals with each other or with any of the RAN nodes 1311 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1311 to the UEs 1301, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 1301 and the RAN nodes 1311 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 1301 and the RAN nodes 1311 may operate using LAA, eLAA, and/or feLAA mechanisms. In these implementations, the UEs 1301 and the RAN nodes 1311 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 1301 RAN nodes 1311, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 1301, AP 1306, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1301 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 1301. The PDCCH carries information about the transport format and resource allocations related to the PDSCH channel, among other things. It may also inform the UEs 1301 about the transport format, resource allocation, and HARQ information related to the uplink shared channel. Typically, downlink scheduling (assigning control and shared channel resource blocks to the UE 1301b within a cell) may be performed at any of the RAN nodes 1311 based on channel quality information fed back from any of the UEs 1301. The downlink resource assignment information may be sent on the PDCCH used for (e.g., assigned to) each of the UEs 1301.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as EREGs. An ECCE may have other numbers of EREGs in some situations.

The RAN nodes 1311 may be configured to communicate with one another via interface 1312. In embodiments where the system 1300 is an LTE system (e.g., when CN 1320 is an EPC XR120 as in FIG. XR1), the interface 1312 may be an X2 interface 1312. The X2 interface may be defined between two or more RAN nodes 1311 (e.g., two or more eNBs and the like) that connect to EPC 1320, and/or between two eNBs connecting to EPC 1320. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1301 from an SeNB for user data; information of PDCP PDUs that were not delivered to a UE 1301; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 1300 is a 5G or NR system (e.g., when CN 1320 is a 5GC), the interface 1312 may be an Xn interface 1312. The Xn interface is defined between two or more RAN nodes 1311 (e.g., two or more gNBs and the like) that connect to 5GC 1320, between a RAN node 1311 (e.g., a gNB) connecting to 5GC 1320 and an eNB, and/or between two eNBs connecting to 5GC 1320. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1301 in a connected mode (e.g., CM-CONNECTED) including functionality to manage the UE mobility for connected mode between one or more RAN nodes 1311. The mobility support may include context transfer from an old (source) serving RAN node 1311 to new (target) serving RAN node 1311; and control of user plane tunnels between old (source) serving RAN node 1311 to new (target) serving RAN node 1311. A protocol stack of the Xn-U may include a transport network layer built on Internet Protocol (IP) transport layer, and a GTP—U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 1310 is shown to be communicatively coupled to a core network—in this embodiment, core network (CN) 1320. The CN 1320 may comprise a plurality of network elements 1322, which are configured to offer various data and telecommunications services to customers/subscribers (e.g., users of UEs 1301) who are connected to the CN 1320 via the RAN 1310. The components of the CN 1320 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1320 may be referred to as a network slice, and a logical instantiation of a portion of the CN 1320 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 1330 may be an element offering applications that use IP bearer resources with the core network (e.g., UMTS PS domain, LTE PS data services, etc.). The application server 1330 can also be configured to support one or more communication services (e.g., VoIP sessions, PTT sessions, group communication sessions, social networking services, etc.) for the UEs 1301 via the EPC 1320.

In embodiments, the CN 1320 may be a 5GC (referred to as "5GC 1320" or the like), and the RAN 1310 may be connected with the CN 1320 via an NG interface 1313. In embodiments, the NG interface 1313 may be split into two parts, an NG user plane (NG-U) interface 1314, which carries traffic data between the RAN nodes 1311 and a UPF, and the S1 control plane (NG-C) interface 1315, which is a signaling interface between the RAN nodes 1311 and AMFs. Embodiments where the CN 1320 is a 5GC 1320 are discussed in more detail with regard to FIG. XR2.

In embodiments, the CN 1320 may be a 5G CN (referred to as "5GC 1320" or the like), while in other embodiments, the CN 1320 may be an EPC). Where CN 1320 is an EPC (referred to as "EPC 1320" or the like), the RAN 1310 may be connected with the CN 1320 via an S1 interface 1313. In embodiments, the S1 interface 1313 may be split into two parts, an S1 user plane (S1-U) interface 1314, which carries traffic data between the RAN nodes 1311 and the S-GW, and the S1-MME interface 1315, which is a signaling interface between the RAN nodes 1311 and MMEs.

Figure 14:
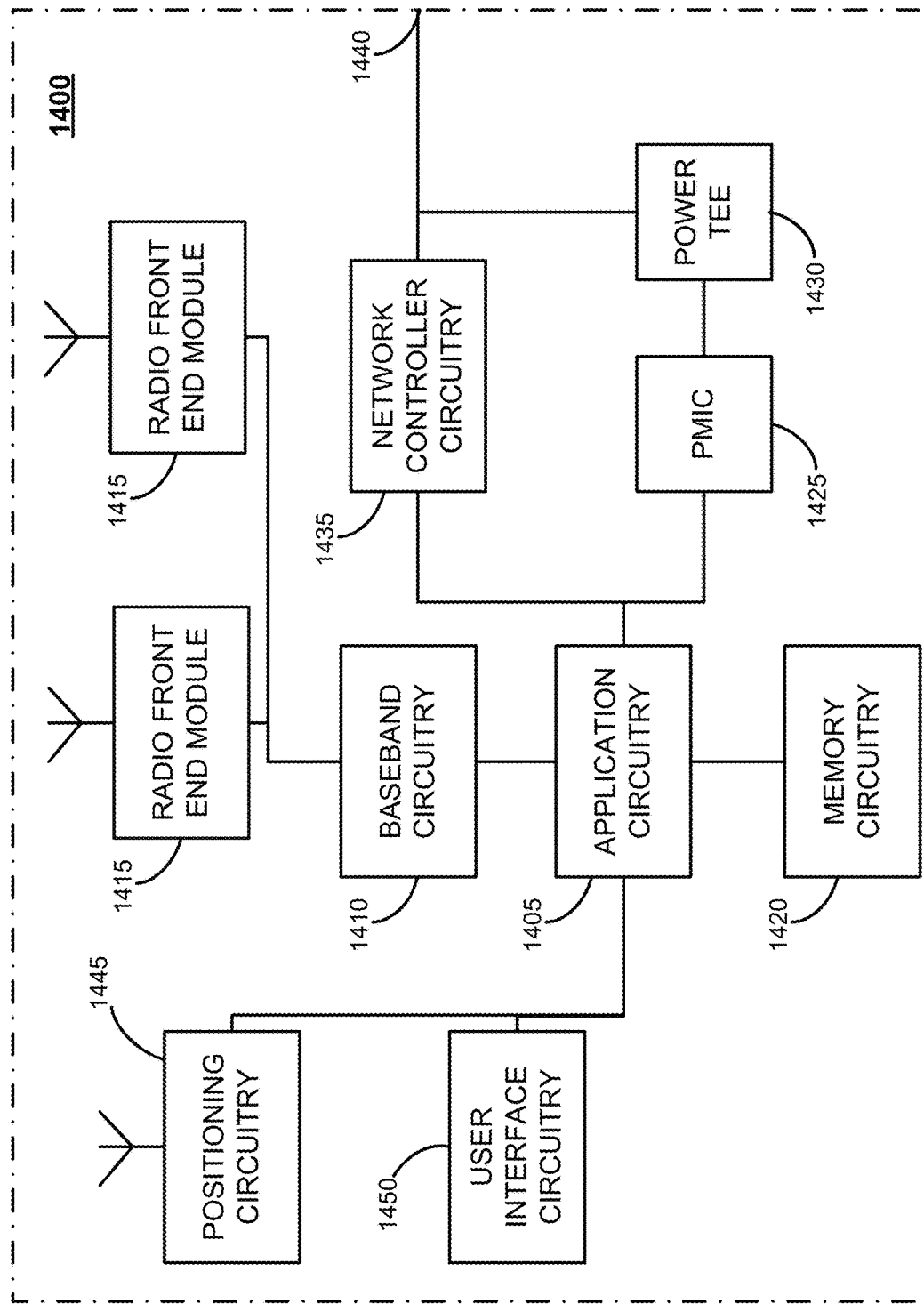
FIG. 14 illustrates an example of infrastructure equipment in accordance with various embodiments.

FIG. 14 illustrates an example of infrastructure equipment 1400 in accordance with various embodiments. The infrastructure equipment 1400 (or "system 1400") may be implemented as a base station, radio head, RAN node such as the RAN nodes 1311 and/or AP 1306 shown and described previously, application server(s) 1330, and/or any other element/device discussed herein. In other examples, the system 1400 could be implemented in or by a UE.

The system 1400 includes application circuitry 1405, baseband circuitry 1410, one or more radio front end modules (RFEMs) 1415, memory circuitry 1420, power management integrated circuitry (PMIC) 1425, power tee circuitry 1430, network controller circuitry 1435, network interface connector 1440, satellite positioning circuitry 1445, and user interface 1450. In some embodiments, the device 1400 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 1405 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1405 may be coupled with or may include memory/storage elements and may be configured to execute instructions stored in the memory/storage to enable various applications or operating systems to run on the system 1400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1405 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1405 may comprise, or may be, a special-purpose processor/controller to operate according to the various embodiments herein. As examples, the processor(s) of application circuitry 1405 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1400 may not utilize application circuitry 1405, and instead may include a special-purpose processor/controller to process IP data received from an EPC or 5GC, for example.

In some implementations, the application circuitry 1405 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1405 may comprise logic blocks or logic fabric, and other interconnected resources that may be programmed to perform various functions, such as the procedures, methods, functions, etc. of the various embodiments discussed herein. In such embodiments, the circuitry of application circuitry 1405 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 1410 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1410 are discussed infra with regard to FIG. 16.

User interface circuitry 1450 may include one or more user interfaces designed to enable user interaction with the system 1400 or peripheral component interfaces designed to enable peripheral component interaction with the system 1400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 1415 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1611 of FIG. 16 infra), and the RFEM may be connected to multiple antennas. In alternative implementations, both mmWave and sub-mmWave radio functions may be implemented in the same physical RFEM 1415, which incorporates both mmWave antennas and sub-mmWave.

The memory circuitry 1420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAIVI), etc., and may incorporate the three-dimensional (3D) cross-point (XPOINT) memories from Intel® and Micron®. Memory circuitry 1420 may be implemented as one or more of solder down packaged integrated circuits, socketed memory modules and plug-in memory cards.

The PMIC 1425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1430 may provide for electrical power drawn from a network cable to provide both power supply and data connectivity to the infrastructure equipment 1400 using a single cable.

The network controller circuitry 1435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1400 via network interface connector 1440 using a physical connection, which may be electrical (commonly referred to as a "copper interconnect"), optical, or wireless. The network controller circuitry 1435 may include one or more dedicated processors and/or FPGAs to communicate using one or more of the aforementioned protocols. In some implementations, the network controller circuitry 1435 may include multiple controllers to provide connectivity to other networks using the same or different protocols.

The positioning circuitry 1445 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1445 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1445 may include a Micro-Technology for Positioning, Navigation, and Timing (Micro-PNT) IC that uses a master timing clock to perform position tracking/estimation without GNSS assistance. The positioning circuitry 1445 may also be part of, or interact with, the baseband circuitry 1410 and/or RFEMs 1415 to communicate with the nodes and components of the positioning network. The positioning circuitry 1445 may also provide position data and/or time data to the application circuitry 1405, which may use the data to synchronize operations with various infrastructure (e.g., RAN nodes 1311, etc.), or the like.

The components shown by FIG. 14 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I$^2$C interface, an SPI interface, point to point interfaces, and a power bus, among others.

Figure 15:
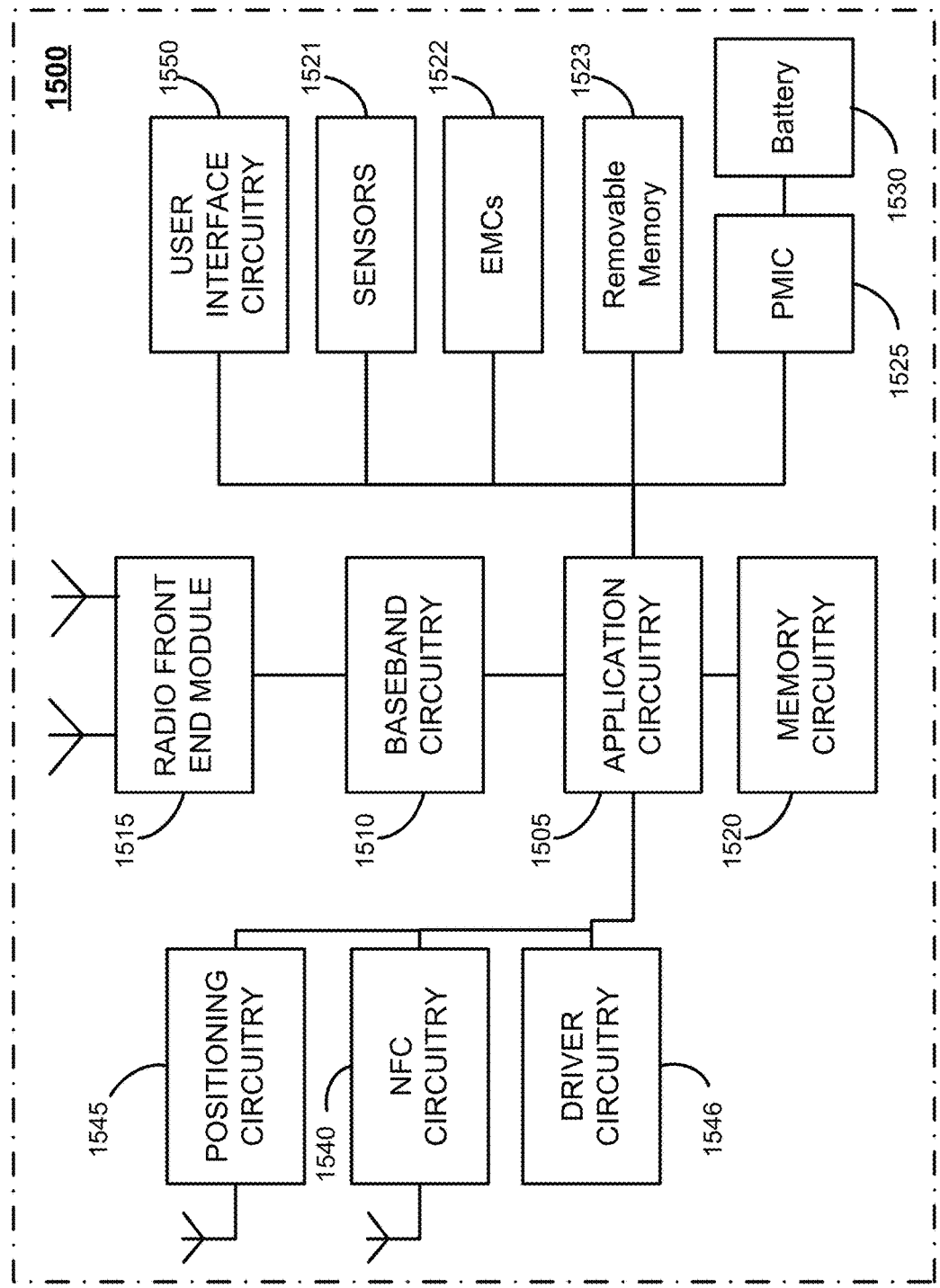
FIG. 15 illustrates an example of a computer platform in accordance with various embodiments.

FIG. 15 illustrates an example of a platform 1500 (or "device 1500") in accordance with various embodiments. In embodiments, the computer platform 1500 may be suitable for use as UEs 1301, XR101, XR201, application servers 1330, and/or any other element/device discussed herein. The platform 1500 may include any combinations of the components shown in the example. The components of platform 1500 may be implemented as integrated circuits (ICs), portions thereof, discrete electronic devices, or other modules, logic, hardware, software, firmware, or a combination thereof adapted in the computer platform 1500, or as components otherwise incorporated within a chassis of a larger system. The block diagram of FIG. 15 is intended to show a high level view of components of the computer platform 1500. However, some of the components shown may be omitted, additional components may be present, and different arrangement of the components shown may occur in other implementations.

Application circuitry 1505 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1505 may be coupled with or may include memory/storage elements and may be configured to execute instructions stored in the memory/storage to enable various applications or operating systems to run on the system 1500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1405 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1405 may comprise, or may be, a special-purpose processor/controller to operate according to the various embodiments herein.

As examples, the processor(s) of application circuitry 1505 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 1505 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1505 may be a part of a system on a chip (SoC) in which the application circuitry 1505 and other components are formed into a single integrated circuit, or a single package, such as the Edison™ or Galileo™ SoC boards from Intel® Corporation.

Additionally or alternatively, application circuitry 1505 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1505 may comprise logic blocks or logic fabric, and other interconnected resources that may be programmed to perform various functions, such as the procedures, methods, functions, etc. of the various embodiments discussed herein. In such embodiments, the circuitry of application circuitry 1505 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1510 are discussed infra with regard to FIG. XT.

The RFEMs 1515 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1611 of FIG. 16 infra), and the RFEM may be connected to multiple antennas. In alternative implementations, both mmWave and sub-mmWave radio functions may be implemented in the same physical RFEM 1515, which incorporates both mmWave antennas and sub-mmWave.

The memory circuitry 1520 may include any number and type of memory devices used to provide for a given amount of system memory. As examples, the memory circuitry 1520 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1520 may be developed in accordance with a Joint Electron Devices Engineering Council (JEDEC) low power double data rate (LPDDR)-based design, such as LPDDR2, LPDDR3, LPDDR4, or the like. Memory circuitry 1520 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1520 may be on-die memory or registers associated with the application circuitry 1505. To provide for persistent storage of information such as data, applications, operating systems and so forth, memory circuitry 1520 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1500 may incorporate the three-dimensional (3D) cross-point (XPOINT) memories from Intel® and Micron®.

Removable memory circuitry 1523 may include devices, circuitry, enclosures/housings, ports or receptacles, etc. used to couple portable data storage devices with the platform

1500. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1500 may also include interface circuitry (not shown) that is used to connect external devices with the platform 1500. The external devices connected to the platform 1500 via the interface circuitry include sensor circuitry 1521 and electro-mechanical components (EMCs) 1522, as well as removable memory devices coupled to removable memory circuitry 1523.

The sensor circuitry 1521 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1522 include devices, modules, or subsystems whose purpose is to enable platform 1500 to change its state, position, and/or orientation, or move or control a mechanism or (sub)system. Additionally, EMCs 1522 may be configured to generate and send messages/signalling to other components of the platform 1500 to indicate a current state of the EMCs 1522. Examples of the EMCs 1522 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1500 is configured to operate one or more EMCs 1522 based on one or more captured events and/or instructions or control signals received from a service provider and/or various clients.

In some implementations, the interface circuitry may connect the platform 1500 with positioning circuitry 1545. The positioning circuitry 1545 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1545 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1545 may include a Micro-PNT IC that uses a master timing clock to perform position tracking/estimation without GNSS assistance. The positioning circuitry 1545 may also be part of, or interact with, the baseband circuitry 1410 and/or RFEMs 1515 to communicate with the nodes and components of the positioning network. The positioning circuitry 1545 may also provide position data and/or time data to the application circuitry 1505, which may use the data to synchronize operations with various infrastructure (e.g., radio base stations), for turn-by-turn navigation applications, or the like In some implementations, the interface circuitry may connect the platform 1500 with Near-Field Communication (NFC) circuitry 1540. NFC circuitry 1540 is configured to provide contactless, short-range communications based on radio frequency identification (RFID) standards, wherein magnetic field induction is used to enable communication between NFC circuitry 1540 and NFC-enabled devices external to the platform 1500 (e.g., an "NFC touchpoint"). NFC circuitry 1540 comprises an NFC controller coupled with an antenna element and a processor coupled with the NFC controller. The NFC controller may be a chip/IC providing NFC functionalities to the NFC circuitry 1540 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1540, or initiate data transfer between the NFC circuitry 1540 and another active NFC device (e.g., a smartphone or an NFC-enabled POS terminal) that is proximate to the platform 1500.

The driver circuitry 1546 may include software and hardware elements that operate to control particular devices that are embedded in the platform 1500, attached to the platform 1500, or otherwise communicatively coupled with the platform 1500. The driver circuitry 1546 may include individual drivers allowing other components of the platform 1500 to interact with or control various input/output (I/O) devices that may be present within, or connected to, the platform 1500. For example, driver circuitry 1546 may include a display driver to control and allow access to a display device, a touchscreen driver to control and allow access to a touchscreen interface of the platform 1500, sensor drivers to obtain sensor readings of sensor circuitry 1521 and control and allow access to sensor circuitry 1521, EMC drivers to obtain actuator positions of the EMCs 1522 and/or control and allow access to the EMCs 1522, a camera driver to control and allow access to an embedded image capture device, audio drivers to control and allow access to one or more audio devices.

The power management integrated circuitry (PMIC) 1525 (also referred to as "power management circuitry 1525") may manage power provided to various components of the platform 1500. In particular, with respect to the baseband circuitry 1510, the PMIC 1525 may control power-source selection, voltage scaling, battery charging, or DC-to-DC conversion. The PMIC 1525 may often be included when the platform 1500 is capable of being powered by a battery 1530, for example, when the device is included in a UE 1301, XR101, XR201.

In some embodiments, the PMIC 1525 may control, or otherwise be part of, various power saving mechanisms of the platform 1500. For example, if the platform 1500 is in an RRC Connected state, where it is still connected to the RAN node as it expects to receive traffic shortly, then it may enter a state known as Discontinuous Reception Mode (DRX) after a period of inactivity. During this state, the platform 1500 may power down for brief intervals of time and thus save power. If there is no data traffic activity for an extended period of time, then the platform 1500 may transition off to an RRC Idle state, where it disconnects from the network and does not perform operations such as channel quality feedback, handover, etc. The platform 1500 goes into a very low power state and it performs paging where again it periodically wakes up to listen to the network and then powers down again. The platform 1500 may not receive data in this state; in order to receive data, it must transition back to RRC Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1530 may power the platform 1500, although in some examples the platform 1500 may be mounted deployed in a fixed location, and may have a power supply coupled to an electrical grid. The battery 1530 may be a lithium ion battery, a metal-air battery, such as a zinc-air battery, an aluminum-air battery, a lithium-air battery, and the like. In some implementations, such as in V2X applications, the battery 1530 may be a typical lead-acid automotive battery.

In some implementations, the battery 1530 may be a "smart battery," which includes or is coupled with a Battery Management System (BMS) or battery monitoring integrated circuitry. The BMS may be included in the platform 1500 to track the state of charge (SoCh) of the battery 1530. The BMS may be used to monitor other parameters of the battery 1530 to provide failure predictions, such as the state of health (SoH) and the state of function (SoF) of the battery 1530. The BMS may communicate the information of the battery 1530 to the application circuitry 1505 or other components of the platform 1500. The BMS may also include an analog-to-digital (ADC) convertor that allows the application circuitry 1505 to directly monitor the voltage of the battery 1530 or the current flow from the battery 1530. The battery parameters may be used to determine actions that the platform 1500 may perform, such as transmission frequency, network operation, sensing frequency, and the like.

A power block, or other power supply coupled to an electrical grid may be coupled with the BMS to charge the battery 1530. In some examples, the power block XS30 may be replaced with a wireless power receiver to obtain the power wirelessly, for example, through a loop antenna in the computer platform 1500. In these examples, a wireless battery charging circuit may be included in the BMS. The specific charging circuits chosen may depend on the size of the battery 1530, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1550 includes various input/output (I/O) devices present within, or connected to, the platform 1500, and includes one or more user interfaces designed to enable user interaction with the platform 1500 and/or peripheral component interfaces designed to enable peripheral component interaction with the platform 1500. The user interface circuitry 1550 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/ or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 1500. The output device circuitry may also include speakers or other audio emitting devices, printer(s), and/or the like. In some embodiments, the sensor circuitry 1521 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1500 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an FC interface, an SPI interface, point-to-point interfaces, and a power bus, among others.

Figure 16:
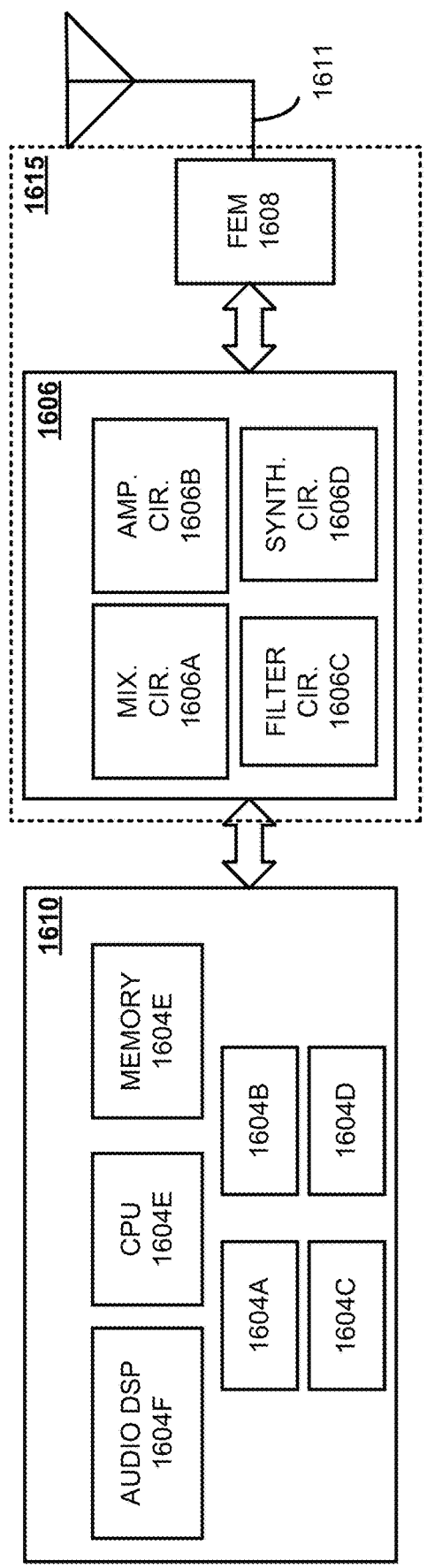
FIG. 16 illustrates example components of baseband circuitry and radio front end modules in accordance with various embodiments.

FIG. 16 illustrates example components of baseband circuitry 1610 and radio front end modules (RFEM) 1615 in accordance with various embodiments. The baseband circuitry 1610 corresponds to the baseband circuitry 1410 and 1510 of FIGS. 14 and 15, respectively. The RFEM 1615 corresponds to the RFEM 1415 and 1515 of FIGS. 14 and 15, respectively. As shown, the RFEMs 1615 may include Radio Frequency (RF) circuitry 1606, front-end module (FEM) circuitry 1608, antenna array 1611 coupled together at least as shown.

The baseband circuitry 1610 includes circuitry and/or control logic configured to carry out various radio/network protocol and radio control functions that enable communication with one or more radio networks via the RF circuitry 1606. The radio control functions may include, but are not limited to, signal modulation/demodulation, encoding/decoding, radio frequency shifting, etc. In some embodiments, modulation/demodulation circuitry of the baseband circuitry 1610 may include Fast-Fourier Transform (FFT), precoding, or constellation mapping/demapping functionality. In some embodiments, encoding/decoding circuitry of the baseband circuitry 1610 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 1610 is configured to process baseband signals received from a receive signal path of the RF circuitry 1606 and to generate baseband signals for a transmit signal path of the RF circuitry 1606. The baseband circuitry 1610 is configured to interface with application circuitry 1405/1505 (see FIGS. 14 and 15) for generation and processing of the baseband signals and for controlling operations of the RF circuitry 1606. The baseband circuitry 1610 may handle various radio control functions.

The aforementioned circuitry and/or control logic of the baseband circuitry 1610 may include one or more single or multi-core processors. For example, the one or more processors may include a 3G baseband processor 1604A, a 4G/LTE baseband processor 1604B, a 5G/NR baseband processor 1604C, or some other baseband processor(s) 1604D for other existing generations, generations in development or to be developed in the future (e.g., sixth generation (6G), etc.). In other embodiments, some or all of the functionality of baseband processors 1604A-D may be included in modules stored in the memory 1604G and executed via a Central Processing Unit (CPU) 1604E. In other embodiments, some or all of the functionality of baseband processors 1604A-D may be provided as hardware accelerators (e.g., FPGAs, ASICs, etc.) loaded with the appropriate bit streams or logic blocks stored in respective memory cells. In various embodiments, the memory 1604G may store program code of a real-time OS (RTOS), which when executed by the CPU 1604E (or other baseband processor), is to cause the CPU 1604E (or other baseband processor) to manage resources of the baseband circuitry 1610, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 1610 includes one or more audio digital signal processor(s) (DSP) 1604F. The audio DSP(s) 1604F include elements for compression/decompression and echo cancellation and may include other suitable processing elements in other embodiments.

In some embodiments, each of the processors 1604A-1604E include respective memory interfaces to send/receive data to/from the memory 1604G. The baseband circuitry 1610 may further include one or more interfaces to communicatively couple to other circuitries/devices, such as an interface to send/receive data to/from memory external to the baseband circuitry 1610; an application circuitry interface to send/receive data to/from the application circuitry 1405/1505 of FIGS. 14-16); an RF circuitry interface to send/receive data to/from RF circuitry 1606 of FIG. 16; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 1525.

In alternate embodiments (which may be combined with the above described embodiments), baseband circuitry 1610 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1610 may include protocol processing circuitry with one or more instances of control circuitry (not shown) to provide control functions for the digital baseband circuitry and/or radio frequency circuitry (e.g., the radio front end modules 1615).

Although not shown by FIG. 16, in some embodiments, the baseband circuitry 1610 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 1610 and/or RF circuitry 1606 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1610 and/or RF circuitry 1606 are part of a Wi-Fi communication system. In the second example, the protocol processing circuitry would operate Wi-Fi MAC and logical link control (LLC) functions. The protocol processing circuitry may include one or more memory structures (e.g., 1604G) to store program code and data for operating the protocol functions, as well as one or more processing cores to execute the program code and perform various operations using the data. The baseband circuitry 1610 may also support radio communications for more than one wireless protocol.

The various hardware elements of the baseband circuitry 1610 discussed herein may be implemented, for example, as a solder-down substrate including one or more integrated circuits (ICs), a single packaged IC soldered to a main circuit board or a multi-chip module containing two or more ICs. In one example, the components of the baseband circuitry 1610 may be suitably combined in a single chip or chipset, or disposed on a same circuit board. In another example, some or all of the constituent components of the baseband circuitry 1610 and RF circuitry 1606 may be implemented together such as, for example, a system on a chip (SoC) or System-in-Package (SiP). In another example, some or all of the constituent components of the baseband circuitry 1610 may be implemented as a separate SoC that is communicatively coupled with and RF circuitry 1606 (or multiple instances of RF circuitry 1606). In yet another example, some or all of the constituent components of the baseband circuitry 1610 and the application circuitry 1405/1505 may be implemented together as individual SoCs mounted to a same circuit board (e.g., a "multi-chip package").

In some embodiments, the baseband circuitry 1610 may provide for communication compatible with one or more radio technologies. For example, in some embodiments, the baseband circuitry 1610 may support communication with an E-UTRAN or other WMAN, a WLAN, a WPAN. Embodiments in which the baseband circuitry 1610 is configured to support radio communications of more than one wireless protocol may be referred to as multi-mode baseband circuitry.

RF circuitry 1606 may enable communication with wireless networks using modulated electromagnetic radiation through a non-solid medium. In various embodiments, the RF circuitry 1606 may include switches, filters, amplifiers, etc. to facilitate the communication with the wireless network. RF circuitry 1606 may include a receive signal path, which may include circuitry to down-convert RF signals received from the FEM circuitry 1608 and provide baseband signals to the baseband circuitry 1610. RF circuitry 1606 may also include a transmit signal path, which may include circuitry to up-convert baseband signals provided by the baseband circuitry 1610 and provide RF output signals to the FEM circuitry 1608 for transmission.

In some embodiments, the receive signal path of the RF circuitry 1606 may include mixer circuitry 1606*a*, amplifier circuitry 1606*b* and filter circuitry 1606*c*. In some embodiments, the transmit signal path of the RF circuitry 1606 may include filter circuitry 1606*c* and mixer circuitry 1606*a*. RF circuitry 1606 may also include synthesizer circuitry 1606*d* for synthesizing a frequency for use by the mixer circuitry 1606*a* of the receive signal path and the transmit signal path. In some embodiments, the mixer circuitry 1606*a* of the receive signal path may be configured to down-convert RF signals received from the FEM circuitry 1608 based on the synthesized frequency provided by synthesizer circuitry 1606*d*. The amplifier circuitry 1606*b* may be configured to amplify the down-converted signals and the filter circuitry 1606*c* may be a low-pass filter (LPF) or band-pass filter (BPF) configured to remove unwanted signals from the down-converted signals to generate output baseband signals. Output baseband signals may be provided to the baseband circuitry 1610 for further processing. In some embodiments, the output baseband signals may be zero-frequency baseband signals, although this is not a requirement. In some embodiments, mixer circuitry 1606*a* of the receive signal path may comprise passive mixers, although the scope of the embodiments is not limited in this respect.

In some embodiments, the mixer circuitry 1606*a* of the transmit signal path may be configured to up-convert input baseband signals based on the synthesized frequency provided by the synthesizer circuitry 1606*d* to generate RF output signals for the FEM circuitry 1608. The baseband signals may be provided by the baseband circuitry 1610 and may be filtered by filter circuitry 1606*c*.

In some embodiments, the mixer circuitry 1606*a* of the receive signal path and the mixer circuitry 1606*a* of the transmit signal path may include two or more mixers and may be arranged for quadrature downconversion and upconversion, respectively. In some embodiments, the mixer circuitry 1606*a* of the receive signal path and the mixer circuitry 1606*a* of the transmit signal path may include two or more mixers and may be arranged for image rejection (e.g., Hartley image rejection). In some embodiments, the mixer circuitry 1606*a* of the receive signal path and the mixer circuitry 1606*a* of the transmit signal path may be arranged for direct downconversion and direct upconversion, respectively. In some embodiments, the mixer circuitry 1606*a* of the receive signal path and the mixer circuitry 1606*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1606 may include analog-to-digital converter (ADC) and digital-to-analog converter (DAC) circuitry and the baseband circuitry 1610 may include a digital baseband interface to communicate with the RF circuitry 1606.

In some dual-mode embodiments, a separate radio IC circuitry may be provided for processing signals for each spectrum, although the scope of the embodiments is not limited in this respect.

In some embodiments, the synthesizer circuitry 1606*d* may be a fractional-N synthesizer or a fractional N/N+1 synthesizer, although the scope of the embodiments is not limited in this respect as other types of frequency synthesizers may be suitable. For example, synthesizer circuitry 1606*d* may be a delta-sigma synthesizer, a frequency multiplier, or a synthesizer comprising a phase-locked loop with a frequency divider.

The synthesizer circuitry 1606*d* may be configured to synthesize an output frequency for use by the mixer circuitry 1606*a* of the RF circuitry 1606 based on a frequency input and a divider control input. In some embodiments, the synthesizer circuitry 1606*d* may be a fractional N/N+1 synthesizer.

In some embodiments, frequency input may be provided by a voltage controlled oscillator (VCO), although that is not a requirement. Divider control input may be provided by either the baseband circuitry 1610 or the application circuitry 1405/1505 depending on the desired output frequency. In some embodiments, a divider control input (e.g., N) may be determined from a look-up table based on a channel indicated by the application circuitry 1405/1505.

Synthesizer circuitry 1606*d* of the RF circuitry 1606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1606*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1606 may include an IQ/polar converter.

FEM circuitry 1608 may include a receive signal path, which may include circuitry configured to operate on RF signals received from antenna array 1611, amplify the received signals and provide the amplified versions of the received signals to the RF circuitry 1606 for further processing. FEM circuitry 1608 may also include a transmit signal path, which may include circuitry configured to amplify signals for transmission provided by the RF circuitry 1606 for transmission by one or more of antenna elements of antenna array 1611. In various embodiments, the amplification through the transmit or receive signal paths may be done solely in the RF circuitry 1606, solely in the FEM circuitry 1608, or in both the RF circuitry 1606 and the FEM circuitry 1608.

In some embodiments, the FEM circuitry 1608 may include a TX/RX switch to switch between transmit mode and receive mode operation. The FEM circuitry 1608 may include a receive signal path and a transmit signal path. The receive signal path of the FEM circuitry 1608 may include an LNA to amplify received RF signals and provide the amplified received RF signals as an output (e.g., to the RF circuitry 1606). The transmit signal path of the FEM circuitry 1608 may include a power amplifier (PA) to amplify input RF signals (e.g., provided by RF circuitry 1606), and one or more filters to generate RF signals for subsequent transmission by one or more antenna elements of the antenna array 1611.

The antenna array 1611 comprises one or more antenna elements, each of which is configured convert electrical signals into radio waves to travel through the air and to convert received radio waves into electrical signals. For example, digital baseband signals provided by the baseband circuitry 1610 is converted into analog RF signals (e.g., modulated waveform) that will be amplified and transmitted via the antenna elements of the antenna array 1611 including one or more antenna elements (not shown). The antenna elements may be omnidirectional, direction, or a combination thereof. The antenna elements may be formed in a multitude of arranges as are known and/or discussed herein. The antenna array 1611 may comprise microstrip antennas or printed antennas that are fabricated on the surface of one or more printed circuit boards. The antenna array 1611 may be formed in as a patch of metal foil (e.g., a patch antenna) in a variety of shapes, and may be coupled with the RF circuitry 1606 and/or FEM circuitry 1608 using metal transmission lines or the like.

Processors of the application circuitry 1405/1505 and processors of the baseband circuitry 1610 may be used to execute elements of one or more instances of a protocol stack. For example, processors of the baseband circuitry 1610, alone or in combination, may be used execute Layer 3, Layer 2, or Layer 1 functionality, while processors of the application circuitry 1405/1505 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 17:
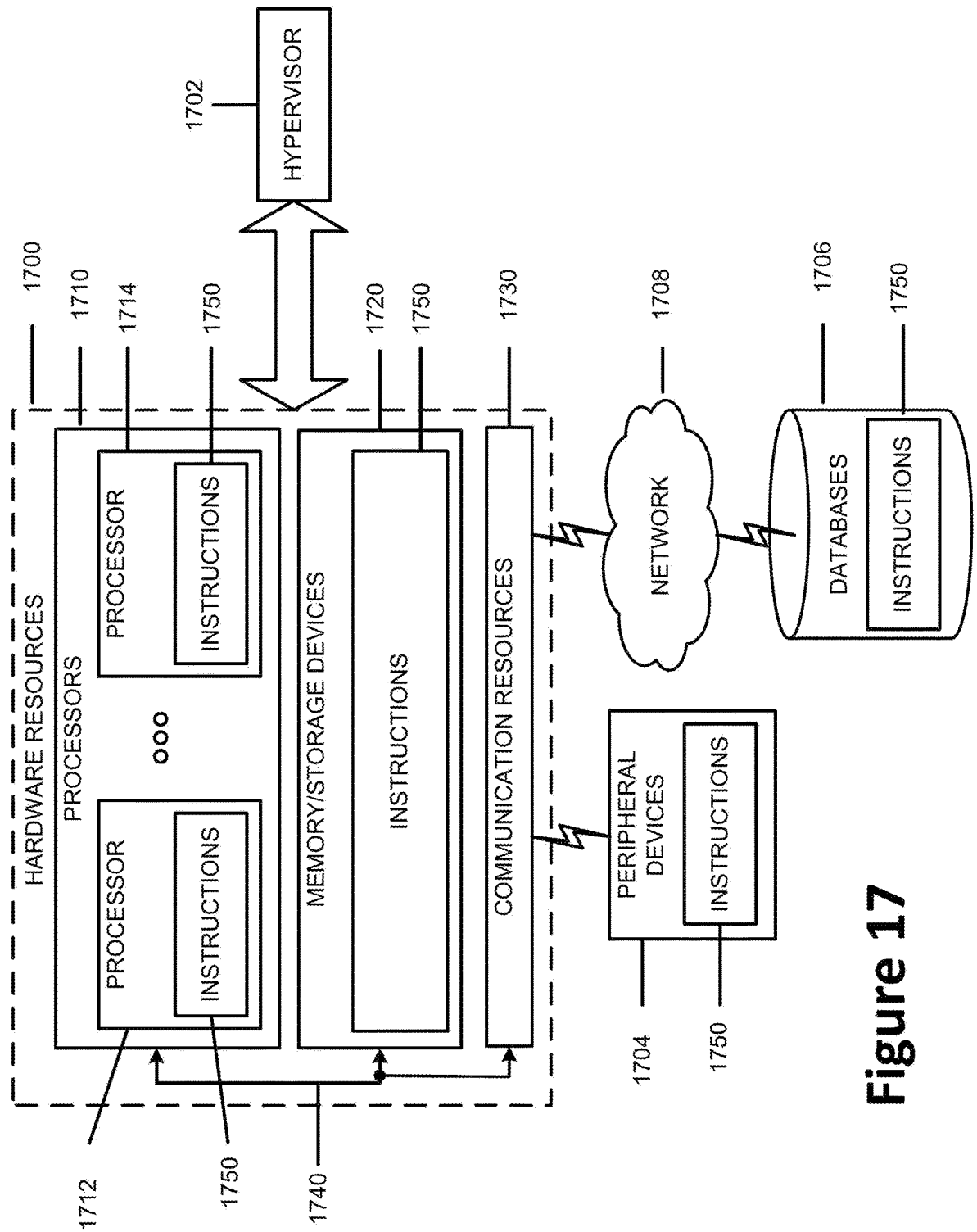
FIG. 17 is a block diagram illustrating components, according to some example embodiments, able to read instructions from a machine-readable or computer-readable medium (e.g., a non-transitory machine-readable storage medium) and perform any one or more of the methodologies discussed herein.

FIG. 17 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 17 shows a diagrammatic representation of hardware resources 1700 including one or more processors (or processor cores) 1710, one or more memory/storage devices 1720, and one or more communication resources 1730, each of which may be communicatively coupled via a bus 1740. For embodiments where node virtualization (e.g., NFV) is utilized, a hypervisor 1702 may be executed to provide an execution environment for one or more network slices/sub-slices to utilize the hardware resources 1700.

The processors 1710 may include, for example, a processor 1712 and a processor 1714. The processor(s) 1710 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1720 may include main memory, disk storage, or any suitable combination thereof. The memory/storage devices 1720 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1730 may include interconnection or network interface components or other suitable devices to communicate with one or more peripheral devices 1704 or one or more databases 1706 via a network 1708. For example, the communication resources 1730 may include wired communication components (e.g., for coupling via USB), cellular communication components, NFC components, Bluetooth® (or Bluetooth® Low Energy) components, Wi-Fi® components, and other communication components.

Instructions 1750 may comprise software, a program, an application, an applet, an app, or other executable code for causing at least any of the processors 1710 to perform any one or more of the methodologies discussed herein. The instructions 1750 may reside, completely or partially, within at least one of the processors 1710 (e.g., within the processor's cache memory), the memory/storage devices 1720, or any suitable combination thereof. Furthermore, any portion of the instructions 1750 may be transferred to the hardware resources 1700 from any combination of the peripheral devices 1704 or the databases 1706. Accordingly, the memory of processors 1710, the memory/storage devices 1720, the peripheral devices 1704, and the databases 1706 are examples of computer-readable and machine-readable media.

Example Procedures

In some embodiments, the electronic device(s), network(s), system(s), chip(s) or component(s), or portions or implementations thereof, of FIGS. 13-17, or some other figure herein, may be configured to perform one or more processes, techniques, or methods as described herein, or portions thereof. One such process is depicted in FIG. 18. For example, the process may include, at 1804, receiving downlink control information (DCI) for a grant-based (GB) or a configured grant (CG) physical uplink shared channel (PUSCH) transmission, wherein the DCI is to schedule the PUSCH to support multiple transmit time interval (multi-TTI) PUSCH scheduling. The process further includes, at 1808, encoding the PUSCH for transmission to a next generation NodeB (gNB) based on the DCI.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include UL transmission including grant based PUSCH (GB PUCH) transmission and configured grant based PUSCH (CG PUSCH) transmission in NR Systems Operating on Unlicensed Spectrum.

Example 2 may include the method of example 1 or some other example herein, wherein only DCI 0_1 is extended to schedule multi-TTI PUSCH.

Example 3 may include the method of example 1 or some other example herein, wherein a DCI scheduling multi-TTI PUSCH has different number of CBGTI bits per TB from a DCI scheduling single-TTI PUSCH, CBG regrouping is adopted.

Example 4 may include the method of example 1 or some other example herein, wherein for CBG based PUSCH transmission, N>1 HARQ-ACK bits are allocated for each HARQ process configured for CG, while only 1 bit is allocated for other HARQ processes.

Example 5 may include the method of example 1 or some other example herein, wherein for CBG based PUSCH transmission, N>1 HARQ-ACK bits are allocated for a subset of HARQ processes configured for CG, while only 1 bit is allocated for all other HARQ processes.

Example 6 may include the method of example 1 or some other example herein, wherein for GB multi-slot PUSCH, UE transmits continuously in multiple slots once UE occupied the channel by successfully performing a LBT.

Example 7 may include the method of example 6 or some other example herein, wherein UE follows the start symbol indicated in the first slot for the channel occupation, while UE follows the end symbol indicated in the last slot for the channel occupation.

Example 8 may include the method of example 6 or some other example herein, wherein if LBT fails in a first slot, UE tries LBT at symbol 0 of next slot.

Example 9 may include the method of example 6 or some other example herein, wherein if UE is indicated as NO LBT, UE does NO LBT to start its transmission in each UL burst, or, UE only do NO LBT in the exactly first UL burst, or, UE does NO LBT if the start symbol of the multi-slot PUSCH follows a downlink symbol or flexible symbol as indicated by DCI 2_0.

Example 10 may include the method of example 6 or some other example herein, wherein DMRS for a slot of the multi-slot PUSCH follows PUSCH type indicated by DCI; or, only DMRS of the first slot follows PUSCH type indicated by DCI, and DMRS of remaining slot uses DMRS of PUSCH type A.

Example 11 may include the method of example 6 or some other example herein, wherein PUSCH type A mapping is always used for CG transmission.

Example 12 may include the method of example 6 or some other example herein, wherein CSI is prioritized to be piggybacked on a last slot of a multi-slot PUSCH if the PUSCH in the slot is actually available for transmission, or if NO LBT is used to schedule a multi-slot PUSCH, CSI is piggybacked on the exactly first slot.

Example 13 may include the method of example 1 or some other example herein, wherein CG-UCI is piggybacked only in the first slot repetition of a TB, or CG-UCI is piggybacked in each slot, or, CG-UCI is piggybacked in beginning slot repetition of a TB on each UL burst.

Example 14 may include the method of example 1 or some other example herein, UE does rate matching of the TB over N slots, and the rate matching operation is repeated M times for a total number of slot repetition MN.

Example 15 may include the method of example 1 or some other example herein, wherein start position of a UL transmission is determined as an offset X on symbol k, k is index of start symbol of SLIV.

Example 16 may include the method of example 1 or some other example herein, wherein start position of a UL transmission is determined as an offset X on symbol k−1 or k−2 or k−4.

Example 17 may include the method of examples 15 or 16 or some other example herein, wherein start positions is generated in 1 or 2 or 4 symbols, or start positions is fixedly generated in one symbol of SCS 15 kHz.

Example 18 may include the method of examples 15 or 16, offset X is a subset of the following values: 0, 25, 25+TA, 16, 16+TA, TA, length of 1 symbol, length of 2 symbols, and a special value indicating UL transmission should follow DL reception timing.

Example 19 may include the method of example 18 or some other example herein, wherein offset X are designed independent from LBT type, offset X is interpreted based on LBT type, or offset X and LBT type are jointly coded.

Example 20 may include the method of example 18 or some other example herein, wherein for offset X=16+TA, UE makes a gap between DL signal and UL signal within [Gmin, 16] us, Gmin is a minimum value of the gap.

Example 21 may include the method of example 18 or some other example herein, wherein for offset X=16+TA, gNB makes a gap between DL signal and UL signal within [Gmin, 16] us, Gmin is a minimum value of the gap.

Example 22 may include the method of examples 15 or 16 or some other example herein, wherein inside an gNB-initiated COT, only start position with offset X>25 us is applicable to CG PUSCH, or, only start position with offset X>16 us is applicable to CG PUSCH.

Example 23 may include the method of example 15 or 16 or some other example herein, inside an gNB-initiated COT, NO LBT is indicated in DCI for GB PUSCH, while CG PUSCH use 25 us LBT.

Example 24 may include the method of example 1 or some other example herein, wherein CBG (re)-transmission is enabled for CG, and 8 bits for CBGTI are carried in the CG-UCI.

Example 25 may include the method of example 1 or some other example herein, wherein the time domain resources over which a CG transmission is allowed are RRC configured through a the bitmap of 40 bits long independently of the subcarrier spacing, where each bit correspond to a slot.

Example 26 may include the method of example 1 or some other example herein, wherein a CG UE has multiple starting symbols, which are a subset of the symbols that precede the DMRS (e.g., symbol #0, #1).

Example 27 may include the method of example 1 or some other example herein, wherein for SCS 15 and 60 KHz subcarrier spacing the offset are truncated up to the second symbol.

Example 28 may include the method of example 27 or some other example herein, wherein the UCI for CG carriers indication on whether the first two symbols are used throughout two bits, which indicate: i) whether the CG data transmission starts from symbol #0; ii) whether the CG data transmission starts from symbol #1, iii) or whether the CG data transmission starts from symbol #2. For example, "00"→SCH-UL starts from symbol 0; "01"→SCH-UL starts from symbol 1; "10"→SCH-UL starts from symbol 2; "11"→reserved.

Example 29 includes a method comprising: receiving downlink control information (DCI) for a grant-based (GB) or configured grant (CG) physical uplink shared channel (PUSCH) transmission; and encoding the PUSCH for transmission to a next generation NodeB (gNB) based on the DCI.

Example 30 includes the method of example 29 or some other example herein, wherein the DCI is to support multiple transmit time interval (multi-TTI) PUSCH scheduling.

Example 31 includes the method of example 29 or some other example herein, wherein the DCI is to support single transmit time interval (TTI) scheduling.

Example 32 includes the method of example 29 or some other example herein, wherein the DCI includes one or more of: a new data indicator (NDI) field, a redundancy version (RC) field, a hybrid automatic repeat request (HARD) process number, a channel access type, a channel access priority class, a number of scheduled slots, a PUSCH start position, a starting symbol index of a time resource, an ending symbol index of a time resource, a code block group transmission information (CBGTI) field, or an indication of whether channel occupancy time (COT) sharing is allowed.

Example 33 includes a method of example 29 or some other example herein, wherein the method further includes: successfully performing a listen before talk (LBT) operation to occupy a channel; and subsequent to the successful LBT operation, transmitting continuously in multiple slots.

Example 34 includes the method of example 29 or some other example herein, wherein the DCI includes an index to a table having combinations of: an LBT type, an offset, and channel access priority class (CAPC).

Example 35 includes the method of example 29 or some other example herein, wherein the method further includes receiving, from the gNB, an indication of an LBT type and a Msg3 start position.

Example 36 includes the method of example 35 or some other example herein, wherein the LBT type and a Msg3 start position are indicated via a medium access control (MAC) random access response (RAR).

Example 37 includes the method of any of examples 29-36 or some other example herein, wherein the method is performed by a user equipment (UE) or portion thereof.

Example 38 may include an apparatus comprising means to perform one or more elements of a method described in or related to any of examples 1-37, or any other method or process described herein.

Example 39 may include one or more non-transitory computer-readable media comprising instructions to cause an electronic device, upon execution of the instructions by one or more processors of the electronic device, to perform one or more elements of a method described in or related to any of examples 1-37, or any other method or process described herein.

Example 40 may include an apparatus comprising logic, modules, or circuitry to perform one or more elements of a method described in or related to any of examples 1-37, or any other method or process described herein.

Example 41 may include a method, technique, or process as described in or related to any of examples 1-37, or portions or parts thereof.

Example 42 may include an apparatus comprising: one or more processors and one or more computer-readable media comprising instructions that, when executed by the one or more processors, cause the one or more processors to perform the method, techniques, or process as described in or related to any of examples 1-37, or portions thereof.

Example 43 may include a signal as described in or related to any of examples 1-37, or portions or parts thereof.

Example 44 may include a datagram, packet, frame, segment, protocol data unit (PDU), or message as described in or related to any of examples 1-37, or portions or parts thereof, or otherwise described in the present disclosure.

Example 45 may include a signal encoded with data as described in or related to any of examples 1-37, or portions or parts thereof, or otherwise described in the present disclosure.

Example 46 may include a signal encoded with a datagram, packet, frame, segment, protocol data unit (PDU), or message as described in or related to any of examples 1-37, or portions or parts thereof, or otherwise described in the present disclosure.

Example 47 may include an electromagnetic signal carrying computer-readable instructions, wherein execution of the computer-readable instructions by one or more processors is to cause the one or more processors to perform the method, techniques, or process as described in or related to any of examples 1-37, or portions thereof.

Example 48 may include a computer program comprising instructions, wherein execution of the program by a processing element is to cause the processing element to carry out the method, techniques, or process as described in or related to any of examples 1-37, or portions thereof.

Example 49 may include a signal in a wireless network as shown and described herein.

Example 50 may include a method of communicating in a wireless network as shown and described herein.

Example 51 may include a system for providing wireless communication as shown and described herein.

Example 52 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5 G Core network |
| ACK | Acknowledgement |
| AF | Application Function |
| AM | Acknowledged Mode |

-continued

| | |
|---|---|
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTS | Clear-to-Send |
| CW | Codeword |
| CWS | Contention Window Size |

| | | |
|---|---|---|
| D2D | Device-to-Device | |
| DC | Dual Connectivity, Direct Current | |
| DCI | Downlink Control Information | |
| DF | Deployment Flavour | |
| DL | Downlink | |
| DMTF | Distributed Management Task Force | |
| DPDK | Data Plane Development Kit | |
| DM-RS, DMRS | Demodulation Reference Signal | |
| DN | Data network | |
| DRB | Data Radio Bearer | |
| DRS | Discovery Reference Signal | |
| DRX | Discontinuous Reception | |
| DSL | Domain Specific Language. Digital Subscriber Line | |
| DSLAM | DSL Access Multiplexer | |
| DwPTS | Downlink Pilot Time Slot | |
| E-LAN | Ethernet Local Area Network | |
| E2E | End-to-End | |
| ECCA | extended clear channel assessment, extended CCA | |
| ECCE | Enhanced Control Channel Element, Enhanced CCE | |
| ED | Energy Detection | |
| EDGE | Enhanced Datarates for GSM Evolution (GSM Evolution) | |
| EGMF | Exposure Governance Management Function | |
| EGPRS | Enhanced GPRS | |
| EIR | Equipment Identity Register | |
| eLAA | enhanced Licensed Assisted Access, enhanced LAA | |
| EM | Element Manager | |
| eMBB | Enhanced Mobile Broadband | |
| EMS | Element Management System | |
| eNB | evolved NodeB, E-UTRAN Node B | |
| EN-DC | E-UTRA-NR Dual Connectivity | |
| EPC | Evolved Packet Core | |
| EPDCCH | enhanced PDCCH, enhanced Physical Downlink Control Cannel | |
| EPRE | Energy per resource element | |
| EPS | Evolved Packet System | |
| EREG | enhanced REG, enhanced resource element groups | |
| ETSI | European Telecommunications Standards Institute | |
| ETWS | Earthquake and Tsunami Warning System | |
| eUICC | embedded UICC, embedded Universal Integrated Circuit Card | |
| E-UTRA | Evolved UTRA | |
| E-UTRAN | Evolved UTRAN | |
| EV2X | Enhanced V2X | |
| F1AP | F1 Application Protocol | |
| F1-C | F1 Control plane interface | |
| F1-U | F1 User plane interface | |
| FACCH | Fast Associated Control CHannel | |
| FACCH/F | Fast Associated Control Channel/Full rate | |
| FACCH/H | Fast Associated Control Channel/Half rate | |
| FACH | Forward Access Channel | |
| FAUSCH | Fast Uplink Signalling Channel | |
| FB | Functional Block | |
| FBI | Feedback Information | |
| FCC | Federal Communications Commission | |
| FCCH | Frequency Correction CHannel | |
| FDD | Frequency Division Duplex | |
| FDM | Frequency Division Multiplex | |
| FDMA | Frequency Division Multiple Access | |
| FE | Front End | |
| FEC | Forward Error Correction | |
| FFS | For Further Study | |
| FFT | Fast Fourier Transformation | |
| feLAA | further enhanced Licensed Assisted Access, further enhanced LAA | |
| FN | Frame Number | |
| FPGA | Field-Programmable Gate Array | |
| FR | Frequency Range | |
| G-RNTI | GERAN Radio Network Temporary Identity | |
| GERAN | GSM EDGE RAN, GSM EDGE Radio Access Network | |
| GGSN | Gateway GPRS Support Node | |
| GLONASS | GLObal'naya NAvigatsionnaya Sputnikovaya Sistema (Engl.: Global Navigation Satellite System) | |
| gNB | Next Generation NodeB | |
| gNB-CU | gNB-centralized unit, Next Generation NodeB centralized unit | |

| | | |
|---|---|---|
| gNB-DU | gNB-distributed unit, Next Generation NodeB distributed unit | |
| GNSS | Global Navigation Satellite System | |
| GPRS | General Packet Radio Service | |
| GSM | Global System for Mobile Communications, Groupe Spécial Mobile | |
| GTP | GPRS Tunneling Protocol | |
| GTP-U | GPRS Tunnelling Protocol for User Plane | |
| GTS | Go To Sleep Signal (related to WUS) | |
| GUMMEI | Globally Unique MME Identifier | |
| GUTI | Globally Unique Temporary UE Identity | |
| HARQ | Hybrid ARQ, Hybrid Automatic Repeat Request | |
| HANDO | Handover | |
| HFN | HyperFrame Number | |
| HHO | Hard Handover | |
| HLR | Home Location Register | |
| HN | Home Network | |
| HO | Handover | |
| HPLMN | Home Public Land Mobile Network | |
| HSDPA | High Speed Downlink Packet Access | |
| HSN | Hopping Sequence Number | |
| HSPA | High Speed Packet Access | |
| HSS | Home Subscriber Server | |
| HSUPA | High Speed Uplink Packet Access | |
| HTTP | Hyper Text Transfer Protocol | |
| HTTPS | Hyper Text Transfer Protocol Secure (https is http/1.1 over SSL, i.e. port 443) | |
| I-Block | Information Block | |
| ICCID | Integrated Circuit Card Identification | |
| IAB | Integrated Access and Backhaul | |
| ICIC | Inter-Cell Interference Coordination | |
| ID | Identity, identifier | |
| IDFT | Inverse Discrete Fourier Transform | |
| IE | Information element | |
| IBE | In-Band Emission | |
| IEEE | Institute of Electrical and Electronics Engineers | |
| IEI | Information Element Identifier | |
| IEIDL | Information Element Identifier Data Length | |
| IETF | Internet Engineering Task Force | |
| IF | Infrastructure | |
| IM | Interference Measurement, Intermodulation, IP Multimedia | |
| IMC | IMS Credentials | |
| IMEI | International Mobile Equipment Identity | |
| IMGI | International mobile group identity | |
| IMPI | IP Multimedia Private Identity | |
| IMPU | IP Multimedia PUblic identity | |
| IMS | IP Multimedia Subsystem | |
| IMSI | International Mobile Subscriber Identity | |
| IoT | Internet of Things | |
| IP | Internet Protocol Ipsec IP Security, Internet Protocol Security | |
| IP-CAN | IP-Connectivity Access Network | |
| IP-M | IP Multicast | |
| IPv4 | Internet Protocol Version 4 | |
| IPv6 | Internet Protocol Version 6 | |
| IR | Infrared | |
| IS | In Sync | |
| IRP | Integration Reference Point | |
| ISDN | Integrated Services Digital Network | |
| ISIM | IM Services Identity Module | |
| ISO | International Organisation for Standardisation | |
| ISP | Internet Service Provider | |
| IWF | Interworking-Function | |
| I-WLAN | Interworking WLAN Constraint length of the convolutional code, Individual key | |
| USIM | kB Kilobyte (1000 bytes) | |
| kbps | kilo-bits per second | |
| Kc | Ciphering key | |
| Ki | Individual subscriber authentication key | |
| KPI | Key Performance Indicator | |
| KQI | Key Quality Indicator | |
| KSI | Key Set Identifier | |
| ksps | kilo-symbols per second | |
| KVM | Kernel Virtual Machine | |
| L1 | Layer 1 (physical layer) | |
| L1-RSRP | Layer 1 reference signal received power | |
| L2 | Layer 2 (data link layer) | |

| Abbr | Expansion |
|---|---|
| L3 | Layer 3 (network layer) |
| LAA | Licensed Assisted Access |
| LAN | Local Area Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-IMAC | used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |

| | | |
|---|---|---|
| NEF | Network Exposure Function | |
| NF | Network Function | |
| NFP | Network Forwarding Path | |
| NFPD | Network Forwarding Path Descriptor | |
| NFV | Network Functions Virtualization | |
| NFVI | NFV Infrastructure | |
| NFVO | NFV Orchestrator | |
| NG | Next Generation, Next Gen | |
| NGEN-DC | NG-RAN E-UTRA-NR Dual Connectivity | |
| NM | Network Manager | |
| NMS | Network Management System | |
| N-PoP | Network Point of Presence | |
| NMIB, N-MIB | Narrowband MIB | |
| NPBCH | Narrowband Physical Broadcast CHannel | |
| NPDCCH | Narrowband Physical Downlink Control CHannel | |
| NPDSCH | Narrowband Physical Downlink Shared CHannel | |
| NPRACH | Narrowband Physical Random Access CHannel | |
| NPUSCH | Narrowband Physical Uplink Shared CHannel | |
| NPSS | Narrowband Primary Synchronization Signal | |
| NSSS | Narrowband Secondary Synchronization Signal | |
| NR | New Radio, Neighbour Relation | |
| NRF | NF Repository Function | |
| NRS | Narrowband Reference Signal | |
| NS | Network Service | |
| NSA | Non-Standalone operation mode | |
| NSD | Network Service Descriptor | |
| NSR | Network Service Record | |
| NSSAI | Network Slice Selection Assistance Information | |
| S-NNSAI | Single-NSSAI | |
| NSSF | Network Slice Selection Function | |
| NW | Network | |
| NWUS | Narrowband wake-up signal, Narrowband WUS | |
| NZP | Non-Zero Power | |
| O&M | Operation and Maintenance | |
| ODU2 | Optical channel Data Unit-type 2 | |
| OFDM | Orthogonal Frequency Division Multiplexing | |
| OFDMA | Orthogonal Frequency Division Multiple Access | |
| OOB | Out-of-band | |
| OOS | Out of Sync | |
| OPEX | OPerating EXpense | |
| OSI | Other System Information | |
| OSS | Operations Support System | |
| OTA | over-the-air | |
| PAPR | Peak-to-Average Power Ratio | |
| PAR | Peak to Average Ratio | |
| PBCH | Physical Broadcast Channel | |
| PC | Power Control, Personal Computer | |
| PCC | Primary Component Carrier, Primary CC | |
| PCell | Primary Cell | |
| PCI | Physical Cell ID, Physical Cell Identity | |
| PCEF | Policy and Charging Enforcement Function | |
| PCF | Policy Control Function | |
| PCRF | Policy Control and Charging Rules Function | |
| PDCP | Packet Data Convergence Protocol, Packet Data Convergence Protocol layer | |
| PDCCH | Physical Downlink Control Channel | |
| PDCP | Packet Data Convergence Protocol | |
| PDN | Packet Data Network, Public Data Network | |
| PDSCH | Physical Downlink Shared Channel | |
| PDU | Protocol Data Unit | |
| PEI | Permanent Equipment Identifiers | |
| PFD | Packet Flow Description | |
| P-GW | PDN Gateway | |
| PHICH | Physical hybrid-ARQ indicator channel | |
| PHY | Physical layer | |
| PLMN | Public Land Mobile Network | |
| PIN | Personal Identification Number | |
| PM | Performance Measurement | |
| PMI | Precoding Matrix Indicator | |
| PNF | Physical Network Function | |
| PNFD | Physical Network Function Descriptor | |
| PNFR | Physical Network Function Record | |
| POC | PTT over Cellular | |
| PP, PTP | Point-to-Point | |
| PPP | Point-to-Point Protocol | |

| | | |
|---|---|---|
| PRACH | Physical RACH | |
| PRB | Physical resource block | |
| PRG | Physical resource block group | |
| ProSe | Proximity Services, Proximity-Based Service | |
| PRS | Positioning Reference Signal | |
| PRR | Packet Reception Radio | |
| PS | Packet Services | |
| PSBCH | Physical Sidelink Broadcast Channel | |
| PSDCH | Physical Sidelink Downlink Channel | |
| PSCCH | Physical Sidelink Control Channel | |
| PSSCH | Physical Sidelink Shared Channel | |
| PSCell | Primary SCell | |
| PSS | Primary Synchronization Signal | |
| PSTN | Public Switched Telephone Network | |
| PT-RS | Phase-tracking reference signal | |
| PTT | Push-to-Talk | |
| PUCCH | Physical Uplink Control Channel | |
| PUSCH | Physical Uplink Shared Channel | |
| QAM | Quadrature Amplitude Modulation | |
| QCI | QoS class of identifier | |
| QCL | Quasi co-location | |
| QFI | QoS Flow ID, QoS Flow Identifier | |
| QoS | Quality of Service | |
| QPSK | Quadrature (Quaternary) Phase Shift Keying | |
| QZSS | Quasi-Zenith Satellite System | |
| RA-RNTI | Random Access RNTI | |
| RAB | Radio Access Bearer, Random Access Burst | |
| RACH | Random Access Channel | |
| RADIUS | Remote Authentication Dial In User Service | |
| RAN | Radio Access Network | |
| RAND | RANDom number (used for authentication) | |
| RAR | Random Access Response | |
| RAT | Radio Access Technology | |
| RAU | Routing Area Update | |
| RB | Resource block, Radio Bearer | |
| RBG | Resource block group | |
| REG | Resource Element Group | |
| Rel | Release | |
| REQ | REQuest | |
| RF | Radio Frequency | |
| RI | Rank Indicator | |
| RIV | Resource indicator value | |
| RL | Radio Link | |
| RLC | Radio Link Control, Radio Link Control layer | |
| RLC AM | RLC Acknowledged Mode | |
| RLC UM | RLC Unacknowledged Mode | |
| RLF | Radio Link Failure | |
| RLM | Radio Link Monitoring | |
| RLM-RS | Reference Access Signal for RLM | |
| RM | Registration Management | |
| RMC | Reference Measurement Channel | |
| RMSI | Remaining MSI, Remaining Minimum System Information | |
| RN | Relay Node | |
| RNC | Radio Network Controller | |
| RNL | Radio Network Layer | |
| RNTI | Radio Network Temporary Identifier | |
| ROHC | RObust Header Compression | |
| RRC | Radio Resource Control, Radio Resource Control layer | |
| RRM | Radio Resource Management | |
| RS | Reference Signal | |
| RSRP | Reference Signal Received Power | |
| RSRQ | Reference Signal Received Quality | |
| RSSI | Received Signal Strength Indicator | |
| RSU | Road Side Unit | |
| RSTD | Reference Signal Time difference | |
| RTP | Real Time Protocol | |
| RTS | Ready-To-Send | |
| RTT | Round Trip Time | |
| Rx | Reception, Receiving, Receiver | |
| S1AP | S1 Application Protocol | |
| S1-MME | S1 for the control plane | |
| S1-U | S1 for the user plane | |
| S-GW | Serving Gateway | |
| S-RNTI | SRNC Radio Network Temporary Identity | |
| S-TMSI | SAE Temporary Mobile Station Identifier | |
| SA | Standalone operation mode | |
| SAE | System Architecture Evolution | |
| SAP | Service Access Point | |
| SAPD | Service Access Point Descriptor | |

| | | |
|---|---|---|
| SAPI | Service Access Point Identifier | |
| SCC | Secondary Component Carrier, Secondary CC | |
| SCell | Secondary Cell | |
| SC-FDMA | Single Carrier Frequency Division Multiple Access | |
| SCG | Secondary Cell Group | |
| SCM | Security Context Management | |
| SCS | Subcarrier Spacing | |
| SCTP | Stream Control Transmission Protocol | |
| SDAP | Service Data Adaptation Protocol, Service Data Adaptation Protocol layer | |
| SDL | Supplementary Downlink | |
| SDNF | Structured Data Storage Network Function | |
| SDP | Session Description Protocol | |
| SDSF | Structured Data Storage Function | |
| SDU | Service Data Unit | |
| SEAF | Security Anchor Function | |
| SeNB | secondary eNB | |
| SEPP | Security Edge Protection Proxy | |
| SFI | Slot format indication | |
| SFTD | Space-Frequency Time Diversity, SFN and frame timing difference | |
| SFN | System Frame Number | |
| SgNB | Secondary gNB | |
| SGSN | Serving GPRS Support Node | |
| S-GW | Serving Gateway | |
| SI | System Information | |
| SI-RNTI | System Information RNTI | |
| SIB | System Information Block | |
| SIM | Subscriber Identity Module | |
| SIP | Session Initiated Protocol | |
| SiP | System in Package | |
| SL | Sidelink | |
| SLA | Service Level Agreement | |
| SM | Session Management | |
| SMF | Session Management Function | |
| SMS | Short Message Service | |
| SMSF | SMS Function | |
| SMTC | SSB-based Measurement Timing Configuration | |
| SN | Secondary Node, Sequence Number | |
| SoC | System on Chip | |
| SON | Self-Organizing Network | |
| SpCell | Special Cell | |
| SP-CSI-RNTI | Semi-Persistent CSI RNTI | |
| SPS | Semi-Persistent Scheduling | |
| SQN | Sequence number | |
| SR | Scheduling Request | |
| SRB | Signalling Radio Bearer | |
| SRS | Sounding Reference Signal | |
| SS | Synchronization Signal | |
| SSB | Synchronization Signal Block, SS/PBCH Block | |
| SSBRI | SS/PBCH Block Resource Indicator, Synchronization Signal Block Resource Indicator | |
| SSC | Session and Service Continuity | |
| SS-RSRP | Synchronization Signal based Reference Signal Received Power | |
| SS-RSRQ | Synchronization Signal based Reference Signal Received Quality | |
| SS-SINR | Synchronization Signal based Signal to Noise and Interference Ratio | |
| SSS | Secondary Synchronization Signal | |
| SSSG | Search Space Set Group | |
| SSSIF | Search Space Set Indicator | |
| SST | Slice/Service Types | |
| SU-MIMO | Single User MIMO | |
| SUL | Supplementary Uplink | |
| TA | Timing Advance, Tracking Area | |
| TAC | Tracking Area Code | |
| TAG | Timing Advance Group | |
| TAU | Tracking Area Update | |
| TB | Transport Block | |
| TBS | Transport Block Size | |
| TBD | To Be Defined | |
| TCI | Transmission Configuration Indicator | |
| TCP | Transmission Communication Protocol | |
| TDD | Time Division Duplex | |
| TDM | Time Division Multiplexing | |
| TDMA | Time Division Multiple Access | |
| TE | Terminal Equipment | |
| TEID | Tunnel End Point Identifier | |
| TFT | Traffic Flow Template | |
| TMSI | Temporary Mobile Subscriber Identity |

| | | |
|---|---|---|
| TNL | Transport Network Layer | |
| TPC | Transmit Power Control | |
| TPMI | Transmitted Precoding Matrix Indicator | |
| TR | Technical Report | |
| TRP, TRxP | Transmission Reception Point | |
| TRS | Tracking Reference Signal | |
| TRx | Transceiver | |
| TS | Technical Specifications, Technical Standard | |
| TTI | Transmission Time Interval | |
| Tx | Transmission, Transmitting, Transmitter | |
| U-RNTI | UTRAN Radio Network Temporary Identity | |
| UART | Universal Asynchronous Receiver and Transmitter | |
| UCI | Uplink Control Information | |
| UE | User Equipment | |
| UDM | Unified Data Management | |
| UDP | User Datagram Protocol | |
| UDSF | Unstructured Data Storage Network Function | |
| UICC | Universal Integrated Circuit Card | |
| UL | Uplink | |
| UM | Unacknowledged Mode | |
| UML | Unified Modelling Language | |
| UMTS | Universal Mobile Telecommunications System | |
| UP | User Plane | |
| UPF | User Plane Function | |
| URI | Uniform Resource Identifier | |
| URL | Uniform Resource Locator | |
| URLLC | Ultra-Reliable and Low Latency | |
| USB | Universal Serial Bus | |
| USIM | Universal Subscriber Identity Module | |
| USS | UE-specific search space | |
| UTRA | UMTS Terrestrial Radio Access | |
| UTRAN | Universal Terrestrial Radio Access Network | |
| UwPTS | Uplink Pilot Time Slot | |
| V2I | Vehicle-to-Infrastructure | |
| V2P | Vehicle-to-Pedestrian | |
| V2V | Vehicle-to-Vehicle | |
| V2X | Vehicle-to-everything | |
| VIM | Virtualized Infrastructure Manager | |
| VL | Virtual Link, | |
| VLAN | Virtual LAN, Virtual Local Area Network | |
| VM | Virtual Machine | |
| VNF | Virtualized Network Function | |
| VNFFG | VNF Forwarding Graph | |
| VNFFGD | VNF Forwarding Graph Descriptor | |
| VNFM | VNF Manager | |
| VoIP | Voice-over-IP, Voice-over-Internet Protocol | |
| VPLMN | Visited Public Land Mobile Network | |
| VPN | Virtual Private Network | |
| VRB | Virtual Resource Block | |
| WiMAX | Worldwide Interoperability for Microwave Access | |
| WLAN | Wireless Local Area Network | |
| WMAN | Wireless Metropolitan Area Network | |
| WPAN | Wireless Personal Area Network | |
| X2-C | X2-Control plane | |
| X2-U | X2-User plane | |
| XML | eXtensible Markup Language | |
| XRES | EXpected user RESponse | |
| XOR | eXclusive OR | |
| ZC | Zadoff-Chu | |
| ZP | Zero Power | |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC CONNECTED not configured with CA/DC there is only one serving cell comprising of the primary cell.

The term "serving cell" or "serving cells" refers to the set of cells comprising the Special Cell(s) and all secondary cells for a UE in RRC CONNECTED configured with CA/.

The term "Special Cell" refers to the PCell of the MCG or the PSCell of the SCG for DC operation; otherwise, the term "Special Cell" refers to the Pcell.

The invention claimed is:

1. A user equipment (UE) comprising:
one or more processors; and
one or more non-transitory computer-readable media comprising instructions that, upon execution of the instructions by the one or more processors, are to cause the UE to:
identify, from a base station, downlink control information (DCI);
identify, based on the DCI, an index to a table that includes:
a first combination of a first listen-before-talk (LBT) type, a first offset, and a first channel access priority class (CAPC); and
a second combination of a second LBT type, a second offset, and a second CAPC;
identify, based on the index, the first combination or the second combination; and
perform LBT based on the identified first combination or second combination.

2. The UE of claim 1, wherein the first LBT type is one of CAT-1, CAT-2, and CAT-4.

3. The UE of claim 2, wherein the second LBT type is another one of CAT-1, CAT-2, and CAT-4.

4. The UE of claim 1, wherein the first offset and the second offset are offsets from a reference symbol boundary.

5. The UE of claim 1, wherein the first offset and the second offset relate to a start position for an uplink (UL) transmission.

6. The UE of claim 5, wherein the UL transmission is a physical uplink shared channel (PUSCH) transmission.

7. A base station comprising:
one or more processors; and
one or more non-transitory computer-readable media comprising instructions that, upon execution of the instructions by the one or more processors, are to cause the base station to:
transmit, to a user equipment (UE), downlink control information (DCI) that includes an index to a table, wherein the table includes:
a first combination of a first listen-before-talk (LBT) type, a first offset, and a first channel access priority class (CAPC); and
a second combination of a second LBT type, a second offset, and a second CAPC; and
identify, based on the index, an uplink transmission that is transmitted based on whichever of the first combination or the second combination is indicated by the index.

8. The base station of claim 7, wherein the first LBT type is one of CAT-1, CAT-2, and CAT-4.

9. The base station of claim 8, wherein the second LBT type is another one of CAT-1, CAT-2, and CAT-4.

10. The base station of claim 7, wherein the first offset and the second offset are offsets from a reference symbol boundary.

11. The base station of claim 7, wherein the uplink (UL) transmission is transmitted based on the first offset or the second offset.

12. The base station of claim 11, wherein the UL transmission is a physical uplink shared channel (PUSCH) transmission.

13. One or more non-transitory computer-readable media (NTCRM) comprising instructions that, upon execution of the instructions by one or more processors of a user equipment (UE), are to cause the UE to:
identify, from a base station, downlink control information (DCI);
identify, based on the DCI, an index to a table that includes:
a first combination of a first listen-before-talk (LBT) type, a first offset, and a first channel access priority class (CAPC); and
a second combination of a second LBT type, a second offset, and a second CAPC;
identify, based on the index, the first combination or the second combination; and
perform LBT based on the identified first combination or second combination.

14. The one or more NTCRM of claim 13, wherein the first LBT type is one of CAT-1, CAT-2, and CAT-4.

15. The one or more NTCRM of claim 14, wherein the second LBT type is another one of CAT-1, CAT-2, and CAT-4.

16. The one or more NTCRM of claim 13, wherein the first offset and the second offset are offsets from a reference symbol boundary.

17. The one or more NTCRM of claim 13, wherein the first offset and the second offset relate to a start position for an uplink (UL) transmission.

18. The one or more NTCRM of claim 17, wherein the UL transmission is a physical uplink shared channel (PUSCH) transmission.

* * * * *